United States Patent
Cao et al.

(10) Patent No.: US 11,496,250 B2
(45) Date of Patent: *Nov. 8, 2022

(54) SYSTEMS AND METHODS FOR USER EQUIPMENT COOPERATION WITH SIDELINK HARQ FEEDBACK

(71) Applicant: Huawei Technologies Co., Ltd., Shenzhen (CN)

(72) Inventors: Yu Cao, Ottawa (CA); Amine Maaref, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

This patent is subject to a terminal disclaimer.

(21) Appl. No.: 17/090,282

(22) Filed: Nov. 5, 2020

(65) Prior Publication Data

US 2021/0058198 A1  Feb. 25, 2021

Related U.S. Application Data

(63) Continuation of application No. 16/272,333, filed on Feb. 11, 2019, now Pat. No. 10,833,811.

(51) Int. Cl.
*H04L 1/18* (2006.01)
*H04W 72/12* (2009.01)
(Continued)

(52) U.S. Cl.
CPC .......... *H04L 1/1819* (2013.01); *H04L 1/0057* (2013.01); *H04W 72/0406* (2013.01); *H04W 72/1289* (2013.01)

(58) Field of Classification Search
CPC ....... H04W 8/005; H04W 48/16; H04W 8/00; H04W 88/10; H04W 92/10; H04L 5/0048;
(Continued)

(56) References Cited

U.S. PATENT DOCUMENTS

2006/0013168 A1 * 1/2006 Agrawal ............... H04L 1/0083
370/335
2009/0262678 A1 10/2009 Oyman et al.
(Continued)

FOREIGN PATENT DOCUMENTS

CN   106888074 A   6/2017
EP   2554014 A1   2/2013
(Continued)

OTHER PUBLICATIONS

Huawei, et al., "Support for UE Cooperation in NR", 3GPP TSG RAN WG1 Meeting #85, R1-164379, May 23-27, 2016, R1-164379, 7 Pages, Nanjing, China.
(Continued)

*Primary Examiner* — Jung Liu

(74) *Attorney, Agent, or Firm* — Slater Matsil, LLP

(57) ABSTRACT

Methods and devices utilizing sidelink transmission between user equipment (UEs) for HARQ retransmission are provided. The sidelink HARQ retransmissions include data from the initial transmission or an outer coded version thereof. HARQ feedback from the targeted receiver of the initial transmission may identify code block groups and/or individual code blocks the target receiver did not successfully decode. A UE that has not successfully decoded an entire transport block, may still cooperate in HARQ retransmission for the targeted receiver of the transport block by retransmitting at least a subset of the code block groups that it was able to successfully decode for the transport block.

20 Claims, 24 Drawing Sheets

(51) Int. Cl.
*H04W 72/04* (2009.01)
*H04L 1/00* (2006.01)

(58) Field of Classification Search
CPC ......... H04L 5/005; H04L 5/00; H04L 1/0083;
H04L 5/14; H04L 27/2602; H04B 7/2656;
Y02D 70/00; Y02D 70/449; Y02D
70/1222; Y02D 70/1242; Y02D 70/21;
Y02D 70/1244
See application file for complete search history.

(56) References Cited

U.S. PATENT DOCUMENTS

| | | | |
|---|---|---|---|
| 2013/0223356 A1* | 8/2013 | Khoshnevis | H04W 72/042 370/329 |
| 2014/0153390 A1* | 6/2014 | Ishii | H04L 47/12 370/230 |
| 2014/0185495 A1* | 7/2014 | Kuchibhotla | H04W 76/14 370/329 |
| 2014/0269338 A1* | 9/2014 | Jung | H04L 5/0055 370/329 |
| 2015/0009867 A1* | 1/2015 | Choi | H04W 48/08 370/278 |
| 2017/0078863 A1* | 3/2017 | Kim | H04W 48/16 |
| 2017/0280423 A1* | 9/2017 | Zhao | H04W 8/005 |
| 2017/0373738 A1* | 12/2017 | Chae | H04L 27/26 |
| 2018/0007677 A1* | 1/2018 | Seo | H04W 28/06 |
| 2018/0159660 A1 | 6/2018 | Jia et al. | |
| 2018/0270801 A1* | 9/2018 | Novlan | H04W 72/042 |
| 2018/0287744 A1 | 10/2018 | Sundararajan et al. | |
| 2019/0238213 A1* | 8/2019 | Sfar | H04B 7/0632 |
| 2020/0127775 A1 | 4/2020 | Su et al. | |

FOREIGN PATENT DOCUMENTS

| | | |
|---|---|---|
| WO | 2011121583 A1 | 10/2011 |
| WO | 2019001406 A1 | 1/2019 |

OTHER PUBLICATIONS

Huawei, et al., "Sidelink feedback for NR V2X", 3GPP TSG RAN WG1 Meeting #95, R1-1814302, Nov. 12-16, 2018, 3 Pages, Spokane, USA.

Qualcomm Incorporated, "Erasure coding evaluation methodology", 3GPP TSG-RAN WG1 #86, R1-166375, Aug. 22-26, 2016 7 Pages, Gothenburg, Sweden.

Qualcomm Incorporated, "Outer Code Design for URLLC and eMBB Multiplexing Discussion/Decision", 3GPP TSG-RAN WG1 #88, R1-1702641, Feb. 13-17, 2017, 10 Pages, Athens, Greece.

Qualcomm Incorporated, "Erasure coding and HARQ design", 3GPP TSG-RAN WG1 #86bis, R1-1610143, Oct. 10-14, 2016, 7 Pages, Lisbon, Portugal.

ZTE, et al., "Consideration on Outer Codes for NR", 3GPP TSG RAN WG1 #86bis, R1-1608976, Oct. 10-14, 2016, 9 Pages, Lisbon, Portugal.

* cited by examiner

First network device 302

$m = 4 \begin{cases} C_1 = C_{1,0}, C_{1,1}, C_{1,2}, C_{1,3}, C_{1,4} \overbrace{\phantom{xxxxxxxxxxxxxx}}^{k=5} \\ C_2 = C_{2,0}, C_{2,1}, C_{2,2}, C_{2,3}, C_{2,4} \\ C_3 = C_{3,0}, C_{3,1}, C_{3,2}, C_{3,3}, C_{3,4} \\ C_4 = C_{4,0}, C_{4,1}, C_{4,2}, C_{4,3}, C_{4,4} \end{cases}$ $N = 3 \begin{cases} P_1 = P_{1,0}, P_{1,1}, P_{1,2}, P_{1,3}, P_{1,4} \\ P_2 = P_{2,0}, P_{2,1}, P_{2,2}, P_{2,3}, P_{2,4} \\ P_3 = P_{3,0}, P_{3,1}, P_{3,2}, P_{3,3}, P_{3,4} \end{cases}$

⟶

Second network device 304

$\left. \begin{array}{l} C_1 = C_{1,0}, C_{1,1}, C_{1,2}, C_{1,3}, C_{1,4} \\ C_2 = C_{2,0}, C_{2,1}, C_{2,2}, C_{2,3}, C_{2,4} \\ C_3 = C_{3,0}, C_{3,1}, C_{3,2}, C_{3,3}, C_{3,4} \end{array} \right\}$ Decoding failed $\left. C_4 = C_{4,0}, C_{4,1}, C_{4,2}, C_{4,3}, C_{4,4} \right\}$ Decoding successful $\left. \begin{array}{l} P_1 = P_{1,0}, P_{1,1}, P_{1,2}, P_{1,3}, P_{1,4} \\ P_2 = P_{2,0}, P_{2,1}, P_{2,2}, P_{2,3}, P_{2,4} \\ P_3 = P_{3,0}, P_{3,1}, P_{3,2}, P_{3,3}, P_{3,4} \end{array} \right\}$ Decoding successful

FIG. 12A

SYSTEMS AND METHODS FOR USER EQUIPMENT COOPERATION WITH SIDELINK HARQ FEEDBACK

CROSS-REFERENCE TO RELATED APPLICATIONS

This application is a continuation of U.S. patent application Ser. No. 16/272,333, filed on Feb. 11, 2019, and entitled "Systems and Methods for User Equipment Cooperation with Sidelink HARQ Feedback," which application is hereby incorporated herein by reference in its entirety.

TECHNICAL FIELD

The present application relates to wireless communication, and particularly to User Equipment (UE) cooperation with sidelink (SL) hybrid automatic repeat request (HARQ) feedback.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

UE cooperation has been proposed to enhance reliability, throughput and capacity. For example, UE cooperation can be used to provide diversity in space, time and frequency, and increase the robustness against fading and interference. In UE cooperation, SL communications are used to establish joint UE reception, where some of the UEs, referred to as cooperating UEs (CUEs), act as relays for other UEs, referred to as target UEs (TUEs) to improve system throughput and coverage. However, joint UE reception using SL communications can also increase the complexity of the network communications, such as for hybrid-automatic repeat request (HARQ) signaling. The HARQ mechanism is a link adaptation technique that can improve communications for erroneous data packets in wireless communication networks. However, current implementations of HARQ do not efficiently exploit the SL communication capabilities of UE cooperation. Therefore, there is a need for efficient schemes that leverage UE cooperation and SL communications with the HARQ mechanism.

SUMMARY

According to a first aspect, the present disclosure provides a method for user equipment (UE) cooperation. The method includes receiving, at a first UE, a transport block intended for a second UE, the transport block comprising a plurality of code block groups, each code block group comprising a plurality of code blocks. The method further includes transmitting, from the first UE to the second UE, at least one code block based on at least one code block group of the transport block intended for the second UE, the at least one code block group including less than all code block groups of the transport block.

In some embodiments of the method according to the first aspect of the present disclosure, transmitting at least one code block based on the at least one code block group of the transport block intended for the second UE comprises transmitting at least one outer coded code block based on less than all code block groups of the transport block.

In some embodiments of the method according to the first aspect of the present disclosure, outer coding used to generate the at least one outer coded code block comprises one of: raptor coding, Reed Solomon (RS) coding, parity check coding, and erasure coding.

In some embodiments of the method according to the first aspect of the present disclosure, transmitting at least one outer coded code block based on less than all code block groups of the transport block comprises transmitting at least one outer coded code block based on the content of each code block group among the less than all code block groups of the transport block.

In some embodiments of the method according to the first aspect of the present disclosure, the method further includes receiving, at the first UE, a feedback message from the second UE including information identifying at least one code block group the second UE failed to decode for the transport block. In such embodiments, the at least one code block group upon which the at least one code block transmitted from the first UE is based may be selected from among the plurality of code block groups of the transport block based at least in part on the feedback message from the second UE.

In some embodiments of the method according to the first aspect of the present disclosure, transmitting the at least one outer coded code block includes generating, for each code block group of the transport block, an outer coded code block based on contents of the code block group, and transmitting the outer coded versions of the code block groups to the second UE.

In some embodiments of the method according to the first aspect of the present disclosure, the method further includes receiving, at the first UE, a feedback message from the second UE. The feedback message may include information identifying at least one code block group the second UE failed to decode for the transport block, and information indicating, for each code block group the second UE failed to decode, a quantity of code blocks the second UE failed to decode for the code block group. In such embodiments, transmitting at least one outer coded code block to the second UE may include transmitting, for each of at least one code block group the second UE failed to decode, a quantity of outer coded code blocks for the code block group based on the feedback information.

In some embodiments of the method according to the first aspect of the present disclosure, the method further includes receiving, at the first UE, scheduling information from a base station. In such embodiments, the at least one code block transmitted from the first UE may include at least one code block group selected from among the plurality of code block groups of the transport block based at least in part on the scheduling information from the base station.

In some embodiments of the method according to the first aspect of the present disclosure, the at least one code block transmitted from the first UE includes at least one code block group of the transport block. In such embodiments, the method may further include transmitting, from the first UE in sidelink control information (SCI) in a sidelink control channel, information identifying the index of each code block group of the at least one code block group transmitted from the first UE among all the code block groups of the transport block.

In some embodiments of the method according to the first aspect of the present disclosure, the method further includes transmitting, from the first UE in sidelink control information (SCI) in a sidelink control channel, at least one of the following: information identifying the index of each code block group of the transport block upon which the at least one outer coded code block is based; information identifying the number of outer coded code blocks transmitted for each code block group; and information identifying parameters to generate each outer coded code block for each code block group.

According to a second aspect, the present disclosure provides a user equipment (UE). The UE includes one or more processors and a non-transitory computer readable storage medium storing programming for execution by the one or more processors. The programming includes instructions to: receive a transport block intended for a second UE, the transport block comprising a plurality of code block groups, each code block group comprising a plurality of code blocks; and transmit, to the second UE, at least one code block based on at least one code block group of the transport block intended for the second UE, the at least one code block group including less than all code block groups of the transport block.

In some embodiments of the UE according to the second aspect of the present disclosure, the instructions to transmit at least one code block based on the at least one code block group of the transport block intended for the second UE comprise instructions to transmit at least one outer coded code block based on less than all code block groups of the transport block.

In some embodiments of the UE according to the second aspect of the present disclosure, outer coding used to generate the at least one outer coded code block includes one of: raptor coding, Reed Solomon (RS) coding, parity check coding, and erasure coding.

In some embodiments of the UE according to the second aspect of the present disclosure, the instructions to transmit at least one outer coded code block based on less than all code block groups of the transport block include instructions to transmit at least one outer coded code block based on the content of each code block group among the less than all code block groups of the transport block.

In some embodiments of the UE according to the second aspect of the present disclosure, the programming further includes instructions to receive a feedback message from the second UE including information identifying at least one code block group the second UE failed to decode for the transport block. In such embodiments, the at least one code block group upon which the at least one code block transmitted to the second UE is based is selected from among the plurality of code block groups of the transport block based at least in part on the feedback message from the second UE.

In some embodiments of the UE according to the second aspect of the present disclosure, the instructions to transmit the at least one outer coded code block based on less than all code block groups of the transport block includes instructions to: generate, for each code block group of the transport block, an outer coded code block based on contents of the code block group; and transmit the outer coded versions of the code block groups to the second UE.

In some embodiments of the UE according to the second aspect of the present disclosure, the programming further includes instructions to receive a feedback message from the second UE that includes: information identifying at least one code block group the second UE failed to decode for the transport block; and information indicating, for each code block group the second UE failed to decode, a quantity of code blocks the second UE failed to decode for the code block group. In such embodiments, the instructions to transmit at least one outer coded code block to the second UE may include instructions to transmit, for each of at least one code block group the second UE failed to decode, a quantity of outer coded code blocks for the code block group based on the feedback information.

In some embodiments of the UE according to the second aspect of the present disclosure, the programming further includes instructions to receive scheduling information from a base station. In such embodiments, the instructions to transmit at least one code block based on at least one code block group of the transport block may include instructions to transmit at least one code block group selected from among the plurality of code block groups of the transport block based at least in part on the scheduling information from the base station.

In some embodiments of the UE according to the second aspect of the present disclosure, the instructions to transmit at least one code block based on at least one code block group of the transport block include instructions to transmit at least one code block group of the transport block. In such embodiments, the programming may further include instructions to transmit, in sidelink control information (SCI) in a sidelink control channel, information identifying the index of each code block group of the at least one code block group among all the code block groups of the transport block.

In some embodiments of the UE according to the second aspect of the present disclosure, the programming further includes instructions to transmit, in sidelink control information (SCI) in a sidelink control channel, at least one of the following: information identifying the index of each code block group of the transport block upon which the at least one outer coded code block is based; information identifying the number of outer coded code blocks transmitted for each code block group; and information identifying parameters to generate each outer coded code block for each code block group.

BRIEF DESCRIPTION OF THE DRAWINGS

Embodiments will be described, by way of example only, with reference to the accompanying figures wherein:

FIG. 12A illustrates an example of information and parity codeblocks;

DETAILED DESCRIPTION OF ILLUSTRATIVE EMBODIMENTS

Figure 1:
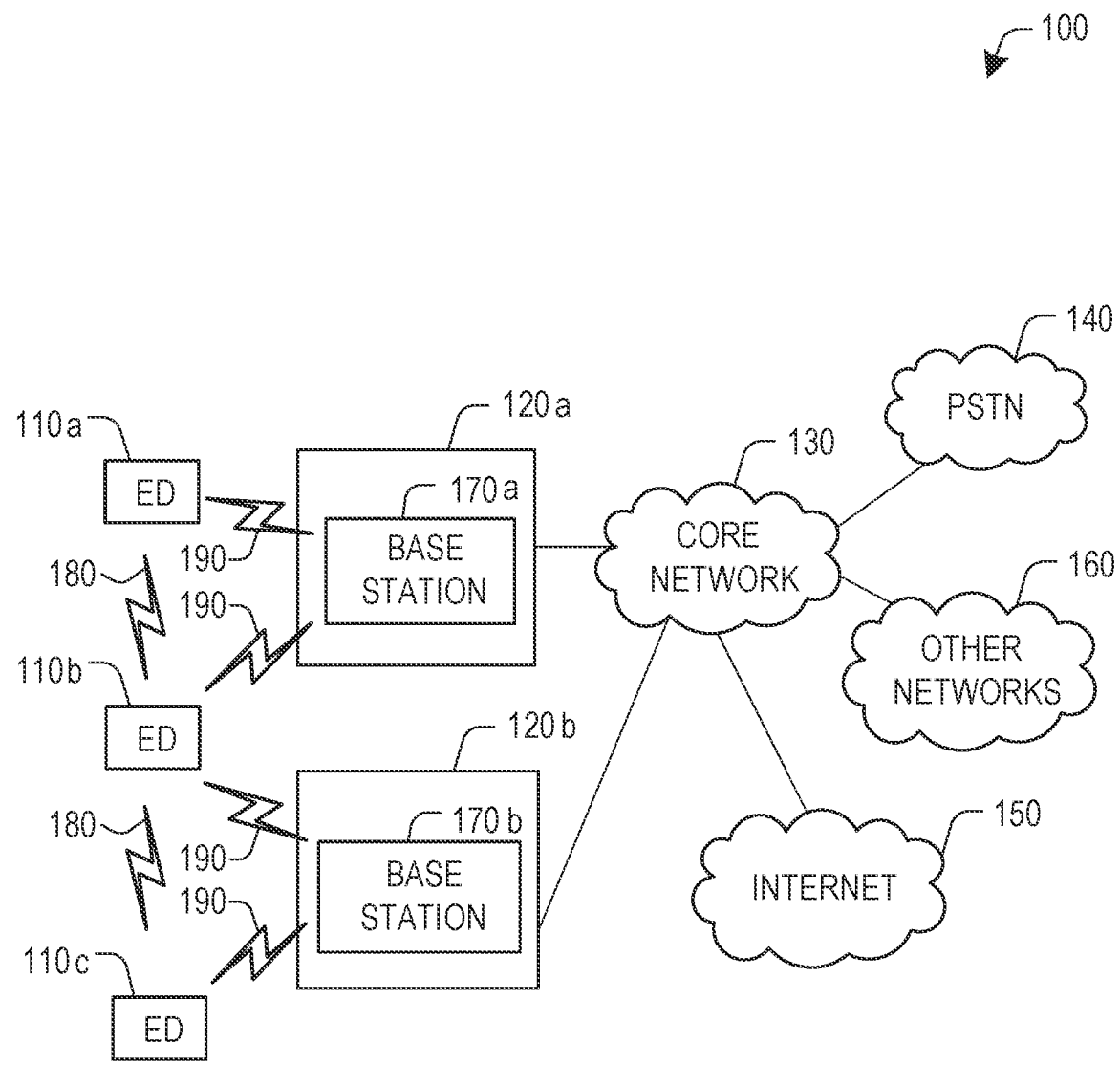
FIG. 1 is a network diagram of an example communication system.

As noted above, resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

Channel coding, such as forward error-correction (FEC) coding or error-correction coding, introduces redundancy into the data prior to transmission. The receiving system exploits the redundancy to detect and possibly correct errors introduced during transmission, e.g. errors introduced by the channel, the receiver, the transmitter, a storage medium, etc. For example, in a communication system that employs FEC coding, a source provides data to an encoder, which is also referred to as a coder. The encoder encodes the data to generate a longer sequence of coded bits called a "codeword". The coded bits include redundancy, which may be in the form of parity bits. Codewords are transmitted to a receiver. The receiver uses a suitable decoder to try to extract the original unencoded data. The decoder may also correct errors, which may have been caused during transmission of the codeword, e.g. because of a noisy channel.

Channel coding can thus be used to detect and/or correct errors, which may reduce the need for the transmitter to retransmit data that was corrupted during transmission. By reducing the need to retransmit data, the throughput of the channel or link may be improved.

In some systems, a TB is divided into several FEC blocks, and the FEC blocks are scheduled for transmission by a scheduler. However, if a TB transmission fails, e.g. if the decode output does not pass cyclic redundancy check (CRC), then the redundant versions of all the FEC blocks in the TB are retransmitted, even though some of the FEC blocks may have been correctly received. That is, HARQ retransmission is TB based in such systems. The retransmission may use the same or a different redundancy version (RV) of the TB. Soft combining of the different transmissions of the TB is used. To manage complexity, each UE may have a limited number of HARQ processes, e.g. eight HARQ processes.

In some systems, code block group (CBG) based retransmission is supported for downlink communications. A CBG refers to a group of code blocks (CBs). A possible benefit of CBG based retransmission compared to TB based retransmission is that in CBG based retransmission one or multiple CBGs may be retransmitted instead of the whole TB. Soft combining of different transmissions of a CBG may be performed. However, for CBG based retransmission, the receiving UE needs to feedback a CBG index that indicates which CBGs failed. The CBG index increases the overhead of the HARQ feedback.

Furthermore, depending upon the application, soft combining based HARQ might not work well. As one example, some systems support multiplexing of different traffic types, including pre-empting scheduled enhanced mobile broadband (eMBB) traffic when more urgent ultra-reliable low latency communications (URLLC) traffic arrives for transmission. The FEC block or CBG corresponding to the pre-empted traffic might not be known to the decoder, in which case the receiver may be attempting to soft-combine a transmission containing different information intended for a different receiver. As a result, HARQ combining based on soft combining might not work or may have worse performance than not performing soft combining on the pre-empted traffic.

SL transmission between UEs may be utilized for HARQ retransmissions in a two level HARQ scheme. For example, such a two level HARQ scheme may have two phases, a first DL multicast phase and a second SL cooperation phase. In the first phase, a BS or evolved NodeB (eNB) broadcasts data to both CUE(s) and TUE. In the second phase, the CUE(s) send a retransmission of the data that they received in the first phase to the TUE. If the TUE successfully received the data, the TUE may send an acknowledgement (ACK) to the BS and the CUE(s). After the initial broadcast transmission of the data in the first phase, the BS may choose to resend the data if it does not receive an ACK before a time period $T_0$ elapses.

However, a CUE might not always be able to decode an entire data block it received from the BS. In conventional UE cooperation solutions that utilize a TB based HARQ retransmission scheme, a CUE that does not fully decode the data block cannot cooperate and help the transmission for the TUE.

Aspects of the present disclosure improve the communication technology by addressing at least one of the disadvantages outlined above.

Vehicle to everything (V2X) refers to a category of communications scenarios (along with their corresponding technical challenges), including communication between a vehicle and another vehicle (V2V), vehicle to infrastructure (V2I), vehicle to pedestrian (V2P), and many other scenarios. In V2X, the transmission can be done through a link between network and UE, such as uplink and downlink or a sidelink between UE and UE. UE cooperation can be used to enhance the reliability, throughput, and capacity of V2X communications, as well as next generation wireless communications in general.

In LTE, a conventional V2X transmission scheme relies on the concept of a transmit resource pool (RP). The conventional LTE V2X transmission scheme includes two transmission modes: mode 3 and mode 4. In mode 3, BS schedules time-frequency resources (from the UE's RP) for SL transmission using DCI, either dynamically or semi-persistently. In mode 4, UE randomly selects resources within its transmit RP. UE may also reselect resources based on previous measurement and sensing results.

The conventional resource pool approach has downsides and limitations, which are addressed by the present invention. For example, the scheduling in mode 3 results in scheduling-related limitations, such as latency and having the SL transmission rely on DCI. For another example, when the UE autonomously selects resources in mode 4, there can be a collision or conflict with the same resource being selected by another UE.

Aspects of the present disclosure provide different UE cooperating schemes based on different HARQ feedback. Broadly speaking, UE cooperating schemes in accordance with aspects of the present disclosure can be grouped into two different categories. The first category is CBG or CB level cooperation without outer coding. In this first category, a CUE retransmits, via SL transmission, one or more CBGs or CBs it received from the first DL multicast phase. These transmissions can be done according to the SL HARQ feedback. The second category is outer code based, where CUE may transmit data using an outer code applied to the data block or selected CBGs of the data received from the from the first DL multicast phase. Similar to the first category, in the second category, how a CUE cooperates may depend on the SL HARQ feedback. Both categories can potentially enable distributed UE cooperation, whereby CUEs can cooperate without base station scheduling. For example, CUEs can make decisions on how to cooperate based on SL HARQ feedback. In addition, CUE can cooperate even without fully decoding the data block intended for the TUE. In addition, the UE cooperation schemes with sidelink HARQ feedback can potentially significantly reduce the resources used for SL transmission and improve UE cooperation efficiency.

According to an aspect of the present disclosure, rather than retransmitting an entire transport block during the SL cooperation phase, a CUE may transmit at least one code block based on less than all code block groups of the transport block during the SL cooperation phase. For example, an aspect of the present disclosure enables a CUE that has successfully decoded less than all code block groups of a transport block received during the multicast phase to still cooperate during the SL cooperation phase by transmitting at least one code block to the TUE that is based on at least one code block group from the partial subset of code block group the CUE was able to successfully decode.

For illustrative purposes, specific example embodiments will now be explained in greater detail below in conjunction with the figures. Before discussing detailed embodiments of aspects of the present disclosure, examples of communication systems and devices in which such aspects might be implemented will first be discussed.

Example Communication Systems and Devices

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a,

170*b* may be a single element, as shown, or multiple elements, distributed in the corresponding RAN, or otherwise. Also, the base station 170*b* forms part of the RAN 120*b*, which may include other base stations, elements, and/or devices. Each base station 17*a*-170*b* transmits and/or receives wireless signals within a particular geographic region or area, sometimes referred to as a "cell" or "coverage area". A cell may be further divided into cell sectors, and a base station 170*a*-170*b* may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120*a*-120*b* shown is exemplary only. Any number of RAN may be contemplated when devising the communication system 100.

The base stations 170*a*-170*b* communicate with one or more of the EDs 110*a*-110*c* over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170*a*-170*b* may implement Universal Mobile Telecommunication System (UMTS) Terrestrial Radio Access (UTRA) to establish an air interface 190 using wideband CDMA (WCDMA). In doing so, the base station 170*a*-170*b* may implement protocols such as HSPA, HSPA+ optionally including HSDPA, HSUPA or both. Alternatively, a base station 170*a*-170*b* may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Other multiple access schemes and wireless protocols may be utilized.

The RANs 120*a*-120*b* are in communication with the core network 130 to provide the EDs 110*a*-110*c* with various services such as voice, data, and other services. The RANs 120*a*-120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a*-120*b* or EDs 110*a*-110*c* or both, and (ii) other networks (such as the PSTN 140, the internet 150, and the other networks 160).

The EDs 110*a*-110*c* communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110*a*-110*c* communication with one or more of the base stations 170*a*-170*c*, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110*a*-110*c* may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110*a*-110*c* may be multimode devices capable of operation according to multiple radio access technologies, and incorporate multiple transceivers necessary to support such.

Figure 2:
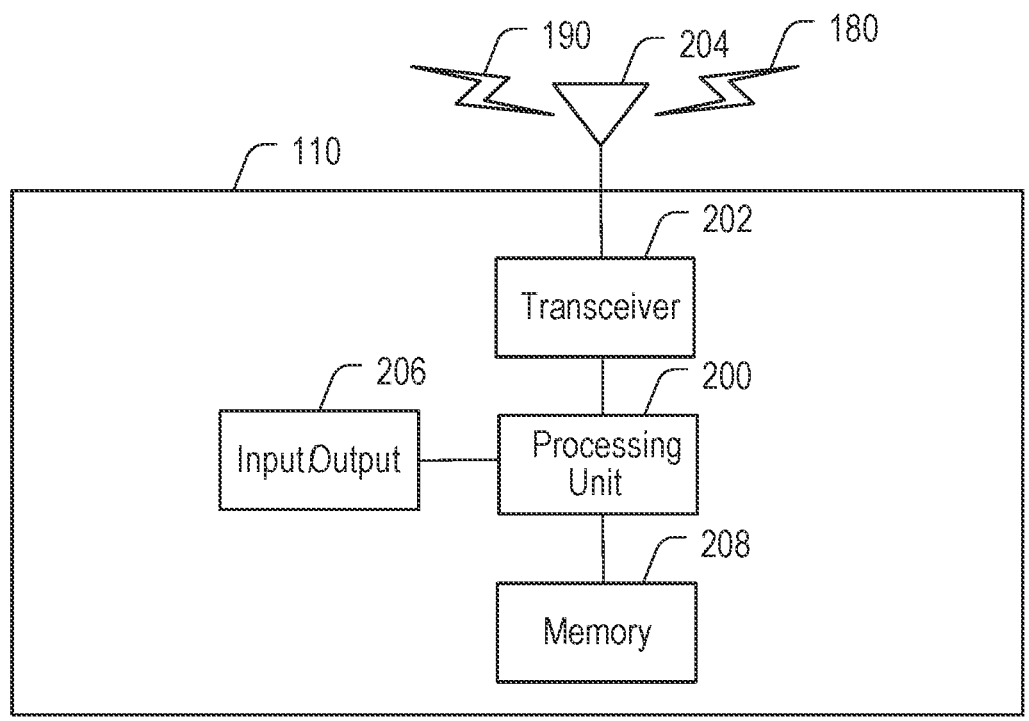
FIG. 2 is a block diagram of an example electronic device.
Figure 3:
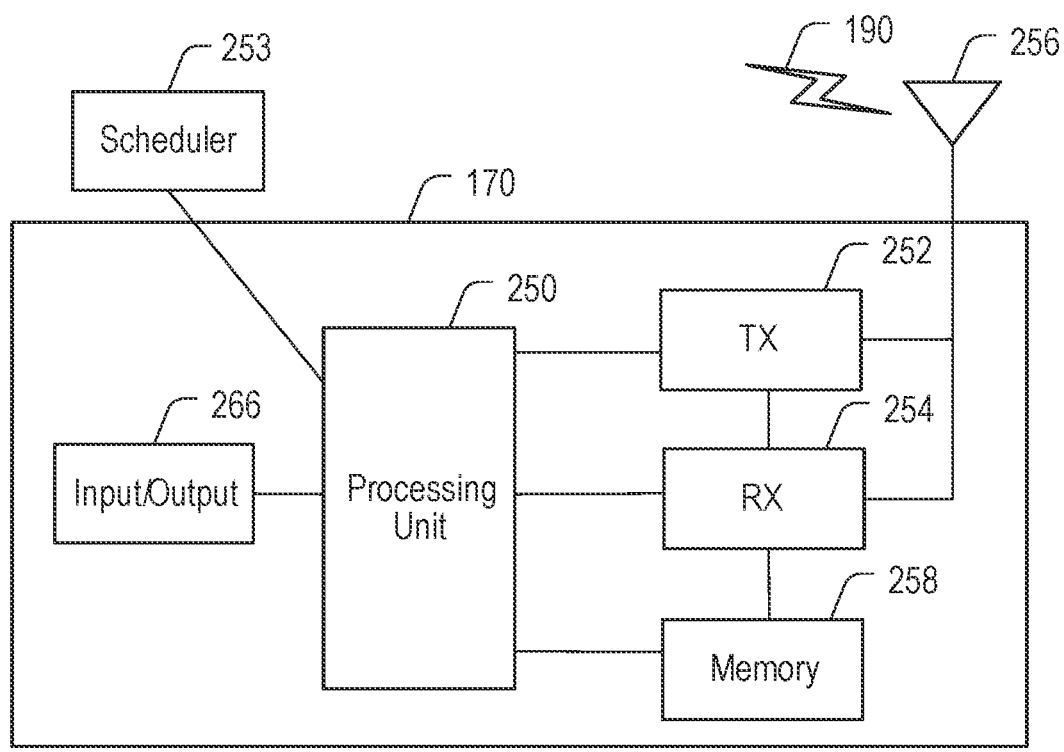
FIG. 3 is a block diagram of another example electronic device.

FIGS. 2 and 3 illustrate example devices that may implement the methods and teachings according to this disclosure. FIG. 2 illustrates an example ED 110. The ED 110 will hereafter be referred to as a user equipment (UE) 110. FIG. 3 illustrates an example base station 170. These components could be used in the communication system 100 or in any other suitable system.

As shown in FIG. 2, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the UE 110. One or multiple antennas 204 could be used in the UE 110. Although shown as a single functional unit, a transceiver 202 could also be implemented using at least one transmitter and at least one separate receiver.

The UE 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the UE 110 includes at least one memory 208. The memory 208 stores instructions and data used, generated, or collected by the UE 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more UEs or other devices. Each receiver 254 includes any suitable structure for processing signals received wirelessly or by wire from one or more UEs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the UE 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

The following section describes examples of different UE cooperation procedures that aspects of the present disclosure may be applied to, and different kinds of SL HARQ feedback are also discussed. After that, several examples of UE cooperation schemes in accordance with the present disclosure are provided. The examples include a first group of examples in accordance with the first category of UE cooperation described above, in which a CUE retransmits selected CBGs or CBs among the data block or TB the CUE received during the first multicast phase, based on different HARQ feedback schemes. The examples also include a second group in accordance with the second category of UE cooperation described above, in which a CUE retransmits an outer coded version of the TB or selected CBGs thereof based on different HARQ feedback schemes.

UE Cooperation Procedure

Figure 4:
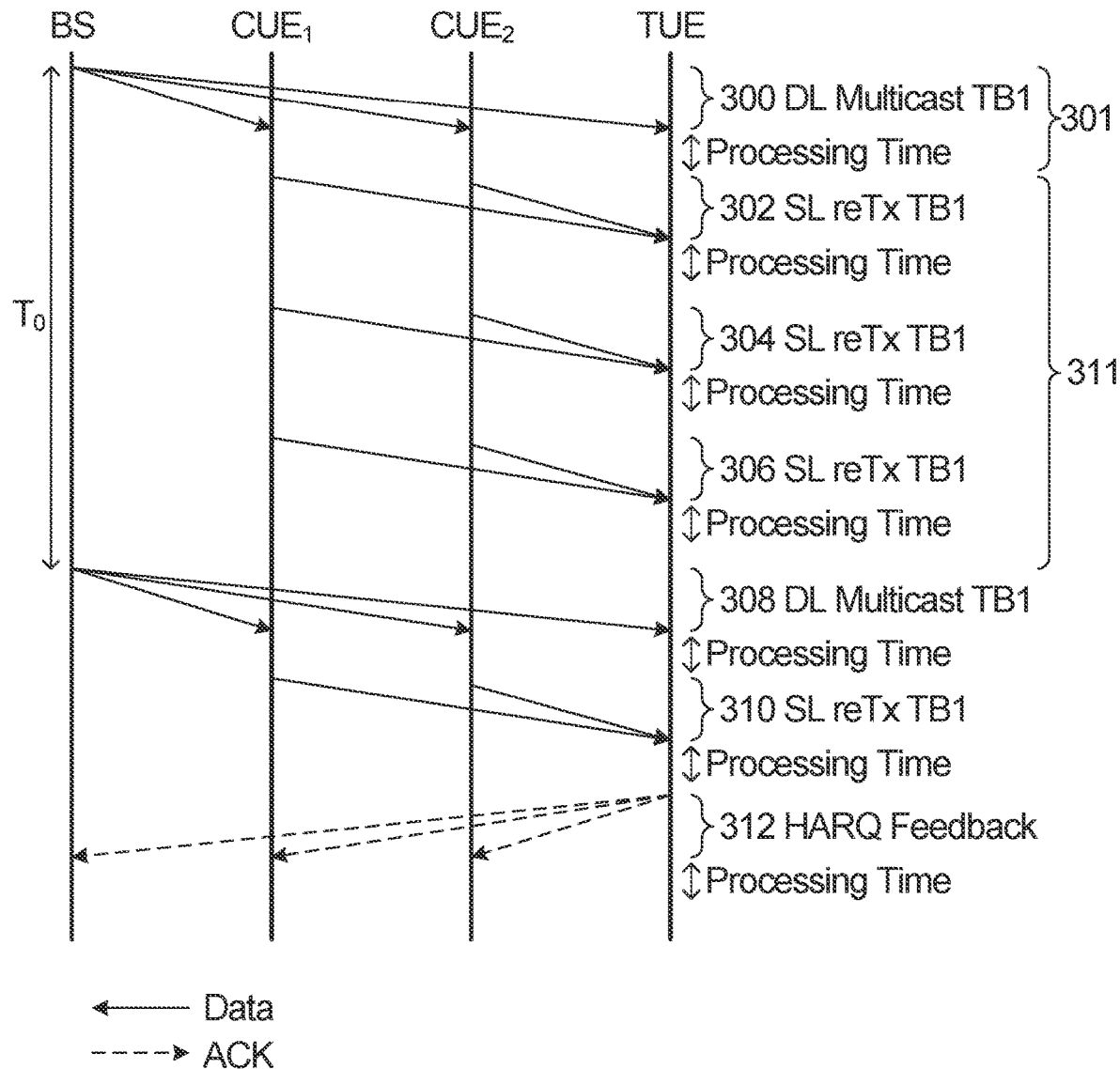
FIG. 4 is a diagram of a two level HARQ scheme.

FIG. 4 shows a diagram of an example of a two level HARQ scheme that utilizes SL transmission between UEs for HARQ retransmissions. The two level HARQ scheme has two phases, a first DL multicast phase 301 and a second SL cooperation phase 311. In the first multicast phase 301, a BS or evolved NodeB (eNB) broadcasts data that includes a transport block TB1 to both CUE(s) and TUE, as indicated at 300. In the example shown in FIG. 4, there are two CUEs: $CUE_1$ and $CUE_2$. In the second SL cooperation phase 311, the CUEs, $CUE_1$ and $CUE_2$, if they have successfully received the data from the BS in the first phase, send a retransmission of the data that they received in the first phase to the TUE. The CUEs may send retransmissions of the data repeatedly during the second phase in the absence of an acknowledgement (ACK) from the TUE, as indicated at 302, 304 and 306 in FIG. 4. If the TUE successfully received the data, the TUE may send an ACK to the BS and the CUEs. After the initial multicast transmission of the data in the first phase, the BS may choose to resend the data if it does not receive an ACK from the TUE before a time period $T_0$ elapses, as indicated at 308 in FIG. 4. Following the DL multicast transmission at 308, if the CUEs successfully receive the retransmitted data from the BS, then they can again cooperate by sending a retransmission of that data, as indicated at 310 in FIG. 4. As indicated at 312 in FIG. 4, if the TUE is able to successfully decode the entire TB transmitted by the BS, the TUE may send an ACK via a HARQ feedback message.

Figure 5A:
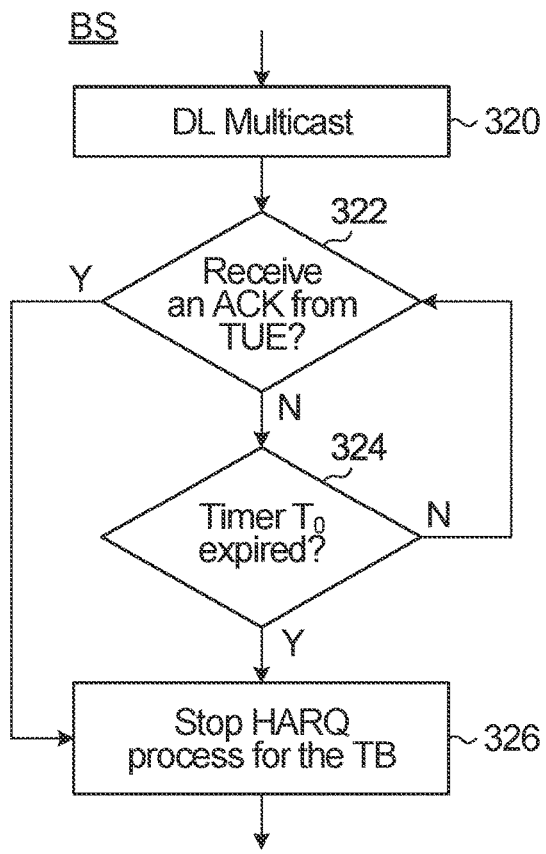
FIG. 5A is a flow diagram illustrating an example of a method performed by a base station (BS) acting as an original transmitter in a two level HARQ scheme.
Figure 5B:
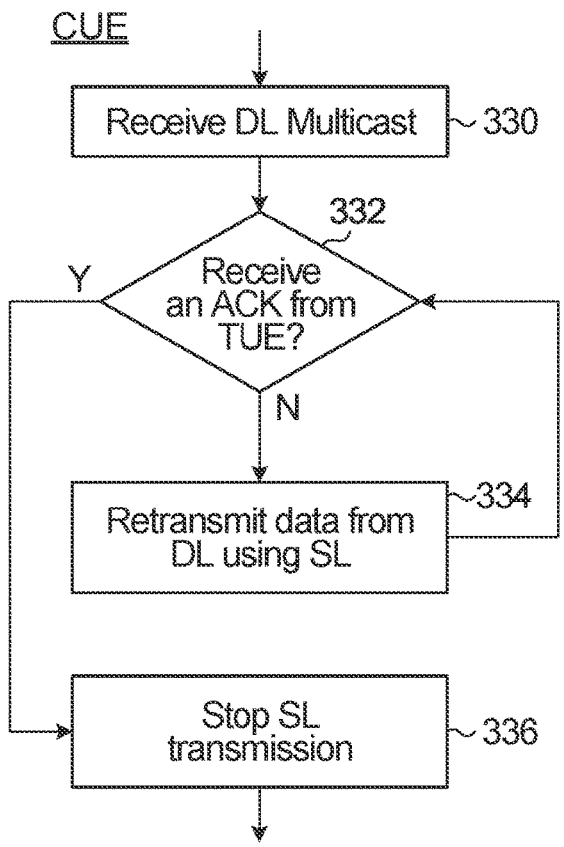
FIG. 5B is a flow diagram illustrating an example of a method performed by a UE acting as a CUE in a two level HARQ scheme.
Figure 5C:
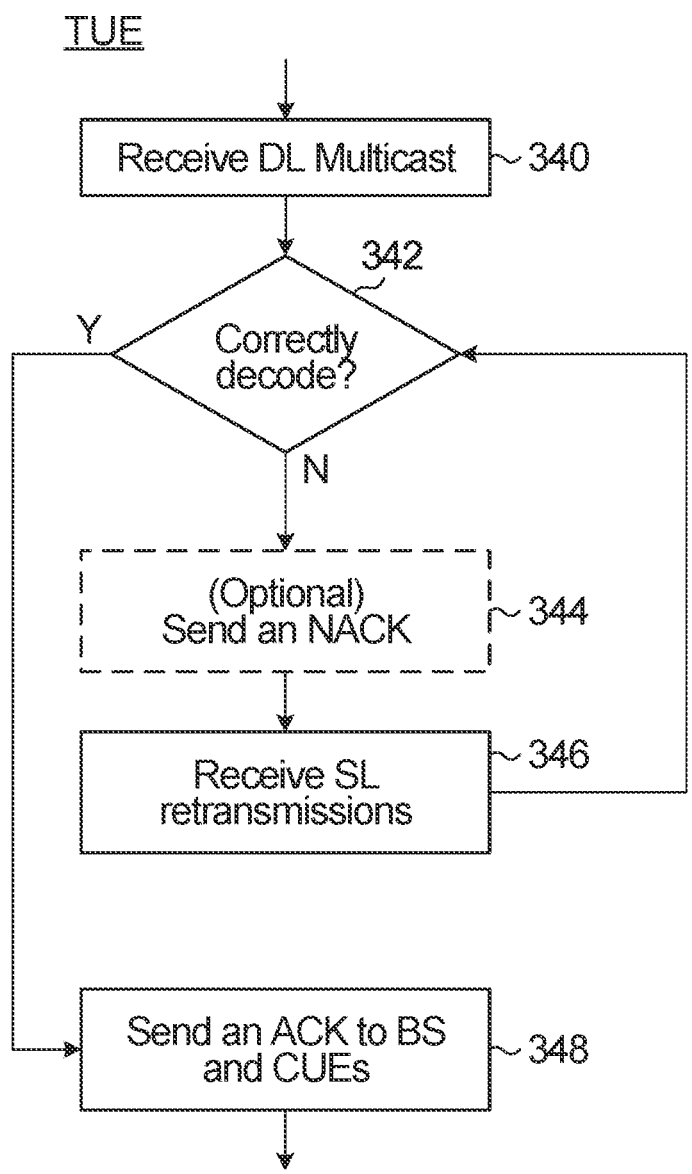
FIG. 5C is a flow diagram illustrating an example of a method performed by a UE acting as a TUE in a two level HARQ scheme.

FIGS. 5A, 5B and 5C are flow diagrams illustrating methods performed by a BS, CUE and TUE, respectively, in accordance with an example of a two level HARQ scheme such as the one described above with reference to FIG. 4.

As shown in FIG. 5A, the method performed by the BS includes transmitting a DL multicast transmission at 320 that includes a TB intended for a TUE. One or multiple TBs could be included in the DL multicast transmission at 802. At 322, it is determined by the BS whether an acknowledgement (ACK) message, or some other type of feedback information indicating the TUE successfully decoded the TB, has been received from the TUE. If not, then at 324 it is determined by the BS whether a time period $T_0$ since the DL multicast transmission at 320 has expired. If the time period $T_0$ has not expired, the method reverts to 322, and the BS again determines whether an ACK message has been received from the TUE. If the BS determines that the time period $T_0$ has expired at 324, the BS may stop the HARQ process for the TB at 326. Similarly, if the BS determines at 322 that an ACK message has been received from the TUE, the method proceeds to 326 and of the HARQ process for the TB is stopped.

In the example method shown in FIG. 5A, if the BS determines at 324 that the time period $T_0$ has expired, the BS stops the HARQ process for the TB at 326. In other embodiments, if the BS determines at 324 that the time period $T_0$ has expired, the BS may instead continue the HARQ process for the TB by retransmitting the TB in another DL multicast transmission using the same redundancy version (RV) or a different RV. Referring again to FIG. 4, an example of such a second DL multicast transmission is indicated at 308 in FIG. 4.

Referring now to FIG. 5B, which shows an example of a method performed by a CUE, the CUE receives a DL multicast transmission from a BS at 330. At 332, it is determined by the CUE whether an ACK message has been received from the TUE. If not, then at 334 the CUE retransmits data from the DL multicast transmission using SL transmission. Following the retransmission at 334, the method reverts to 332 and the CUE again determines whether an ACK message has been received from the TUE. If not, the method reverts to 334 and the CUE again retransmits data from the DL multicast transmission using SL transmission. The CUE may continue to retransmit at 334 and determine whether an ACK message has been received at 332 until an ACK message is received from the TUE. If at 332 the CUE determines that an ACK message has been received from the TUE, then the CUE stops SL transmission at 336. In some embodiments, the CUE may also stop SL transmission to the TUE responsive to some other criteria being met, e.g., if a retransmission timer has expired or a predefined number of retransmissions have been transmitted to the TUE.

Turning now to FIG. 5C, which shows an example of a method performed by a TUE, the TUE receives a DL multicast transmission from a BS at 340. At 342, it is determined by the TUE whether data in the DL multicast transmission has been correctly decoded. If not, the TUE receives one or more SL retransmissions of data from the DL multicast message from one or more CUEs at 346. In some embodiments, prior to receiving the SL retransmissions at 346, the TUE may transmit a negative acknowledgement (NACK) message at 344. For example, the TUE may transmit a NACK message to the BS via an uplink transmission and/or may transmit a NACK message to one or more CUEs via SL transmission. In other embodiments, the TUE does not transmit a NACK. After receiving the SL retransmission(s) at 346, the method reverts to 342 and the TUE again determines whether it has been able to correctly decode the data in the DL multicast transmission. If not, the TUE may send a NACK message to the CUE(s) at 344 and the method reverts to 346 and the TUE again receives SL retransmission(s) from the CUE(s). The TUE may continue to loop through receiving SL retransmissions at 346, determining whether the data has been correctly decoded at 342, and sending a NACK message at 344 until the TUE determines the data has been correctly decoded at 342 or until some other criteria is met, e.g., a retransmission timer has expired or a predefined number of retransmissions have been received without successfully decoding the date in the DL multicast transmission. If at 342 the TUE determines that the data has been correctly decoded, then the TUE sends an ACK message to the BS and the CUE(s) at 348.

Referring again to FIG. 5B, it can be seen that after receiving the DL multicast from the BS at 330 and determining that an ACK has not been received from the TUE at 332, the CUE retransmits data from the DL multicast transmission using SL transmission at 334. However, a CUE might not always be able to decode an entire data block that it received from the BS. In conventional UE cooperation solutions that utilize a TB based HARQ retransmission scheme, a CUE that does not fully decode the data block that is multicast in the first multicast phase cannot cooperate in the second SL cooperation phase, and therefore cannot help improve reliability of the transmission to the TUE.

Aspects of the present disclosure provide cooperative transmission schemes that allow cooperating UE to cooperate more intelligently and efficiently, rather than simply retransmitting whole transport blocks.

An aspect of the present disclosure relates to a cooperative transmission scheme in which data starts from a first network device, such as a BS or a UE, and is transmitted to a UE that is the target receiver. For simplicity, many of the following examples of cooperative transmission schemes in accordance with the present disclosure are described in the context of cooperative transmission scenarios in which the original transmitter is a BS (or eNB), the target receiver is a UE (or multiple UEs), and some other UE (or UEs) serves as the helper or cooperating device. The receiver UE may be referred to as the target UE (TUE) and the helper or cooperating UE may be referred to as a cooperating UE (CUE). However, embodiments of the cooperative transmission schemes in accordance with the present disclosure are not limited to cooperative transmission scenarios where the original transmission is a DL transmission from a BS. For example, as discussed in further detail below, in some embodiments the cooperative transmission schemes of the present disclosure are applied to SL cooperation transmission scenarios in which the original transmitter is also a UE. In such scenarios, the original transmitter UE may be referred to as a Leader UE (LUE).

Figure 6A:
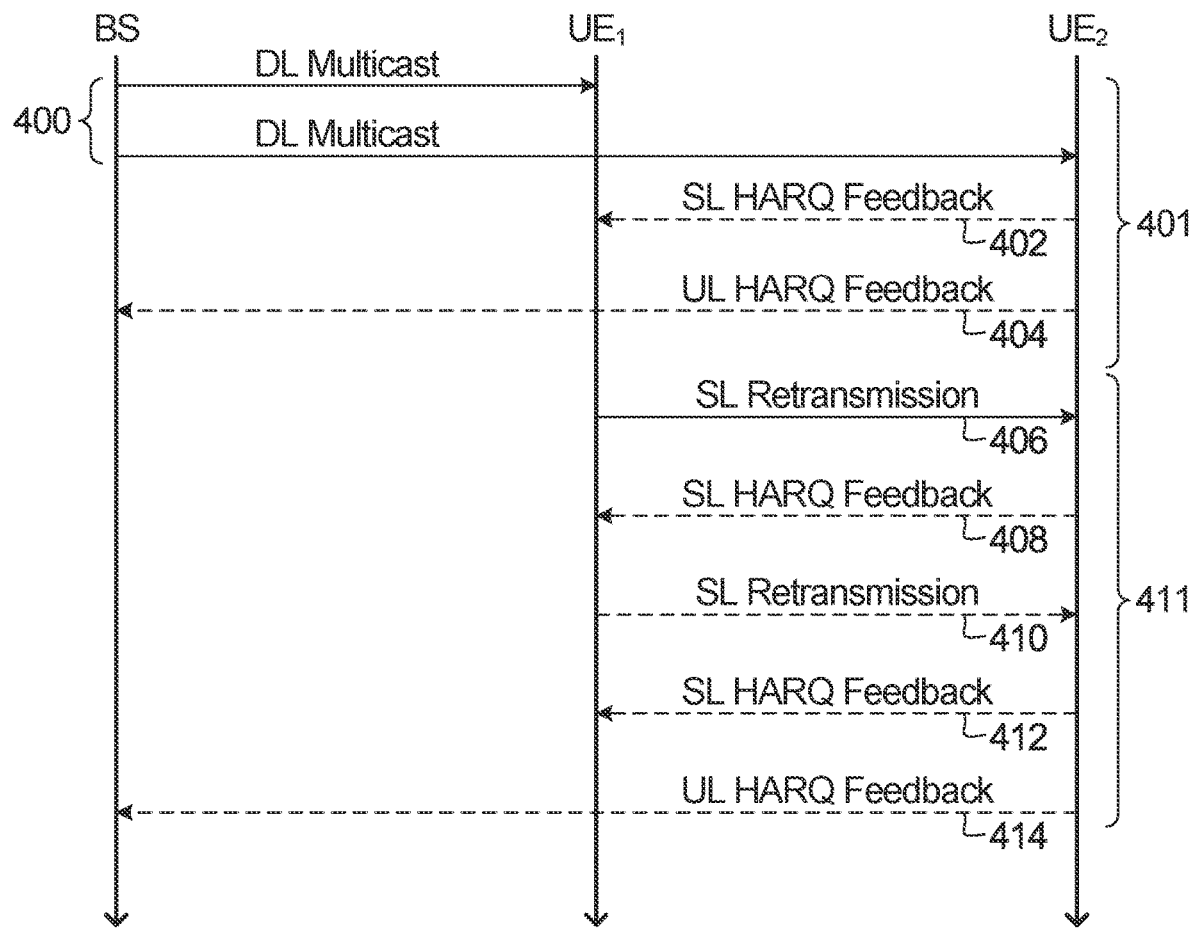
FIG. 6A is a diagram of an example of a cooperative transmission scheme where the original transmitter is a BS.

FIG. 6A shows a diagram of a first example of a cooperative transmission scheme in accordance with an embodiment of the present disclosure in which a BS is the original transmitter, a first UE, $UE_1$, is the CUE and a second UE, $UE_2$, is the TUE. The cooperative transmission scheme shown in FIG. 6A has two phases, a first DL multicast phase 401 and a second cooperating SL cooperation phase 411. As indicated at 400, in the first multicast phase 401, the BS broadcasts data that includes a transport block TB1 to both $UE_1$ and $UE_2$ via DL data channels (e.g., Physical Downlink Shared Channel (PDSCH)). There may be a DL control channel (e.g., Physical Downlink Control Channel (PDCCH)) used to schedule the transmission. The TUE ($UE_2$) may optionally send HARQ feedback to the CUE ($UE_1$) and/or BS, as indicated at 402 and 404 in FIG. 6A. The HARQ feedback may be sent in the same message or, as shown in FIG. 6A, may be sent as separate HARQ feedback messages 402 and 404 to the CUE and to the BS, respectively. Different options for the content of HARQ feedback that may be used in accordance with embodiments of the present disclosure are described in the next section.

If the CUE ($UE_1$) does not receive an ACK of the data block, the CUE can participate in the cooperation phase 411 by resending at least a portion of the data packet that the CUE successfully received from the BS in the first phase 401 through SL transmission to the TUE, as indicated at 406. For example, the SL transmission from $UE_1$ to $UE_2$ at 406 may include at least one code block based on at least one code block group of a transport block in the DL multicast intended for $UE_2$, the at least one code block group including less than all code block groups of the transport block. After retransmission at 406, the TUE may again send HARQ feedback to CUE and/or the BS. For example, in FIG. 6A $UE_2$ sends an SL HARQ feedback message to UE at 408 after the retransmission by $UE_1$ at 406. CUEs may continue retransmission until an ACK of the entire TB is received. For example, $UE_1$ retransmits at 410 based on the lack of an ACK in the SL HARQ feedback message at 408, after which $UE_2$ transmits an ACK to $UE_1$ and the BS via HARQ feedback messages 412 and 414, respectively. If the BS receives an ACK of the TB, e.g., via the UL HARQ feedback message at 414, the BS may start transmission of a new data block (not shown in FIG. 6A). If the BS does not receive an ACK before a predefined timer expires, the BS may start retransmission of the data block or transmit a new data block. Although not shown in FIG. 6A, in some embodiments the BS may also resend data together with the CUE ($UE_1$) in the cooperation phase 411. In some embodiments, the BS also resends data to the TUE if the BS does not receive an ACK from the TUE. The retransmission of the data from the BS to the TUE may be before, after or at the same time as the retransmission by the CUE to the TUE. It is noted that although the example of FIG. 6A only shows one CUE ($UE_1$) and one TUE ($UE_2$), there can be multiple CUEs and/or multiple TUEs in other embodiments.

Figure 6B:
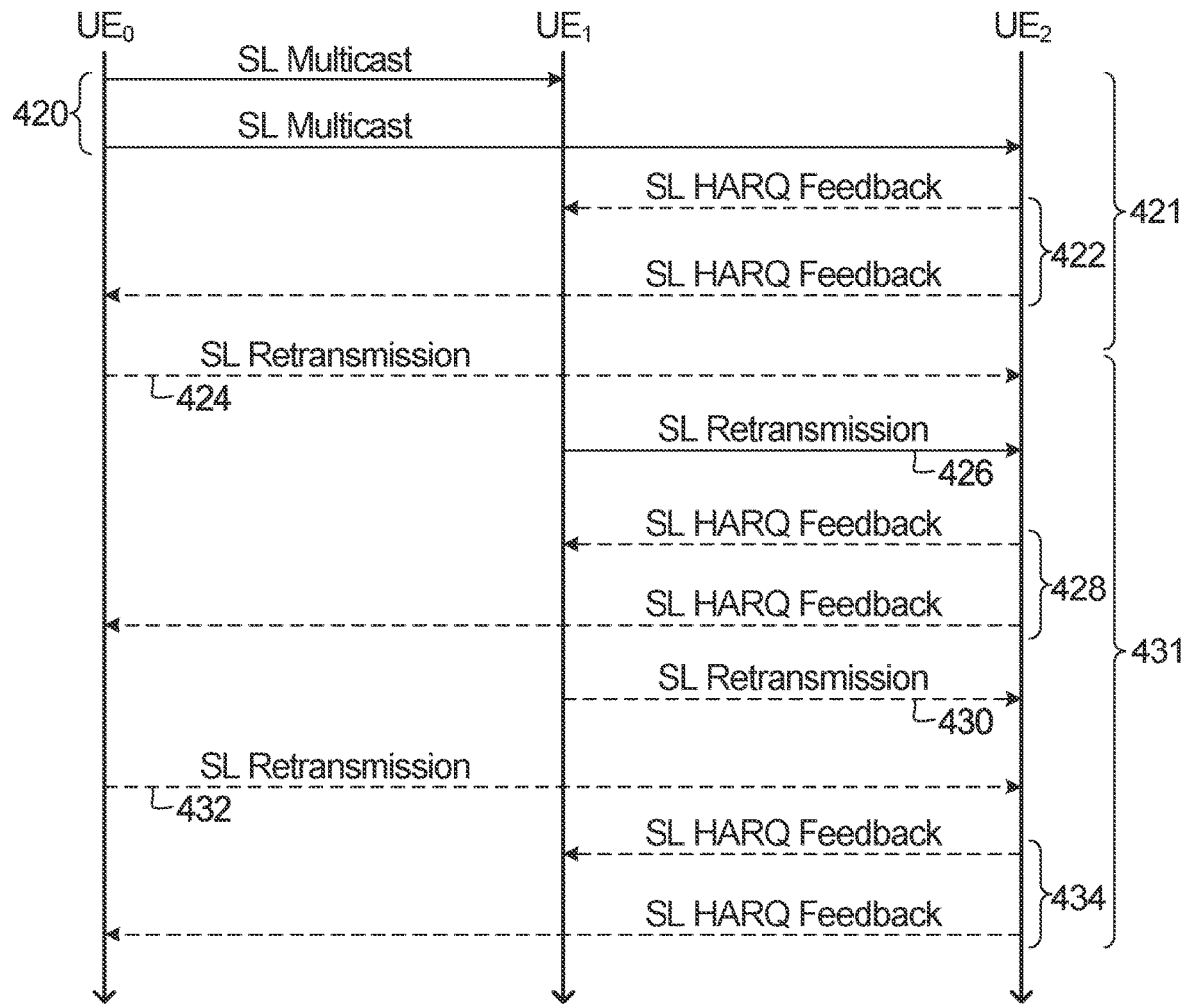
FIG. 6B is a diagram of a first example of a cooperative transmission scheme where the original transmitter is a UE.

FIG. 6B shows a diagram of a second example of a cooperative transmission scheme in accordance with an embodiment of the present disclosure. Similar to the example shown in FIG. 6A, in this example, a first UE, $UE_1$, is the CUE and a second UE, $UE_2$, is the TUE, but in this case the original transmission originates from a third UE, $UE_0$. $UE_0$ may therefore be called a leader UE (LUE). In the example shown in FIG. 6B, the cooperative transmission scheme includes a first SL multicast phase 421 and a second SL cooperation phase 431. In the first SL multicast phase 421, data is transmitted by the LUE ($UE_0$) in a SL channel (SL multicast) instead of DL channels. One of the practical application scenarios for this example is Vehicle Platooning, which enables vehicles travelling together to dynamically form a platoon via SL communication. For example, each of the UEs shown in FIG. 6B, namely $UE_0$, UE and $UE_2$, may be installed in or otherwise associated with a respective vehicle. In such scenarios, all the vehicles in the platoon may obtain information from the leading vehicle associated with $UE_0$ to manage the platoon. This information may allow the vehicles to drive closer to one another in a coordinated manner, going in the same direction and travelling together. For example, the leader vehicle may be sending instruction to all other vehicle to follow the leader vehicle. In the SL multicast phase 421, the TUE ($UE_2$) may optionally send HARQ feedback to the CUE ($UE_1$) and/or the LUE ($UE_0$), as indicated at 422 in FIG. 6B. If the CUE ($UE_1$) does not receive an ACK of the data block, the CUE can participate in the cooperation phase 431 by resending at least a portion of the data packet that the CUE successfully received from the LUE in the first SL multicast phase 421 through SL transmission to the TUE, as indicated at 426. As indicated at 424 in FIG. 6B, in some cases the LUE may also cooperate in the second cooperation phase 431 by sending similar information via SL retransmissions as the CUE. After the SL retransmissions, the TUE may again send HARQ feedback to the CUE and/or the LUE. For example, in FIG. 6B $UE_2$ sends an SL HARQ feedback message to $UE_0$ and $UE_1$ at 428 after the retransmissions by $UE_0$ at 424 and $UE_1$ at 426. LUEs and/or CUEs may continue SL retransmission in the cooperation phase until an ACK of the entire TB is received. For example, as indicated at 432 and 430 in FIG. 6B, $UE_0$ and $UE_1$ retransmit based on the lack of an ACK in the SL HARQ feedback message at 428, after which $UE_2$ again transmits HARQ feedback at 434. If the LUE receives an ACK of the TB, e.g., via the SL HARQ feedback message at 434, the LUE may start transmission of a new data block (not shown in FIG. 6B). If the LUE does not receive an ACK before a predefined timer expires, the LUE may start retransmission of the data block or transmit a new data block. Here again it is noted that although the example of FIG. 6B only shows one CUE ($UE_1$) and one TUE ($UE_2$), there can be multiple CUEs and/or multiple TUEs in other embodiments.

Figure 6C:
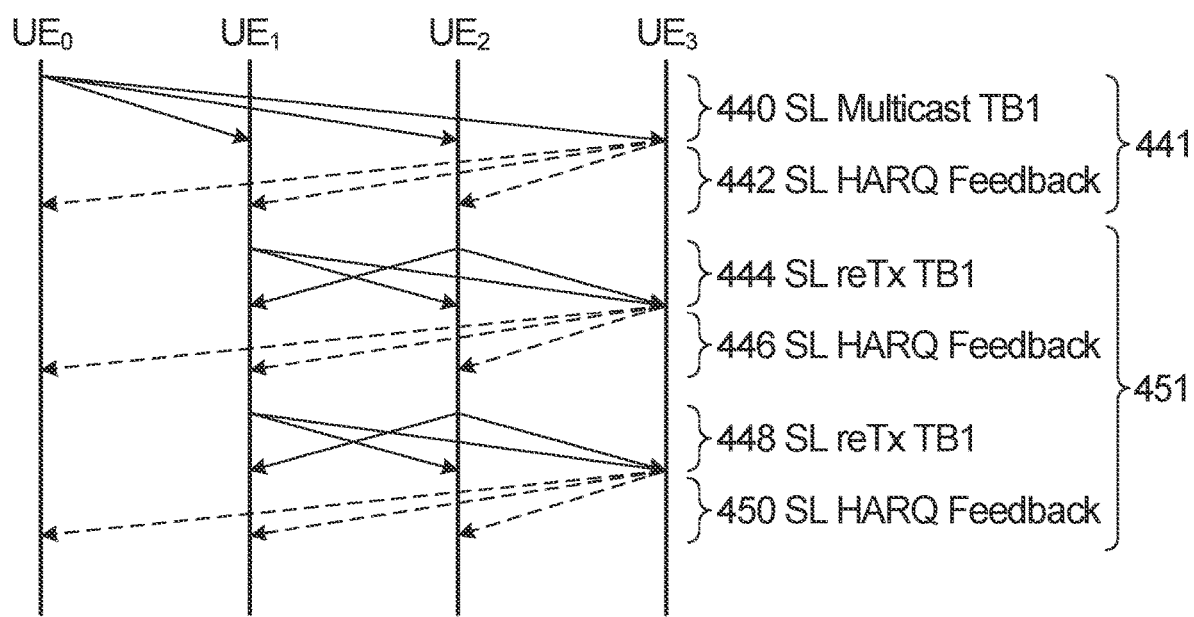
FIG. 6C is a diagram of a second example of a cooperative transmission scheme where the original transmitter is a UE.

FIG. 6C shows a diagram of a second example of a SL cooperative transmission scheme in accordance with an embodiment of the present disclosure. Similar to the example shown in FIG. 6B, the example shown in FIG. 6C includes a first SL multicast phase 441 and a second SL cooperation phase 451. However, in the example shown in FIG. 6C when CUEs cooperate in the cooperation phase 451, rather than only sending retransmissions to the TUE, a CUE can also send retransmissions through sidelink multicast or group cast to other CUEs to help the other CUEs improve their chance of decoding the data transmitted by the original transmitter, e.g., the LUE. One of the practical application scenarios for this example is group multicast where all the UEs are TUEs and they can also act as CUEs to help other TUEs. In such scenarios, each UE in a cooperating group cooperates by multicasting data to all other UEs in the group, and each UE in the group may send HARQ feedback to all other UEs in the group. In the example shown in FIG. 6C, there are four UEs, namely $UE_0$, $UE_1$, $UE_2$ and UEs.

In this example, $UE_0$ is the LUE, and in the first SL multicast phase 441 $UE_0$ multicasts data that includes a first transport block TB1 to the other three UEs as indicated at 440. In this scenario, the data multicast by $UE_0$ at 440 is intended for $UE_3$. In the SL multicast phase 451, $UE_3$ may optionally send HARQ feedback to $UE_0$, $UE_1$ and $UE_2$, as indicated at 442. If the CUEs, e.g., $UE_1$ and $UE_2$ in this scenario, do not receive an ACK of the data block TB1, the CUEs can participate in the cooperation phase 451 by resending at least a portion of the data block that they successfully received from the LUE in the first SL multicast phase 441 through SL transmission to $UE_3$ as well as to each other, as indicated at 444. Although not shown in FIG. 6C, in some cases the LUE ($UE_0$) may also cooperate in the second cooperation phase 451 by sending similar information via SL retransmissions as the CUEs ($UE_1$ and $UE_2$). After the SL retransmissions at 444, $UE_3$ may again send HARQ feedback to the CUE and/or the LUE. For example, in FIG. 6C $UE_3$ sends an SL HARQ feedback message to $UE_0$, $UE_1$ and $UE_2$ at 446. LUEs and/or CUEs may continue SL retransmission in the cooperation phase 451 until an ACK of the entire TB is received from $UE_3$. For example, as indicated at 448 in FIG. 6C, UE and $UE_2$ retransmit based on the lack of an ACK in the SL HARQ feedback message at 446, after which $UE_3$ may again transmit HARQ feedback, as indicated at 450. If the LUE receives an ACK of the TB, e.g., via the SL HARQ feedback message at 450, the LUE may start transmission of a new data block (not shown in FIG. 6B). If the LUE does not receive an ACK before a predefined timer expires, the LUE may start retransmission of the data block or transmit a new data block.

In the foregoing examples, SL transmission between UEs are utilized for HARQ retransmissions of downlink transmissions or sidelink transmissions. In some embodiments, SL transmission between UEs may be utilized to help with HARQ retransmissions of uplink transmissions, i.e., for transmissions from a UE to a BS. In such embodiments, the initial transmitter is a UE, the targeted receiver is the BS, and one or more other UEs act as CUEs to help with transmission from the transmitter UE to the BS. In the first multicast phase, the transmitter UE sends the data to the BS and the CUEs using UL transmission and SL transmission, respectively. In the second cooperation phase, the CUE retransmits the UL transmission to the BS. All the UE cooperation methodologies described in this disclosure can be applicable to this UL transmission scenario as well.

Sidelink HARQ Feedback

There may be different types of HARQ feedback that a TUE may send to CUEs, the LUE and/or a BS. Based on these different types of feedback, CUEs may choose different cooperation schemes for the SL retransmission in the cooperation phase. For example, instead of sending a simple ACK/NACK for an entire TB, SL HARQ feedback that is sent in accordance with the present disclosure may include CBG level feedback information or CB level feedback information for more efficient SL retransmission. This section of the present disclosure describes several types of HARQ feedback that may be employed in embodiments of the present disclosure. A detailed description of the various feedback options and embodiments of cooperative transmission schemes based on the various feedback options are described in more detail in the next section.

In one scenario, a TUE does not send SL HARQ feedback. In such a scenario where there is no SL HARQ feedback, a CUE may choose to cooperate in the cooperation phase by sending a predefined number of retransmissions.

In scenarios where some form of SL HARQ feedback is sent, there are a number of options for the form and content of the feedback. Four example types of SL HARQ feedback are outlined below. These four types of SL HARQ feedback are referred to herein as Types 1 to 4.

Type 1 HARQ feedback is a simple ACK/NACK feedback, which indicates whether the whole data block (or TB) is decoded successfully or not.

Type 2 feedback includes information indicating which CBGs or CBs of a TB are decoded successfully. An example of Type 2 HARQ feedback that provides CBG level feedback is a CBG ACK/NACK bit map, in which each bit represents whether a corresponding CBG is decoded successfully or not. For example, if there are m CBGs per TB, such feedback may utilize a bit map with at least m bits. Similarly, a CB level ACK/NACK bit map can be applied to provide CB level feedback.

Type 3 HARQ feedback includes information indicating how many CBs (or CBGs) of a TB are decoded successfully, but it does not include information identifying the CB(s)/CBG(s) that are successfully decoded or that failed decoding. For example, Type 3 HARQ feedback may include information indicating that N CBGs of a TB that includes m CBGs, N≤m, failed to decode successfully, but does not include information indicating the specific CBG indexes of the failed CBGs. If a TB contains p CBs, such feedback requires $\log_2 p$ bits, which is less than the number of bits that would be required for Type 2 CB level feedback that includes information identifying the CB index of the CBs for which decoding succeeded or failed.

Type 4 HARQ feedback can be considered a hybrid of Type 2 and Type 3 feedback, in that it combines features of the two. In one form of Type 4 feedback, the feedback includes information identifying the number of non-successfully decoded CBs in each CBG of a TB. In another form of such feedback, the feedback includes information indicating, for each CBG of a TB, whether the CBG is decoded successfully (similar to Type 2 feedback), and the maximum number of CBs that are not decoded in any CBG of the TB. This type of feedback requires less overhead, in terms of bits required to convey the feedback information, than indicating the number of non-successfully decoded CBs for all CBGs of the TB.

As noted above, aspects of the present disclosure provide different UE cooperating schemes that, broadly speaking, fall into one of two different categories and are based on different HARQ feedback types, such as the various HARQ feedback types described above. The first category is CBG or CB based UE cooperation without outer coding, and the second category is outer code based, where CUE may transmit data using an outer code applied to the data block or selected CBGs of the data received from the from the first multicast phase.

The next section of the present disclosure describes aspects and considerations related to the first category of UE cooperating schemes in accordance with the present disclosure. The subsequent section then provides a similarly detailed description of the second category.

CBG/CB Based UE Cooperation

In the first category, CUEs in the cooperation phase send a selected number of CBGs or CBs to the TUE. The CBGs or CBs that the CUE sends to the TUE may be only a portion of the TB that the CUE received from the original transmitter in the first phase. Which CBGs/CBs the CUE sends to the TUE via SL retransmission may depend on HARQ feedback from the TUE and/or which CB/CBGs are successfully decoded by the CUE in the first phase.

For example, if the HARQ feedback sent by the TUE is the Type 2 HARQ feedback described above, which indicates which CBGs/CBs of the TB transmitted by the original transmitter have been successfully decoded by the TUE, the CUE may cooperate in one of the following ways:

If the CUE has successfully decoded all of the CBs of the TB, the CUE may retransmit all the CBGs/CBs that the TUE has not successfully decoded based on the HARQ feedback from the TUE.

If the CUE does not successfully decode all of the CBs of the TB, the CUE may still cooperate by sending the CBGs/CBs the CUE successfully decoded among the CBGs/CBs that the TUE has not successfully decoded based on the HARQ feedback from the TUE.

If the CUE does not successfully decode any CBG/CB that the TUE has not decoded successfully based on the HARQ feedback, the CUE does not cooperate.

In this first category of UE cooperative transmission schemes in accordance with the present disclosure, when a CUE retransmits the CBGs/CBs via SL transmission, the CUE may use the same redundancy version (RV) or a different RV. In the SL transmission, the CUE may also send SL control information (SCI) in a SL control channel so that the TUE can determine:

i)) which CUE is transmitting the message;

ii) which UE (the TUE) is targeted as the destination of the message; and iii) the resource and parameters to be used for the SL transmission.

For example, the SCI may include information indicating an identifier (ID) associated with the CUE, an ID associated with the TUE, and information that can be used by the TUE to determine the resource and parameters to be used for the SL transmission. When CBG/CB level retransmission is used, the SCI sent by the CUE in the SL control channel may also include the CBG or CB index of the CBG(s) or CB(s) that the CUE retransmits. That way, when the TUE decodes the SCI, it knows which CBGs/CBs are sent by the CUE, which may facilitate the TUE's decoding process for the SL retransmission from the CUE.

Figure 7:
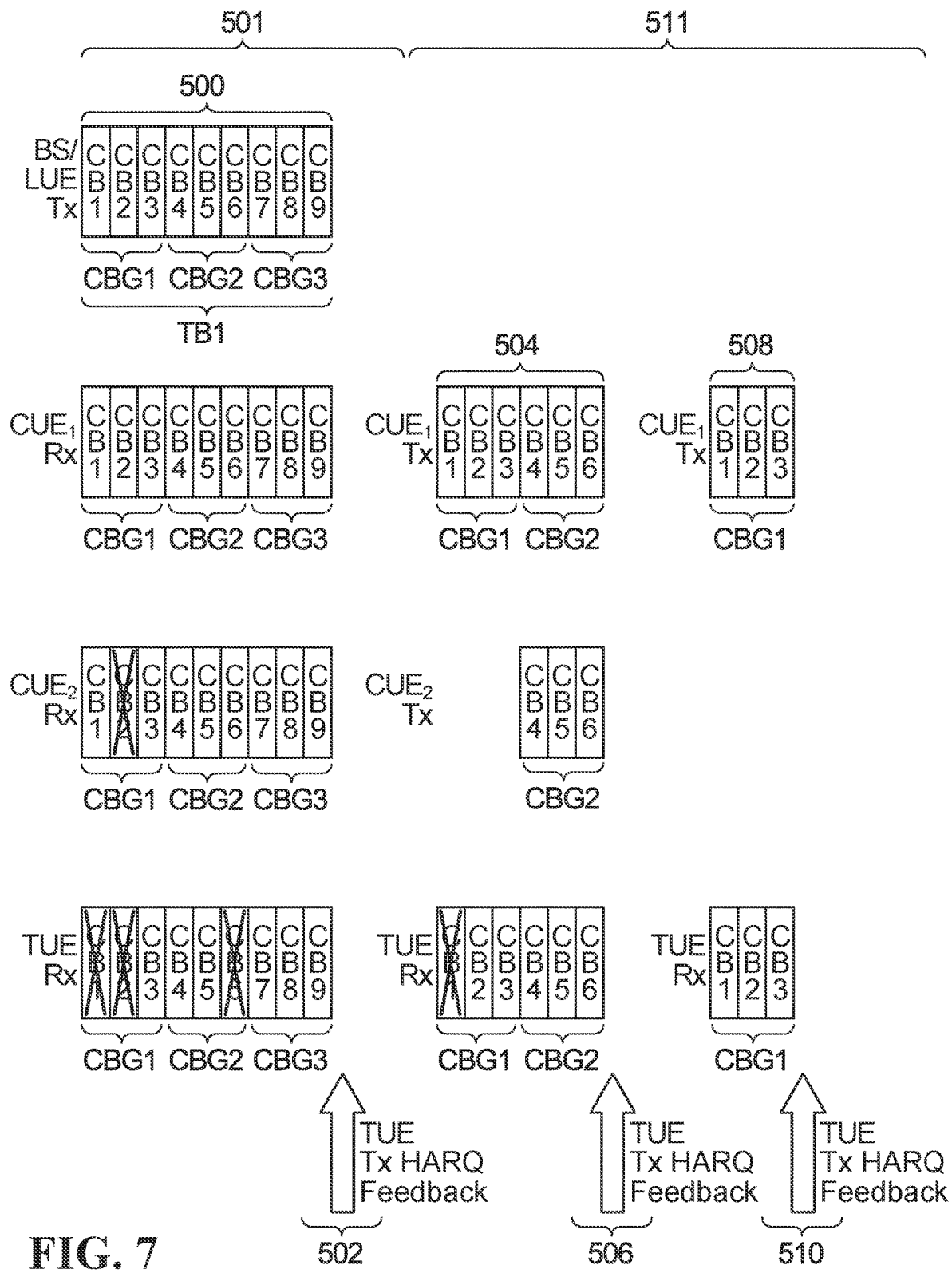
FIG. 7 is a diagram of an example of a UE cooperative transmission scheme in accordance with a first category of UE cooperative transmission schemes that employ code block or code block group level retransmission.

FIG. 7 is a diagram showing an example of a UE cooperative transmission scheme in accordance with the first category, in which the original transmitter is a BS or LUE, and there are two CUEs, $CUE_1$ and $CUE_2$, and one TUE. The cooperative transmission scheme shown in FIG. 7 has two phases, a first multicast phase 501 and a second cooperating SL cooperation phase 511. As indicated at 500, in the first multicast phase 501, the BS or LUE multicasts a data block that includes a transport block TB1 to $CUE_1$, $CUE_2$, and the TUE via DL or SL transmission broadcasts.

The transport block TB1 transmitted in the first phase 501 contains 9 CBs, identified as CB1 to CB9, respectively. The nine CBs of TB1 are grouped into three CBGs, identified as CBG1, CBG2 and CBG3, respectively, such that CBG1 includes CB1, CB2 and CB3; CBG2 includes CB4, CB5 and CB6; and CBG3 includes CB7, CB8 and CB9.

In this example, $CUE_1$ successfully decoded all the CBs in the data block TB1. $CUE_2$ successfully decoded all CBs in TB1 except CB2, which belongs to CBG1. The TUE successfully decoded all CBs in TB1 except CB1 and CB2 of CBG1 and CB6 of CBG2.

After the first transmission, the TUE sends HARQ feedback (e.g., Type 2 HARQ feedback) at 502 indicating that CBG1 and CBG2 are not successfully decoded and CBG3 was successfully decoded. For example, in the case of a CBG bitmap type feedback, the feedback may simply be three bits "001", where each bit corresponds to one of the CBGs CBG1, CBG2 and CBG3 of TB1. In the cooperation phase 511, based on the HARQ feedback from the TUE, the CUEs retransmit to the TUE at least a portion of the TB1 that they were able to successfully decode from the BS's or LUE's initial transmission in the multicast phase 501. In particular, as indicated at 504 in FIG. 7, $CUE_1$ retransmits all the CBs in CBG1 and CBG2. $CUE_2$ retransmits all the CBs in CBG2, and does not retransmit the CBs in CBG1 because it did not decode CBG1 correctly. The TUE may again fail to decode one or more CBs in either CBG1 or CBG2. For example, in FIG. 7 the TUE fails to successfully decode CB1 in CGB1 even after the retransmissions at 504, and therefore the TUE sends further HARQ feedback at 506 indicating CBG2 is successfully decoded after the first retransmission but CBG1 still failed. After receiving the second HARQ feedback, CUE retransmits all the CBs in CBG1 at 508. In this scenario, $CUE_2$ does not retransmit at 508 because it did not successfully decode CBG1.

After the second retransmission at 508, if the TUE correctly decodes CBG1, the TUE may send another HARQ feedback message indicating CBG1 is successfully decoded, as indicated at 510 in FIG. 7. After receiving the further HARQ feedback message indicating CBG1 is successfully decoded, $CUE_1$ does not perform any further retransmissions. It is noted that when decoding different CBs, the TUE may combine the CBs received from different transmitters (different CUEs and BS or LUE) and the CBs received at different times. For example, when decoding CB1, the TUE may combine the CB1 received as part of the initial transmission from the BS or LUE at 500, the CB1 transmitted as part of CUE's retransmission at 504 and the CB1 transmitted as part of $CUE_1$'s retransmission at 508.

A CBG/CB level UE cooperation scheme, such as the one shown in FIG. 7, can significantly reduce unnecessary retransmission/cooperation and improve efficiency, because each CUE may only retransmit those CBGs/CBs that were not decoded by TUE but were decoded by the CUE. By not retransmitting all CBGs/CBs of the TB regardless of whether or not one or more of them may have been successfully decoded by the TUE, the amount of data that is retransmitted unnecessarily may be reduced, especially in situations when there are multiple CUEs available.

The CBG/CB level UE cooperation scheme also enables a CUE to cooperate even if it does not decode the entire TB, whereas in a conventional TB level retransmission scheme a CUE that does not decode the whole TB cannot cooperate.

The CBG/CB level UE cooperation scheme also enables distributed cooperation where each CUE can cooperate based on its own decoding results and SL HARQ feedback from the TUE, without needing a BS to schedule the retransmission.

Outer Coding Based UE Cooperation

In the second category of UE cooperating schemes of the present disclosure, rather than sending selected CBGs/CBs or the entire TB (possibly with different RVs) during the cooperation phase, CUEs instead send an outer coded version of selected CBGs or the entire TB. The outer code can further reduce the amount of retransmission data for more efficient cooperation.

Some general background on the concepts of inner and outer coding is provided below, after which outer coding and examples of its use in the context of the second category of UE cooperating schemes of the present disclosure will be described.

When a first network device, such as a BS or UE, has data to transmit to a second network device in the form of a plurality of bits, the first network device will first partition the plurality of bits into a plurality of chunks. Each chunk is referred to as an information code block (CB). A TB may be partitioned into the plurality of information CBs, or the plurality of information CBs may be mapped to one or more TBs for transmission, depending upon the implementation. In some cases, the plurality of information CBs may be grouped into a plurality of CBGs, as discussed previously. In some embodiments, a cyclic redundancy check (CRC) for the TB may be first appended to the TB before segmentation of the TB to different CBs. The first network device appends a CRC check to each information CB and then encodes each information CB using a channel code to obtain an encoded information CB. The channel code used is implementation specific and different channel codes may be applied to different information CBs. Examples of channel codes that may be used include polar codes, turbo codes, and low-density parity-check (LDPC) codes. The encoding of individual CBs is referred to as "inner coding" or "applying an inner code".

Figure 8:
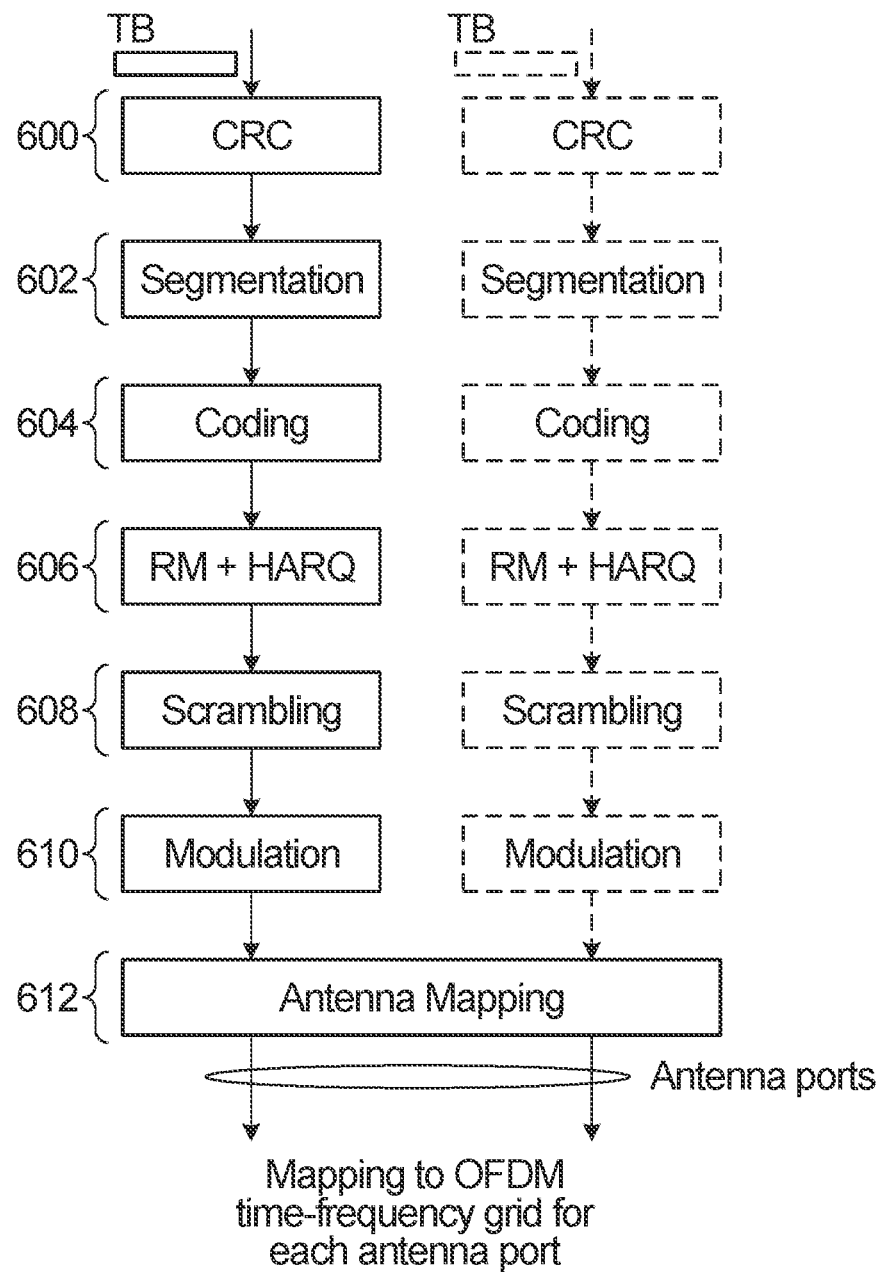
FIG. 8 is a block diagram of an example of physical layer processing.

FIG. 8 illustrates an example of physical layer processing that may be performed by a transmitting network device, e.g. a BS or a UE. The blocks in stippled lines indicate that they are optional. CRC is inserted into each TB at 600, followed by code-block segmentation at 602, including possible per-code-block CRC insertion. Channel coding is then performed at 604. Rate matching and physical layer HARQ functionality is then performed at 606, followed by bit level scrambling at 608, data modulation at 610, and antenna mapping at 612. In the example illustrated in FIG. 8, there are eight antenna ports. In some embodiments, the antenna mapping at 612 includes mapping to an OFDM time-frequency grid for each antenna port.

Figure 9:
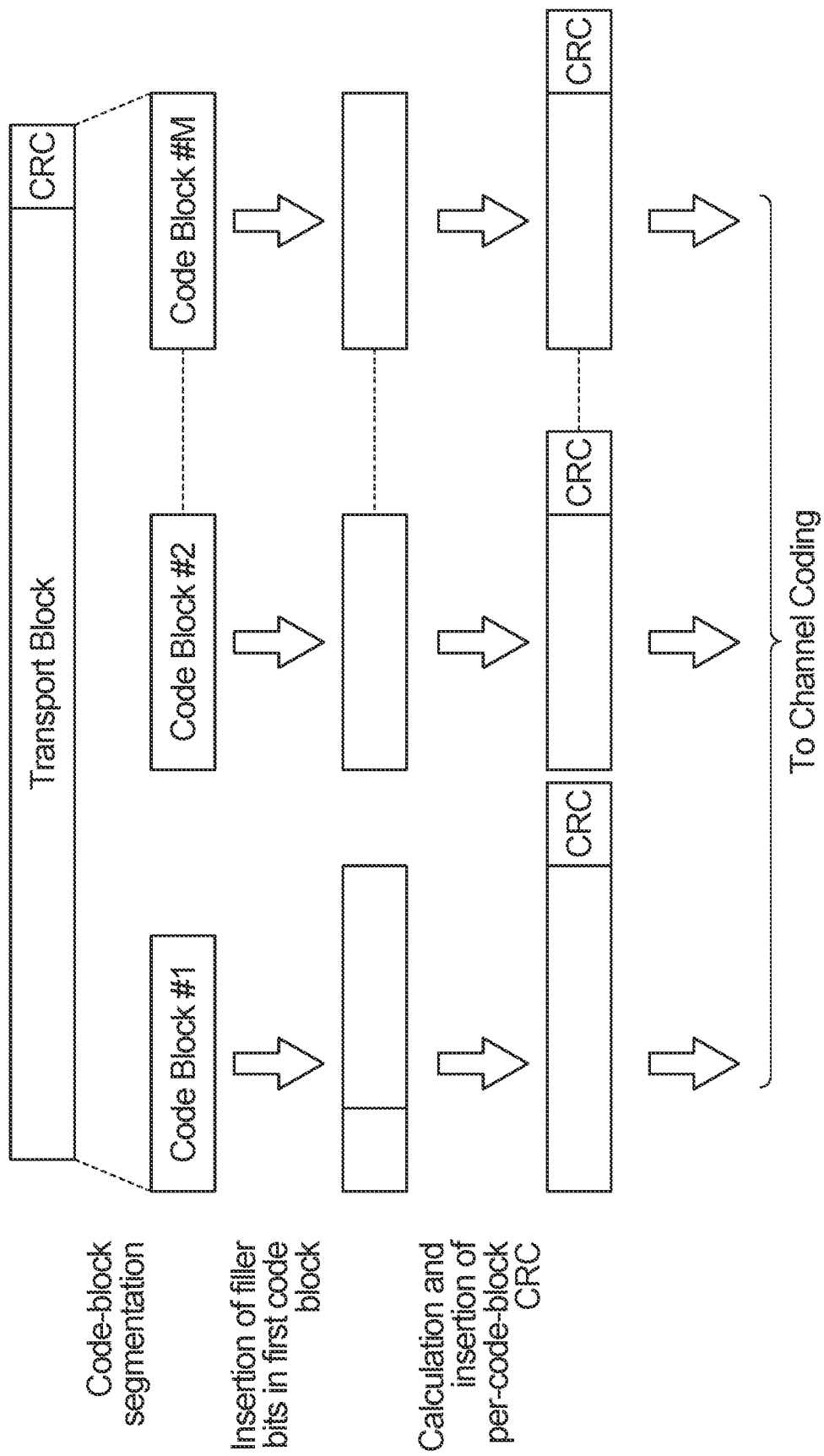
FIG. 9 is one example of code-block segmentation.

FIG. 9 illustrates one example of code-block segmentation in more detail. A TB is segmented into M code blocks. Filler bits are optionally inserted into the first code block, as needed, to ensure proper code block size. An additional CRC is calculated for and appended to each code block. Each code block then undergoes the channel coding. The channel coding applies an inner code, which is different from, and in addition to, the outer coding described below.

Note that "outer code" and "inner code" refer to concatenating two codes together. When concatenating two codes, the information bits are first encoded by the outer code, the output of outer code is then encoded by the inner code. The output of the inner code is then transmitted through the wireless channel. The second network device that receives the transmission first decodes the inner code, e.g., using an inner code decoder, and the output from the inner decoding is then outer decoded to decode the information bits, e.g., using an outer code decoder. In the decoding process, the inner code is first decoded for each CB to obtain information bits of each CB, and then the CRC of each CB can be used to check whether the CB is decoded correctly or not. Then the outer coding, if used, may be further decoded to recover any failed CBs using the output CBs of inner code.

Figure 10:
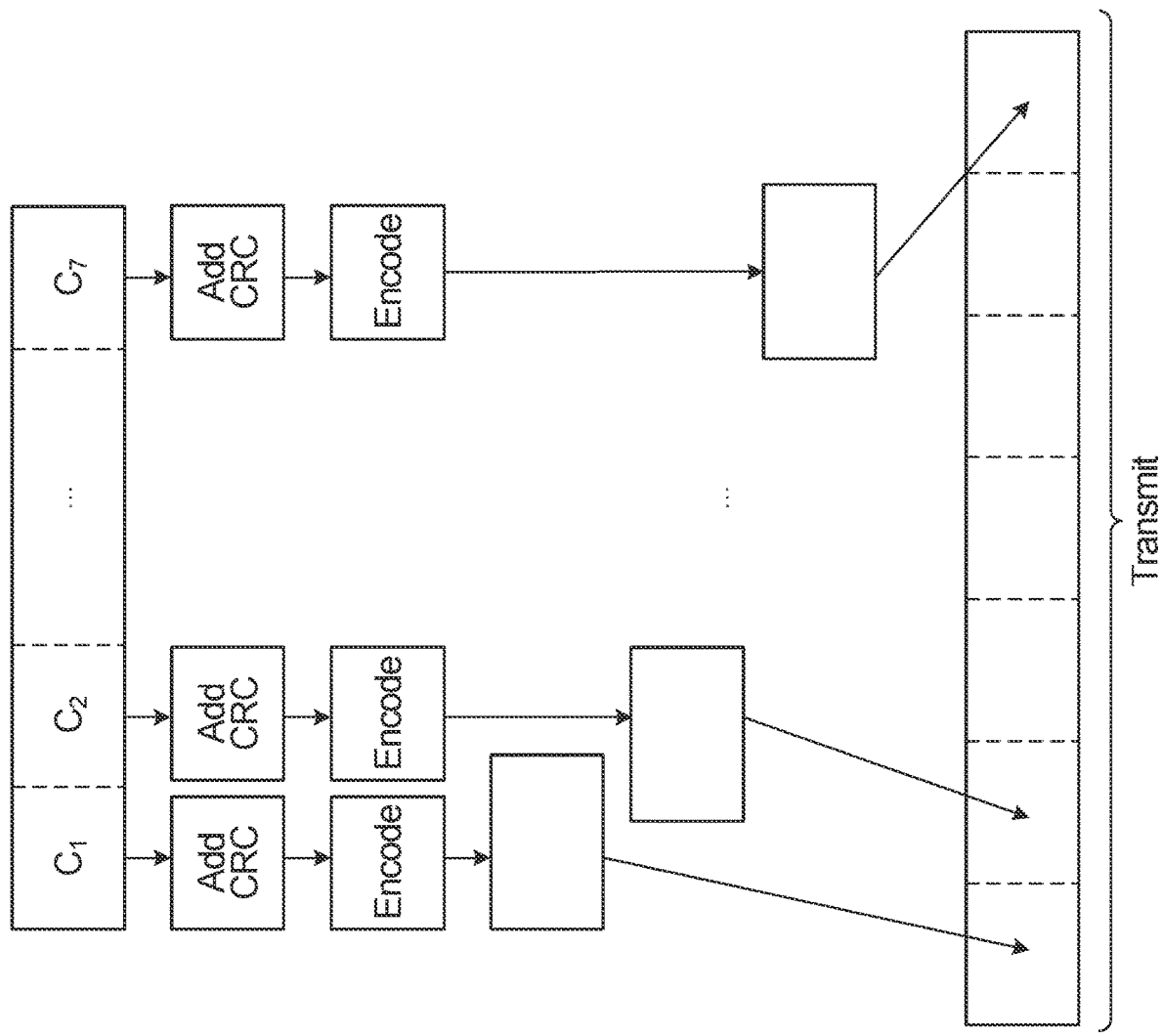
FIG. 10 illustrates an example of inner coding.

An example of inner coding is illustrated in FIG. 10. Seven information CBs are to be transmitted, labelled $C_1$ to $C_7$. The notation $C_i$ is used herein to refer to an i-th CB that carries information. Information CBs are distinct from parity CBs, as will be described later. Parity CBs are CBs that are used to transmit parity information generated as part of an outer code.

In the method illustrated in FIG. 10, each information CB has a CRC appended to it and is then encoded by a channel code as the inner code. The encoded output is then transmitted over the wireless channel by the transmitting network device.

The 3rd Generation Partnership Project (3GPP) release 15 specification for 5G New Radio (NR) supports eMBB and URLLC multiplexing where pre-emption of an eMBB signal may happen when a more urgent URLLC traffic arrives for transmission. The dynamic multiplexing of eMBB and URLLC services can use both FDM and TDM over the system bandwidth. In order to support dynamic multiplexing between eMBB and URLLC, a bursty puncturing/error recovery scheme may be used to recover the punctured part of eMBB that is punctured for URLLC multiplexing. In such a scenario, the CB corresponding to the pre-empting signal might not be known to the receiver, thus HARQ combining based on soft combining might not work in this situation.

Figure 11:
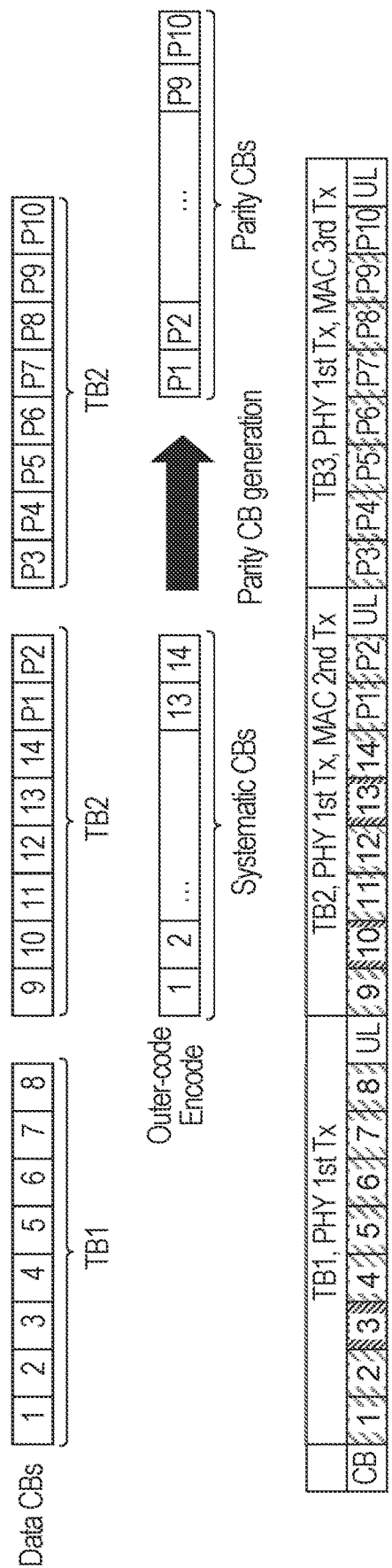
FIG. 11 illustrates an outer code based on HARQ feedback.

One technique to solve the bursty puncturing/error recovery scheme adopts an outer erasure code (herein called an outer code) to do retransmission, which is shown in FIG. 11. In the example, code blocks (CBs) 3, 10, and 13 are not correctly decoded. After receiving a HARQ request, instead of retransmitting redundant versions for CB 1-14, the transmitter transmits the outer code parity check CBs (PCBs) P1-P10. If more than three PCBs can be correctly received, then from the CB {1-2, 4-8, 9, 11-12, 14}, and the correctly received PCBs, the receiver will be able to recover all the desired CBs 1-14.

A potential advantage of this approach is that the receiver does not need to tell the transmitter which CB(s) were not successfully decoded, and the CBs are still able to share the same HARQ process. In other words, the transmitter simply transmits the PCB(s) after knowing that the TB was not successfully decoded. The receiver will be able to recover the unsuccessfully decoded CBs, by knowing which CBs were unsuccessfully decoded, and by using the newly received PCB(s).

One application of outer codes is in puncturing an eMBB TB with URLLC signals, when the eMBB receiver does not know that the URLLC signals were actually not intended for the eMBB receiver. In that case, decoding the eMBB TB will fail, because combining redundant versions of the received CBs with the CBs that are not intended for the receiver (and hence are interferences in this sense) will not succeed in recovering the original eMBB data. In that case, outer codes could be especially useful.

A single parity check CB has previously been proposed as a redundant version of outer codes. The single parity check CB is encoded across all data code blocks of a TB and generates a parity code block which could protect data code blocks from bursty interference and/or puncturing. One key here is that each CB is protected by PHY coding (LDPC/Turbo/Polar) and some error detection overhead such as CRC (as needed). Whenever one CB decoding fails, these bits are treated as known to be erased instead of code bit errors that are unknown. Based on the PHY coding/CRC, which marks the erased CB location, erasure decoding could be used to recover these failed CBs.

Encoding of single parity check code, according to an embodiment, is described below.

In a parity check code block scheme, assuming that a TB is divided into m CBs of equal length k, the $i^{th}$ CB is denoted as $\{c_{i,0}, c_{i,1}, \ldots c_{i,k-1}\}$. The PCB $\{p_{1,0}, p_{1,1}, \ldots, p_{1,k-1}\}$ is obtained as $$p_{1,l} = c_{1,l} \oplus c_{2,l} \oplus \ldots \oplus c_{m,l}, \quad \text{(Equation 1)}$$

where $\oplus$ indicates an XOR operation. The PCB $\{p_{1,0}, p_{1,1}, \ldots, p_{1,k-1}\}$ is then FEC encoded and transmitted. For example, the FEC can be LDPC, Turbo or Polar. The receiver receives the FEC coded PCB $\{p_{1,0}, p_{1,1}, \ldots, p_{1,k-1}\}$, and decodes it. If the $i^{th}$ CB is not successfully decoded, but $\{p_{1,0}, p_{1,1}, \ldots, p_{1,k-1}\}$ is correctly received, the $i^{th}$ CB can be recovered as $$c_{i,l} = c_{1,l} \oplus c_{2,l} \oplus \ldots \oplus c_{i-1,l} \oplus c_{i+1,l} \oplus \ldots \oplus c_{m,l} \oplus p_{i,l}, \quad \text{(Equation 2)}$$

The above single parity check code method is performed with a simple XOR operation. However, there is a limitation that a parity check CB can only provide for error correction of one additional CB, which sometimes might not be enough. For example, if 2 CBs in a TB are unsuccessfully decoded, the 2 CBs cannot be correctly decoded using the single parity check code method. In this situation, other outer erasure codes, for example Hamming codes, could correct up to 2 CB erasures.

In addition to a parity check CB, a Reed-Solomon code could also be used as an outer code. The Reed-Solomon code has a shortcoming in that it needs to know in advance how many redundant versions need to be transmitted, and in addition, the Reed-Solomon code has a limitation in code parameters, e.g. its block length $n=p^m-1$, where p is a prime number, and m is an integer. Also, shortened Reed-Solomon codes are usually less efficient than parity check codes.

In order to address the problem of unsuccessfully decoding CBs, U.S. patent application Ser. No. 15/718,523, filed Sep. 28, 2017, entitled "Systems and Methods for Outer Coding", the entire contents of which is hereby incorporated by reference in its entirety, discloses a method which uses a shifted version of parity check CB as outer codes, in which the first data retransmission uses the single parity check CB, and the second data retransmission uses a shifted parity check CB. The receiver can correctly decode the CBs, and also decoding using more than one parity check CB can be done with reduced complexity. The technique can be used to correct two parity check CBs. In addition, the transmitter does not need to know in advance how many PCBs are needed, which means the transmitter can retransmit as needed.

U.S. Provisional Patent Application Ser. No. 62/657,611, filed Apr. 13, 2018, entitled "Systems and Methods for HARQ Retransmission Using an Outer Code", the entire content of which is hereby incorporated by reference in its entirety, discloses a cyclic shift based outer code which can correct an arbitrary number of failed CBs.

In this technique, the encoder of a first transmitting network device, such as a BS or UE, may need to compute N parity CBs for an outer code applied to m information CBs. The decoder of a second receiving network device may need to use the received and correctly decoded N parity CBs to recover up to N failed information CBs, where m and N are both positive integers greater than zero and $1 \leq N \leq m$. The generation of N parity CBs by the encoder of a first network device, and the recovery of N failed information CBs by the decoder of a second network device, in accordance with this technique are explained below with reference to a simple example. In the example, m=4, k=5, and N=3, where m is the number of CBs in a TB, k is the number of bits in a CB, and N is the number of parity CBs. In some embodiments, k is a prime number so that there are no repeated patterns with the cyclic shift design described below. In the embodiments described below, the number of bits in each CB is assumed to be the same. However, the embodiments can be easily extended to the case where the number of bits in different CBs are different. For example, the encoder can pad some CBs with unused or predetermined bits to make the total number of bits in different CBs equal. Also, without loss of generality, in the example information CBs $C_1$, $C_2$, and $C_3$ fail, none of the three parity CBs $P_1$, $P_2$, and $P_3$ fail, and the three parity CBs $P_1$, $P_2$, and $P_3$ are used to recover the three failed information CBs $C_1$, $C_2$, and $C_3$. FIG. 11A illustrates the information and parity CBs of the example.

In one embodiment, the encoder of the first transmitting network device computes each parity CB $P_j$, $1 \leq j \leq N$ as follows:

$$P_j = C_1^{(0)} \oplus C_2^{((j-1)*1)} \ldots \oplus C_i^{((j-1)*(i-1))} \ldots \oplus C_m^{((j-1)*(m-1))} = \Sigma_{i=1}^m C_i^{((j-1)*(i-1))} \quad \text{(Equation 3)}.$$

The notation $C_i^{(x)}$ is used herein to designate a CB $C_i$ that undergoes a left cyclic shift by x elements. In the following, we also refer to x as the cyclic shift value. For example, $C_1^{(0)} = C_1 = \{C_{1,0}, C_{1,1}, C_{1,2}, C_{1,3}, \ldots, C_{1,k-1}\}$, $C_1^{(1)} = \{C_{1,1}, C_{1,2}, C_{1,3}, \ldots, C_{1,k-1}, C_{1,0}\}$, $C_1^{(2)} = \{C_{1,2}, C_{1,3}, \ldots, C_{i,k-1}, C_{1,0}, C_{1,1}\}$, etc. The element $C_{i,l}$, where $0 \leq l \leq k-1$, refers to the l-th element of $C_i$. $C_{i,l}^{(x)}$ refers to the $l^{th}$ element of $C_i$ after $C_i$ undergoes a left cyclic shift by x elements. This can be expressed as $C_{i,l}^{(x)} = C_{i,(l+x) \bmod k}$, where mod is the modular operation. Note that if x=0 then there is no cyclic shift, i.e. $C_i^{(0)} = C_i$. Also, although not explicitly indicated in the notation, any cyclic shift is mod k, i.e. $C_i^{(x)}$ is equal to $C_i^{(x \bmod k) \bmod k}$. For example, if k=5 and x=6, then $C_i^{(6)} = C_i^{(1)}$. The symbol $\oplus$ used herein represents the XOR operation. The symbol $\Sigma$ used herein refers to an XOR summation. The XOR of two CBs is implemented by XORing the two CBs on an element-by-element basis. That is, if $C_a = \{C_{a,0}, C_{a,1}, \ldots, C_{a,k-1}\}$ and $C_b = \{C_{b,0}, C_{b,1}, \ldots, C_{b,k-1}\}$, then $C_a \oplus C_b = \{C_{a,0} \oplus C_{b,0}, C_{a,1} \oplus C_{b,1}, \ldots, C_{a,k-1} \oplus C_{b,k-1}\}$. Therefore, each element $P_{j,l}$ of parity CB $P_j$ ($1 \leq j \leq N$, $0 \leq l \leq k-1$) is computed by encoder 310 as:

$$P_{j,l} = C_{1,l}^{(0)} \oplus C_{2,l}^{((j-1)*)} \ldots \oplus C_{i,l}^{((j-1)*(i-1))} \ldots \oplus C_{m,l}^{((j-1)*(m-1))} = \Sigma_{i=1}^m C_{i,l}^{((j-1)*(i-1))} \quad \text{(Equation 4)}.$$

Referring to the example introduced earlier in relation to FIG. 12A, the three parity CBs $P_1$, $P_2$, and $P_3$ are computed as follows using Equation 3:

$$P_1 = \sum_{i=1}^{4} C_i^{((1-1)*(i-1))} = C_1 \oplus C_2 \oplus C_3 \oplus C_4$$

$$P_2 = \sum_{i=1}^{4} C_i^{((2-1)*(i-1))} = C_1 \oplus C_2^{(1)} \oplus C_3^{(2)} \oplus C_4^{(3)}$$

$$P_3 = \sum_{i=1}^{4} C_i^{((3-1)*(i-1))} = C_1 \oplus C_2^{(2)} \oplus C_3^{(4)} \oplus C_4^{(6)}$$

Note that $C_4^{(6)} = C_4^{(1)}$ because k=5

On an element-by-element basis, the computations are:

$P_{1,0} = C_{1,0} \oplus C_{2,0} \oplus C_{3,0} \oplus C_{4,0}$; $P_{2,0} = C_{1,0} \oplus C_{2,1} \oplus C_{3,2} \oplus C_{4,3}$; $P_{3,0} = C_{1,0} \oplus C_{2,2} \oplus C_{3,4} \oplus C_{4,1}$
$P_{1,1} = C_{1,1} \oplus C_{2,1} \oplus C_{3,1} \oplus C_{4,1}$; $P_{2,1} = C_{1,1} \oplus C_{2,2} \oplus C_{3,3} \oplus C_{4,4}$; $P_{3,1} = C_{1,1} \oplus C_{2,3} \oplus C_{3,0} \oplus C_{4,2}$
$P_{1,2} = C_{1,2} \oplus C_{2,2} \oplus C_{3,2} \oplus C_{4,2}$; $P_{2,2} = C_{1,2} \oplus C_{2,3} \oplus C_{3,4} \oplus C_{4,0}$; $P_{3,2} = C_{1,2} \oplus C_{2,4} \oplus C_{3,1} \oplus C_{4,3}$
$P_{1,3} = C_{1,3} \oplus C_{2,3} \oplus C_{3,3} \oplus C_{4,3}$; $P_{2,3} = C_{1,3} \oplus C_{2,4} \oplus C_{3,0} \oplus C_{4,1}$; $P_{3,3} = C_{1,3} \oplus C_{2,0} \oplus C_{3,2} \oplus C_{4,4}$
$P_{1,4} = C_{1,4} \oplus C_{2,4} \oplus C_{3,4} \oplus C_{4,4}$; $P_{2,4} = C_{1,4} \oplus C_{2,0} \oplus C_{3,1} \oplus C_{4,2}$; $P_{3,4} = C_{1,4} \oplus C_{2,1} \oplus C_{3,3} \oplus C_{4,0}$.

Figure 12B:
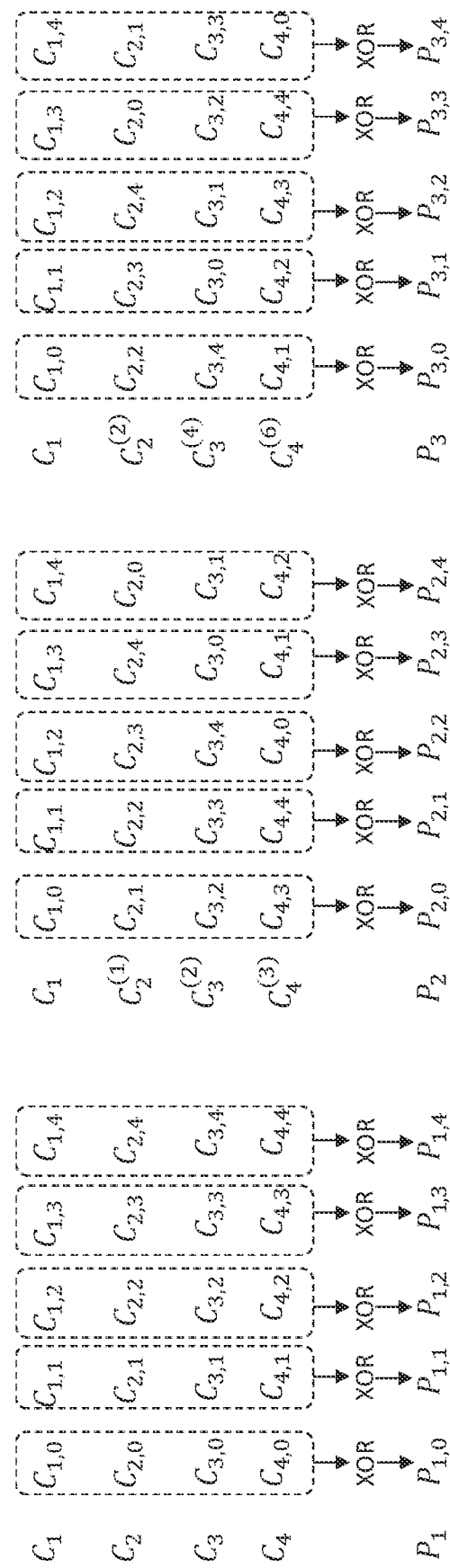
FIG. 12B illustrates an example of the computation of three parity codeblocks.

The computations above are illustrated in FIG. 12B.

More generally, the encoder of a first network device computes N parity CBs from m information CBs in a way that is known to the decoder of the second network device. Each parity CB $P_j$, $1 \leq j \leq N$, is computed by performing an XOR of the m information CBs or cyclic shifts thereof.

U.S. Provisional Patent Application Ser. No. 62/657,611 further discloses a decoding function that is recursively executed by the decoder to recover failed information CBs at the decoder. Each parity CB $P_j$, $1 \leq j \leq N$, is a function of all m of the information CBs. In the first step of the decoding function the N parity CBs $P_1$ to $P_N$ are modified to remove the effect of the correctly decoded information CBs by XORing the parity CB with the known information CB or with the cyclic shifted version of the known information CB that was used to generate the parity CB. The result is a set of N≤modified parity CBs $\tilde{P}_1$ to $\tilde{P}_N$, which are represented as:

$$\tilde{P}_j = i_1 C_{i_1}^{((j-1)*(i_1-1))} \ldots \oplus C_{i_t}^{((j-1)*(i_t-1))} \ldots \oplus C_{i_N}^{((j-1)*(i_N-1))} = \Sigma_{t=1}^N C_{i_t}^{((j-1)*(i_t-1))} \quad \text{(Equation 5)}$$

where $1 \leq j \leq N$, and where it represents the t-th failed information CB.

In the example introduced in FIG. 12A, the first three information CBs $C_1$, $C_2$, and $C_3$ failed and so N=3 and $i_1=1$, $i_2=2$, and $i_3=3$. Removing the effect of the correctly decoded information CBs removes the effect of correctly decoded information CB $C_4$. The modified parity CBs $\tilde{P}_1$ to $\tilde{P}_3$ are computed as follows $$\tilde{P}_1 = P_1 \oplus C_4 = (C_1 \oplus C_2 \oplus C_3 \oplus C_4) \oplus C_4 = C_1 \oplus C_2 \oplus C_3$$

$$\tilde{P}_2 = P_2 \oplus C_4^{(3)} = (C_1 \oplus C_2^{(1)} \oplus C_3^{(2)} \oplus C_4^{(3)}) - C_1 \oplus C_2^{(1)} \oplus C_3^{(2)}$$

$$\tilde{P}_3 = P_3 \oplus C_4^{(6)} = (C_1 \oplus C_2^{(2)} \oplus C_3^{(4)} \oplus C_4^{(6)}) \oplus C_4^{(6)} = C_1 \oplus C_2^{(2)} \oplus C_3^{(4)}$$

To decode the incorrectly decoded information CBs using the modified parity CBs, the decoder executes a recursive decoding function that invokes itself, as explained in detail below. The operation and execution of the decoding function is based on the following observations.

N−1 new parity CBs $Q_1$ to $Q_{N-1}$ can be computed from the parity CBs $\tilde{P}_1$ to $\tilde{P}_N$ such that the effect of first incorrectly decoded information CB $C_{i_1}$ is removed via Gaussian Elimination. In one embodiment, the N−1 new parity CBs can be computed as follows:

$$Q_j = \tilde{P}_j^{-((j-1)*(i_1-1))} \oplus \tilde{P}_{j+1}^{-(j*(i_1-1))}, 1 \leq j \leq N-1 \quad \text{(Equation 6)}$$

where $\tilde{P}_j^{-((j-1)*(i_1-1))}$ is $\tilde{P}_j$ right cyclic shifted by $(j-1)*(i_1-1)$, and $\tilde{P}_{j+1}^{-(j*(i_1-1))}$ is $\tilde{P}_{j+1}$ right cyclic shifted by $j*(i_1-1)$. A right cyclic shift of an element l of $\tilde{P}_j$ by x positions is defined as $\tilde{P}_{j,l}^{-(x)} = \tilde{P}_{j,(l-x) \bmod k}$. The right cyclic shift of the parity CBs inverses the left cyclic shifting performed by the encoder to generate the parity CBs, and causes the elements having codeword $C_{i_1}$ to align and be XORed together to eliminate the effect of codeword $C_{i_1}$. As per Equation 3 above, codeword $C_{i_1}$ was cyclic shifted by $(j-1)*(i_1-1)$ to generate the parity CB $\tilde{P}_j$, and so a corresponding cyclic shift in the opposite direction is performed to align the elements including $C_{i_1}$ in adjacent parity CBs, so that C will be XORed with itself when adjacent parity CBs are XORed. XORing $C_{i_1}$ with itself removes the effect of $C_{i_1}$ from $Q_j$.

Note that $$\tilde{P}_j^{-((j-1)*(i_1-1))} = C_{i_1}^0 \ldots \oplus C_{i_t}^{((j-1)*(i_t-i_1))} \ldots \oplus C_{i_N}^{((j-1)*(i_N-i_1))} = \Sigma_{t=1}^N C_{i_t}^{((j-1)*(i_t-i_1))}$$

and so $Q_j$ may be alternatively expressed as $$Q_j = \tilde{P}_j^{-(j-1)*(i_1-1)} \oplus \tilde{P}_{j+1}^{-(j*(i_1-1))} = \sum_{t=2}^{N}(C_{i_t}^{((j-1)*(i_t-i_1))})$$

Alternatively, $Q_j$ may be expressed as $$Q_j = \sum_{t=1}^{N-1}(C_{i_{t+1}}^{((j-1)*(i_{t+1}-i_1))} \oplus C_{i_{t+1}}^{((j)*(i_{t+1}-i_1))}),$$
$$1 \leq j \leq N-1.$$

N−1 information CBs $D_1$ to $D_{N-1}$ corresponding to the parity CBs $Q_1$ to $Q_{N-1}$ may be defined as follows:

$$D_t = C_{i_{t+1}}^{(0)} \oplus C_{i_{t+1}}^{((i_{t+1}-i_1))}, 1 \leq t \leq N-1 \quad \text{(Equation 7)}$$

Note that the information CB $D_t$ is defined as original failed information CB $C_{i_{t+1}}$ XORed with a version of $C_{i_{t+1}}$ that is left cyclic shifted by $i_{t+1}-i_1$. In the example introduced in relation to FIG. 12A, $D_1 = C_2^{(0)} \oplus C_2^{((2-1))} = C_2^{(0)} \oplus C_2^{(1)}$, and $D_2 = C_3^{(0)} \oplus C_3^{((3-1))} = C_3^{(0)} \oplus C_3^{(2)}$.

If $D_t$ is defined as per Equation 5, then $D_t$ left cyclic shifted by $(j-1)*(i_{t+1}-i_1)$ is $D_t^{(j-1)*(i_{t+1}-i_1)} = C_{i_{t+1}}^{((j-1)*(i_{t+1}-i_1))} \oplus C_{i_{t+1}}^{((j)*(i_{t+1}-i_1))}$.

$Q_j$ may therefore be expressed as $$Q_j = \sum_{t=1}^{N-1} D_t^{(j-1)*(i_{t+1}-i_1)}, 1 \leq j \leq N-1 \quad \text{(Equation 8)}$$

Note that Equation 8 is the same format as Equation 5, but with one less dimension: there are N−1 unknown information CBs $D_1$ to $D_{N-1}$, which are to be determined using N−1 known parity CBs $Q_1$ to $Q_{N-1}$. The input of Equation 5 is dimension N, parity CBs $P_j$, $1 \leq j \leq N$, and CB index $i_t$, and the output to be computed is $C_{i_1}$ to $C_{i_t}$. Whereas, Equation 8 is Equation 5 with input dimension N−1, input parity CBs $Q_j$ $1 \leq j \leq N-1$, and CB index $i_{t+1}-i_1+1$, and the output to be computed is $D_1$ to $D_{N-1}$.

A decoding function may therefore be defined and recursively executed by the decoder based on Equation 5 to recover the failed information CBs at the decoder.

U.S. Provisional Patent Application Ser. No. 62/657,611 also discloses a nested HARQ scheme that may be performed when the decoding of one or more of the parity CBs fails. In one embodiment, the nested HARQ method operates as follows. If a transmission is sent having N parity CBs, where $1 \leq N \leq m$, and decoding of one or more of the parity CBs fails, then the incorrectly decoded parity CBs may be recovered using the same method described above for recovering information CBs. Once the failed parity CBs are recovered, then the parity CBs may be used to recover the failed information CBs. As one example, an initial transmission is sent from a first network device to a second network device. The initial transmission includes m=7 information CBs $C_1$ to $C_7$. The decoder of the second network device incorrectly decodes N=3 of the information CBs. HARQ feedback is sent back to the first network device indicating that N=3 information CBs failed. N=3 parity CBs $P_1$ to $P_3$ are therefore generated by the encoder of the first network device and sent to the second network device. The decoder of the second network device incorrectly decodes $N_1=1$ of the parity CBs. HARQ feedback is therefore sent back to the first network device indicating that decoding failed for $N_1=1$ parity CBs. $N_1=1$ parity CB $P_1^1$ is generated by the encoder of the first network device, e.g., using an outer code encoder, with the parity CBs $P_1$ to $P_3$ as the input information CBs and sent to the second network device. The decoder of the second network device correctly decodes parity CB $P_1^1$. Parity CB $P_1^1$ is used to recover the failed one of parity CBs $P_1$ to $P_3$. Parity CBs $P_1$ to $P_3$ are then used to recover the N=3 failed information CBs. Each outer encoding and outer decoding step in the example may be implemented in the manner discussed above. In one implementation, the encoder of the first network device computes $P_1^1$ as $P_1^1 = P_1 \oplus P_2 \oplus P_3$.

Figure 13:
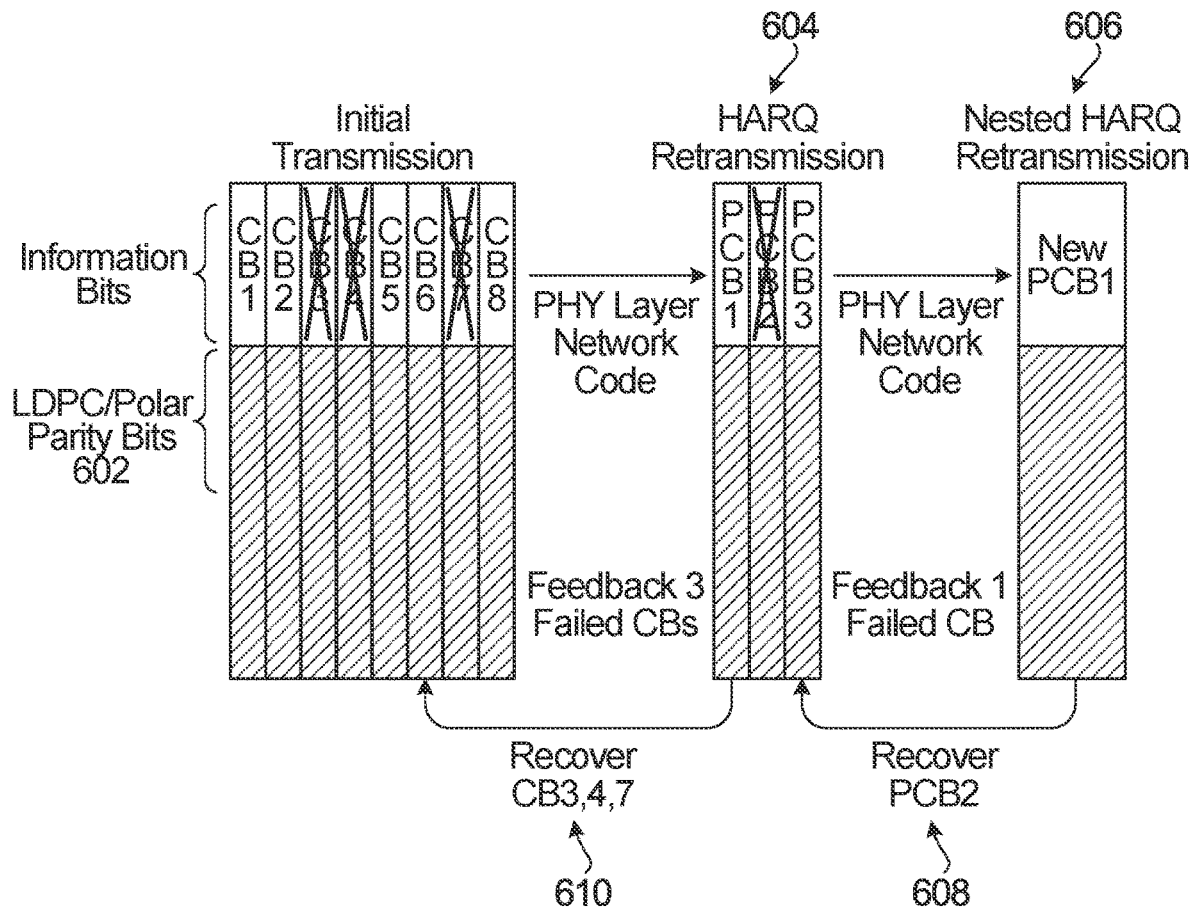
FIG. 13 illustrates an example of nested HARQ.

More generally, the HARQ nesting method may have a plurality of iterations. Once an iteration occurs in which all transmitted parity CBs are correctly decoded, then the correctly decoded parity CBs may be used to correctly decode the failed CBs in the previous iteration, which are then used to correctly decode the failed CBs in the previous iteration, and so on, until the N failed information CBs are correctly decoded. For example, FIG. 13 illustrates an example in which seven information CBs are initially transmitted with an inner code that is either LDPC or Polar code to produce inner code parity bits 602. CBs 3, 4, and 7 fail, and so a HARQ retransmission is sent having three parity CBs, as shown at 604. Parity CB 2 fails, and so a nested HARQ retransmission is sent having another parity CB, as shown at 606. The parity CB sent in the nested HARQ retransmission is correctly decoded and is used to recover the failed parity CB 2, as shown at 608. Recovered parity CB 2, along with parity CBs 1 and 3, are used to recover information CBs 3, 4, and 7, as shown at 610.

Returning now to the second category of cooperative transmission schemes according to the present disclosure, which utilize outer coding based UE cooperation, it is noted that many of the following examples of cooperative transmission schemes in accordance with the second category use a cyclic shift based outer code, such as the one disclosed in U.S. Provisional Patent Application Ser. No. 62/657,611. However, more generally, outer codes used in embodiments of the second category can be a fountain code (or rateless code), Reed-Solomon (RS) code, a cyclic shift based outer code or any erasure code. A practical implementation of a fountain code could be Raptor codes, for example.

Figure 14:
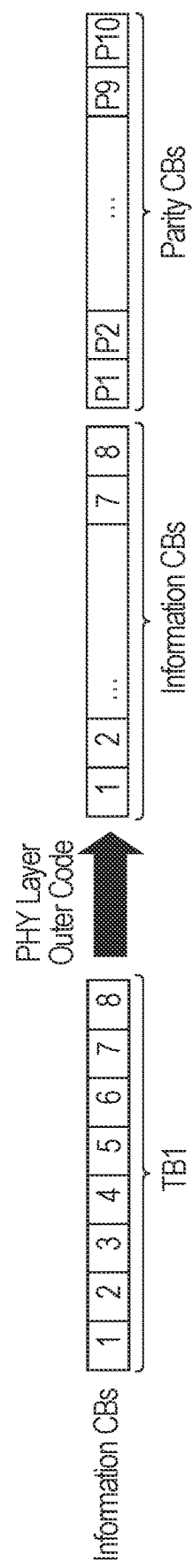
FIG. 14 illustrates an example of the application of a PHY layer outer code to a transport block to generate parity code blocks.

Similar to the cooperative transmission schemes of the first category, outer coding based cooperative transmission schemes in accordance with the second category of the present disclosure comprises two phases: a first multicast phase and a second cooperation phase. In the first multicast phase, the original transmitter, e.g., a BS or a LUE, sends a TB containing multiple information CBs to the CUEs and TUE. If a CUE decodes the TB successfully, it can cooperate by sending a number of parity CBs generated using the outer code. The generation of the parity CBs may be based on an outer code applied to the whole TB. An example of this is shown in FIG. 14, in which an outer code is applied to all the information CBs of an entire TB, TB1, that includes eight information CBs to generate ten parity CBs identified as P1-P10.

Figure 15:
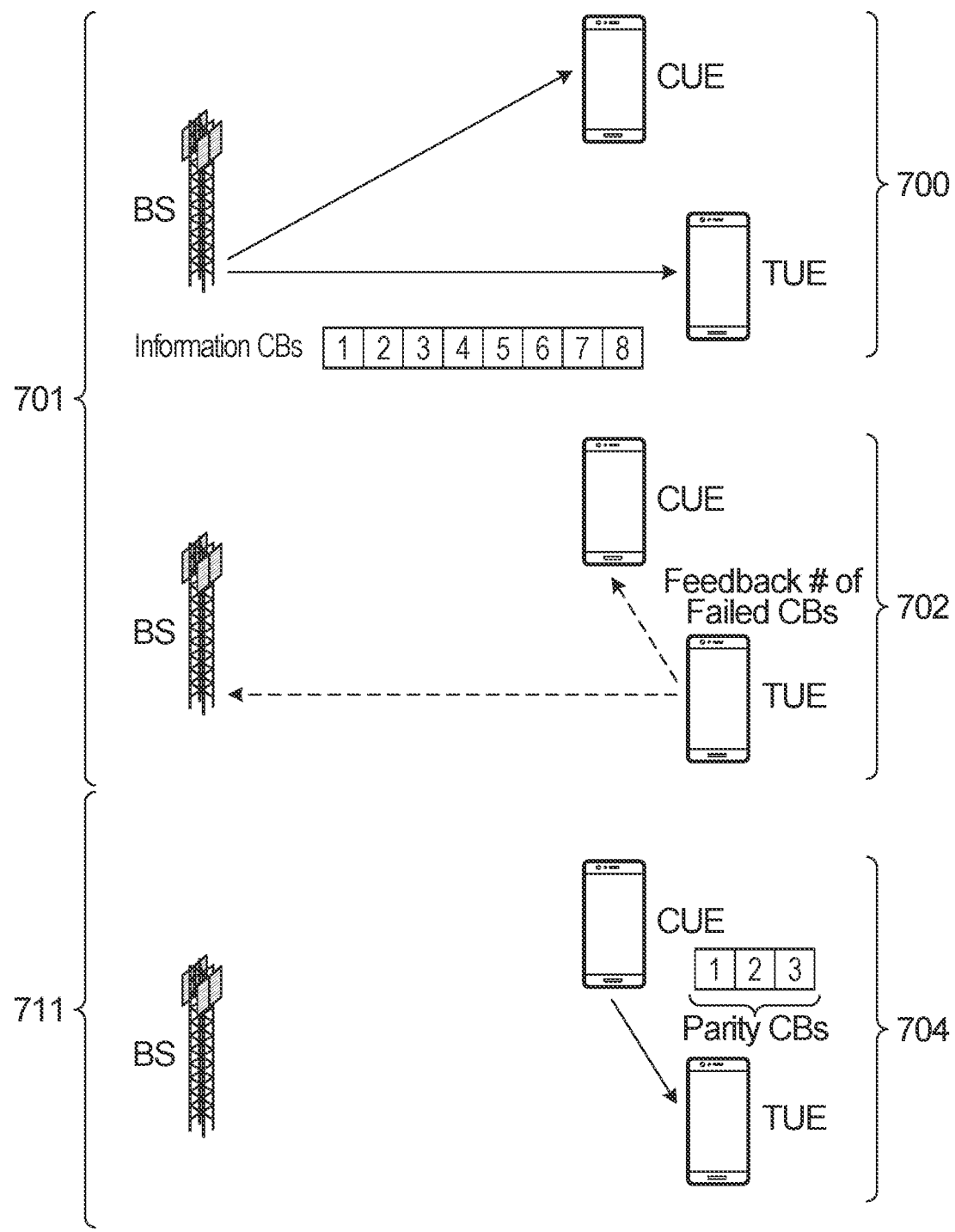
FIG. 15 is a diagram of a first example of a UE cooperative transmission scheme in accordance with a second category of UE cooperative transmission schemes that employ outer code based retransmission.

The number of parity CBs generated may be dependent on the feedback from the TUE after the multicast phase or after the previous transmission. For example, in one scenario, a TUE may feedback the number of CBs it failed to decode for the transmission from the first phase (e.g., via the Type 3 feedback described above). In this case, the CUE may generate the number of parity CBs equals to the number of failed CBs indicated in the TUE feedback. An embodiment of this scenario is shown in FIG. 15, in which the original transmitter is a BS and there is one CUE and one TUE. Although there is only one CUE shown in FIG. 15, more generally there can be one or multiple CUEs available to cooperate. The cooperative transmission scheme shown in FIG. 15 has two phases, a first multicast phase 701 and a second cooperating SL cooperation phase 711. As indicated at 700, in the first multicast phase 701, the BS multicasts a data block that includes eight information CBs CB1-CB8 to the CUE and TUE via DL transmission.

After the first transmission, the TUE sends HARQ feedback (e.g., Type 3 HARQ feedback) at 702 indicating the number of CBs in the TB that were not successfully decoded. In the example shown in FIG. 15, the HARQ feedback is sent to the BS via a UL HARQ feedback message and to the CUE via a SL HARQ feedback message. In this example, the TUE failed to decode three of the eight CBs of the TB. The CUE generates a number of parity CBs equal to the number of failed CBs indicated in the TUE's HARQ feedback, which in this case means the CUE generates three parity CBs, identified as P1-P3, and transmits the three parity CBs to the TUE during the cooperation phase 711, as indicated at 704.

In another scenario, a TUE may only feedback ACK/NACK of the TB (e.g., via the Type 1 feedback described above). In this case, the CUE may generate and transmit to the TUE just one parity CB or a fixed number of parity CBs.

The above example of a cooperation scheme in accordance with the second category of cooperative transmission schemes of the present disclosure assumes a CUE only cooperates if it successfully decodes the entire TB. In an alternative cooperation scheme using outer code in accordance with the second category of cooperative transmission schemes of the present disclosure, a CUE may still cooperate even if it does not decode the entire TB. For example, a CUE may generate the desired number of parity CBs based on less than all code block groups of the transport block, i.e., based on all the decoded CB(s) and not include the CB(s) it does not decode. In this case, a CUE cooperates based on a best effort scenario, because the CB it does not decode may be successfully decoded by the TUE or the TUE may be able to resolve the CB from cooperation of other CUE or the BS.

Another way to cooperate using outer code is for the CUE to send outer coded versions of CBGs, i.e., the CUE may send parity CBs generated using outer code applied to less than all CBGs of the TB instead of the whole TB. Again, the cooperation scheme may depend on the HARQ feedback from the TUE for previous transmissions. If the feedback from the TUE indicates which CBG(s) is/are successfully decoded (e.g., via the Type 2 feedback described above), then instead of retransmitting select CBGs that the CUE decoded successfully but that were not decoded by the TUE, the CUE can generate a small number of parity CBs based on the selected CBGs. In many cases only a small number of CBs among the CBGs of a given TB are corrupted. For example, if only one CB of a CBG is not successfully decoded, then only one parity CB may need to be generated and transmitted to the TUE in order to allow the TUE to resolve the undecoded CB. Therefore, using an outer code in this manner can reduce the number of CBs that need to be retransmitted to allow the TUE to resolve undecoded CBs/CBGs. Furthermore, in situations where multiple CUEs are available for cooperative transmission in this manner, the chance that the TUE will receive enough parity CBs from the group of CUEs for each failed CBG is increased.

Figure 16:
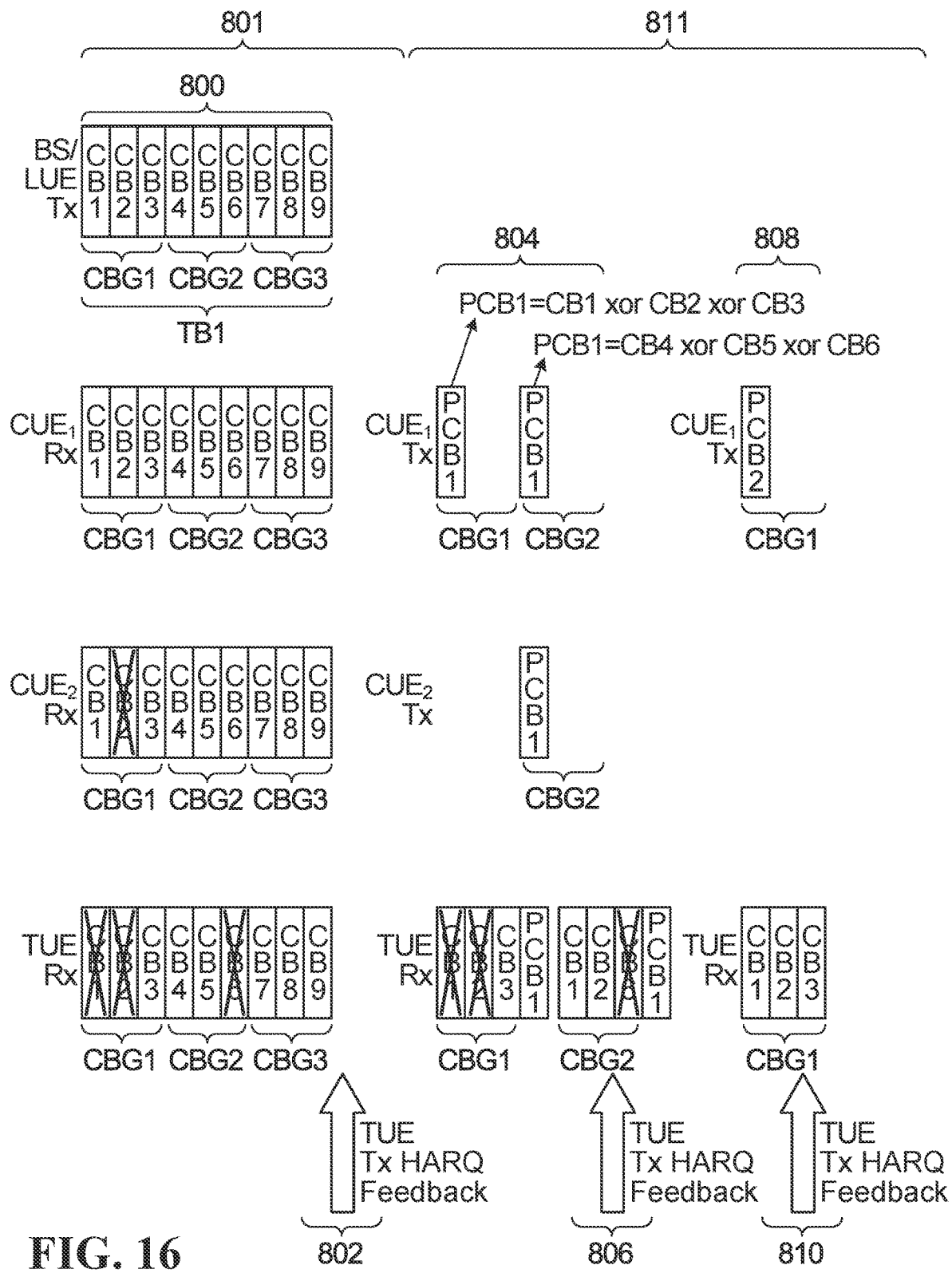
FIG. 16 is a diagram of a second example of a UE cooperative transmission scheme in accordance with the second category of UE cooperative transmission schemes that employ outer code based retransmission.

An example of such a transmission scheme is shown in FIG. 16. In this example, the original transmitter is a BS or LUE, and there are two CUEs, $CUE_1$ and $CUE_2$, and one TUE. Similar to the previous examples, the cooperative transmission scheme shown in FIG. 16 has two phases, a first multicast phase 801 and a second cooperating phase 811. As indicated at 800, in the first multicast phase 801, the BS or LUE multicasts a data block that includes a transport block TB1 to $CUE_1$, $CUE_2$, and the TUE via DL or SL transmission broadcasts.

The transport block TB1 transmitted in the first phase 801 contains 9 CBs, identified as CB1 to CB9, respectively. The nine CBs of TB1 are grouped into three CBGs, identified as CBG1, CBG2 and CBG3, respectively, such that CBG1 includes CB1, CB2 and CB3; CBG2 includes CB4, CB5 and CB6; and CBG3 includes CB7, CB8 and CB9.

$CUE_1$ successfully decoded all the CBs in the data block TB1. $CUE_2$ successfully decoded all CBs in TB1 except CB2, which belongs to CBG1. The TUE successfully decoded all CBs in TB1 except CB1 and CB2 of CBG1 and CB6 of CBG2.

After the first transmission, the TUE sends HARQ feedback (e.g., Type 2 HARQ feedback) at 802 indicating that CBG1 and CBG2 are not successfully decoded.

Based on the HARQ feedback from the TUE, $CUE_1$ and $CUE_2$ each generate at least one parity CB based on less than all CBGs of TB1. In particular, CUE generates a parity CB PCB1 using an outer code based on CBG1 and a parity CB PCB1 for CBG2 using an outer code based on CBG2, and $CUE_2$ generates a parity CB PCB1 for CBG2 using an outer code based on CBG2. For example, the parity CB PCB1 for CBG1 may be generated by XORing the CBs of CBG1, i.e., CB1⊕CB2⊕CB3, and the parity CB PCB1 for CBG2 may be generated by XORing the CBs of CBG2, i.e., CB4⊕CB5⊕CB6. In the cooperation phase 811, $CUE_1$ and $CUE_2$ send the PCBs they have generated to the TUE in a second transmission, as indicated at 804. The TUE successfully decodes all the parity CBs received in the second transmission, which is enough to recover CBG2, because only one CB was not successfully decoded in CBG2. However, because a single PCB only allows the TUE to recover a single corrupted CB, the TUE cannot yet recover CBG1, because there were two unsuccessfully decoded CBs in CBG1.

At 806, the TUE sends another HARQ feedback indicating CBG1 is still unsuccessfully decoded. $CUE_1$ then generates another different parity CB, PCB2, for CBG1 using an outer code based on CBG1. For example, $CUE_1$ may use a cyclic shift based outer code similar to the one described above with reference to FIG. 12B, such that PCB2 for CBG1 is equal to $CB1 \oplus CB2^{(1)} \oplus CB3^{(2)}$, where the number in parentheses indicates the number of cyclic shifts applied to the bits of the CB. The above operation uses the cyclic shift based outer codes to generate the parity CBs, however, any of the outer code described in this disclosure or any erasure code in general can be applied in a similar manner.

At 808, $CUE_1$ sends the parity CB PCB2 to the TUE. In this scenario, $CUE_2$ does not generate another parity CB or retransmit at 808 because it did not successfully decode CBG1.

After the second transmission at 808, if the TUE correctly decodes CBG1 using PCB2, the TUE may send another HARQ feedback message indicating CBG1 or the entire TB is successfully decoded, as indicated at 810 in FIG. 16. Note that the PCBs generated for CBG2 by $CUE_1$ and $CUE_2$ can be the same or different PCBs. If they are the same, TUE can combine the two PCBs to improve the performance of decoding the PCB (e.g. using soft combining). If the two PCBs for CBG2 from the two CUEs are different, the TUE can receive both and use both PCBs to recover more corrupted CBs for CBG2.

In some embodiments, the TUE can also feedback more information to help CUE determine how many parity CBs to generate for each CBG. For example, in such embodiments, the TUE may feedback the number of CBs that it did not successfully decode for each CBG (i.e., the Type 4 feedback described above), which provides more information than simply which CBGs are successfully decoded. Alternatively, in order to further reduce the feedback overhead, the TUE can feedback the maximum number of failed CBs among all CBGs in addition to which CBGs are successfully decoded.

In this scenario, all CUEs that correctly decode the CBGs that the TUE does not successfully decode may send one or more parity CBs for those CBGs. The number of parity CBs generated for each CBG can be determined based on the feedback. For example, if the number of failed CBs for each CBG is fed back by the TUE, the CUE may generate a number of parity CBs equal to the number of failed CBs for that CBG reported by the TUE. If the maximum number of failed CBs for all CBGs is fed back, the CUE may generate a number of parity CBs for each failed CBG equal to the maximum number of failed CBs for all CBGs reported by the TUE. For example, referring again to the embodiment shown in FIG. 16, the maximum number of failed CBs in all CBGs is two (because CB1 and CB2 failed in CBG1), and therefore if the TUE initially feeds back at 802 that it failed to decode CBG1 and CBG2, and the maximum number of failed CBs in all CBG is two, then $CUE_1$ would generate two parity CBs for CBG1 and two parity CBs for CBG2, and $CUE_2$ would generate two parity CBs for CBG2.

Nested HARQ

One extension to this transmission scheme is the use of nested HARQ in CBG based outer coding. For example, after a CBG of an initial transmission fails to be successfully decoded, and a CUE sends a transmission that includes a number of parity CBs of the failed CBG, the TUE may send feedback indicating the number of parity CBs that have not been successfully decoded for the last transmission. Then the CUE can generate and transmit to the TUE a number of parity CBs using outer code based on the parity CBs transmitted in the last transmission instead of generating different parity CBs using outer code based on the original information CBs in the initial transmission. The TUE can then use the parity CBs received in the latest transmission to recover the parity CBs in the preceding transmission, then use the parity CBs in the preceding transmission to recover the CBs in the earlier transmissions. This process can go on until the TUE can recover the original information CBs of the CBG.

Figure 17:
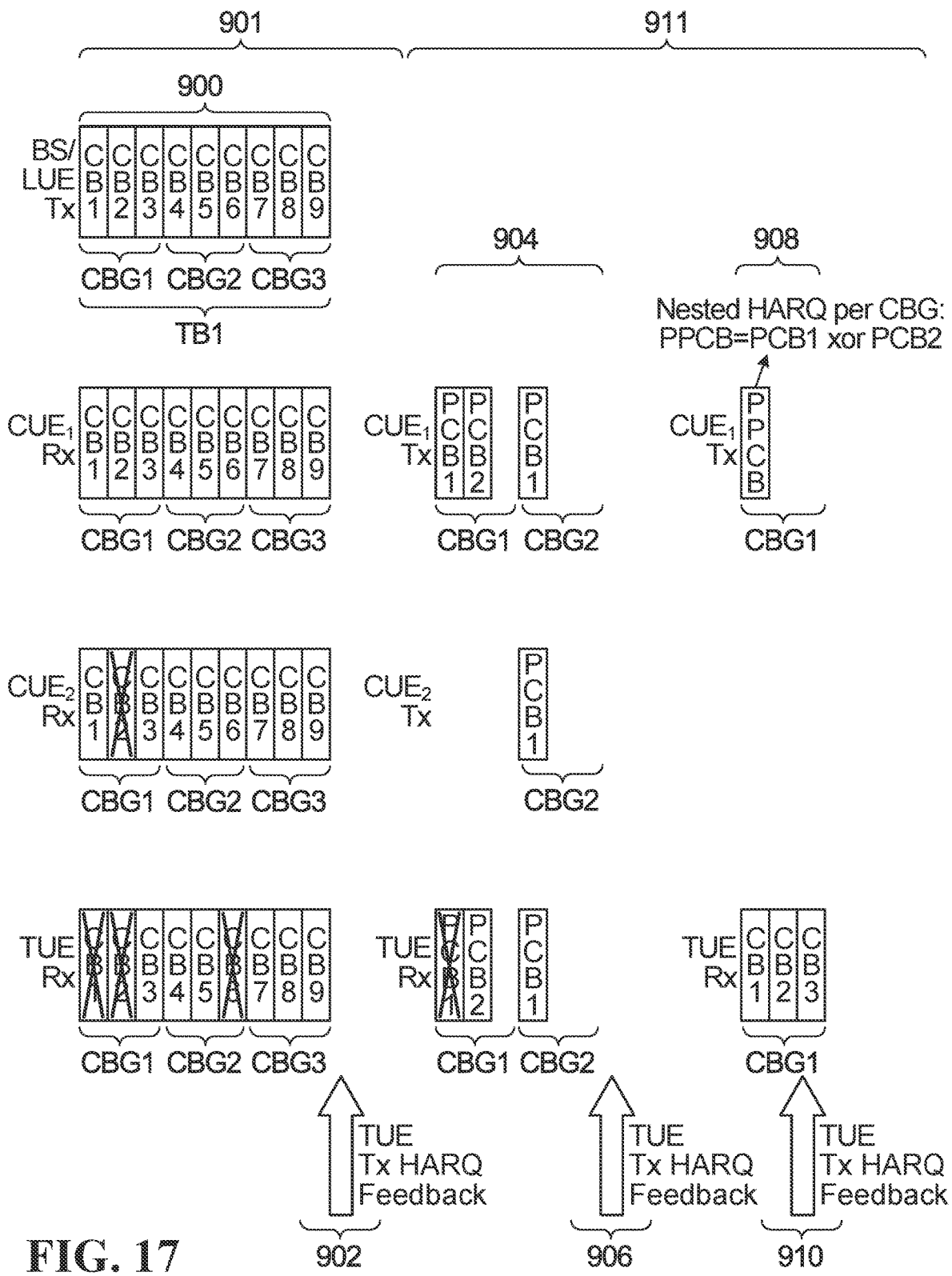
FIG. 17 is a diagram of a third example of a UE cooperative transmission scheme in accordance with the second category of UE cooperative transmission schemes that employ outer code based retransmission.

An example of such a transmission scheme that includes a nested HARQ transmission is shown in FIG. 17. Similar to the previous examples, in this example the original transmitter is a BS or LUE, there are two CUEs, $CUE_1$ and $CUE_2$, and one TUE, and the cooperative transmission scheme has two phases, a first multicast phase 901 and a second cooperating phase 911. As indicated at 900, in the first multicast phase 901, the BS or LUE multicasts a data block that includes a transport block TB1 to $CUE_1$, $CUE_2$, and the TUE, via DL or SL transmission broadcasts.

The transport block TB1 transmitted in the first phase 901 contains 9 CBs, identified as CB1 to CB9, respectively. The nine CBs of TB1 are grouped into three CBGs, identified as CBG1, CBG2 and CBG3, respectively, such that CBG1 includes CB1, CB2 and CB3, CBG2 includes CB4, CB5 and CB6, and CBG3 includes CB7, CB8 and CB9.

As in the previous examples, in this example $CUE_1$ successfully decoded all the CBs in the data block TB1. $CUE_2$ successfully decoded all CBs in TB1 except CB2, which belongs to CBG1. The TUE successfully decoded all CBs in TB1 except CB1 and CB2 of CBG1 and CB6 of CBG2.

After the first transmission, the TUE sends HARQ feedback (e.g Type 4 HARQ feedback) at 902 indicating that two CBs are not successfully decoded in CBG1 and one CB is not successfully decoded in CBG2.

Based on the HARQ feedback from the TUE, $CUE_1$ and $CUE_2$ generate parity CB(s) using an outer code based on the CBG(s) the TUE did not successfully decode such that each parity CB is based on at least one, but less than all, code block groups of the transport block. In this example, $CUE_1$ generates two parity CBs, PCB1 and PCB2, for CBG1 using an outer code based on CBG1. CUE1 also generates one parity CB, PCB1, for CBG2 using an outer code based on CBG2. $CUE_2$ generates one parity CB, PCB1, for CBG2 using an outer code based on CBG2. As in the previous example, the parity CBs for the CBGs may be generated by XORing the CBs of the CBGs or cyclic shifts thereof, e.g., PCB1 for CBG1 may be equal to $CB1 \oplus CB2 \oplus CB3$, and PCB2 for CBG1 may be equal to $CB1 \oplus CB2^{(1)} \oplus CB3^{(2)}$.

In the cooperation phase 911, $CUE_1$ and $CUE_2$ send the PCBs they have generated to the TUE in a second transmission, as indicated at 904. In this example, the TUE successfully decodes PCB2 for CBG1 and PCB1 for CBG2, but the TUE fails to successfully decode the first parity CB, PCB1, that $CUE_1$ generated using an outer code based on CBG1. Using a nested HARQ scheme, at 906 the TUE sends another HARQ feedback indicating that one of the two PCBs is not successfully decoded for CBG1 and CBG2 is successfully decoded. CUE then generates one parity CB, PPCB (parity of parity CB), using outer code based on the two parity CBs, PCB1 and PCB2, that $CUE_1$ sent for CBG1 in the last transmission at 904. For example, $CUE_1$ may generate the PPCB by XORing the PCBs of the last transmission, i.e., PPCB may be equal to $PCB1 \oplus PCB2$.

$CUE_i$ sends the PPCB to the TUE in a third transmission, as indicated at 908. After successfully receiving the PPCB in the third transmission, the TUE uses the PPCB to recover the PCB1 for CBG1. After using PCB1 and PCB2 for CBG1 to successfully decode CBG1, the TUE sends another HARQ feedback at 910 that includes an ACK to the CUEs, and possibly the BS, to confirm that the CBGs of TB1 have been successfully decoded. Note that if nested HARQ is not used, the TUE may send HARQ feedback indicating that it still needs another PCB for CBG1. In which case $CUE_1$ may operate in accordance with the previous example shown in FIG. 16 and generate another different parity CB, PCB3, for CBG1 using an outer code based on the original information CBs of CBG1 instead of based on the two parity CBs sent in the second transmission. For example, $CUE_1$ may use a cyclic shift based outer code similar to the one described above with reference to FIG. 12B, such that PCB3 for CBG1 is equal to $CB1 \oplus CB2^{(2)} \oplus CB3^{(4)}$.

Simple ACK/NACK Feedback

In another outer code based cooperation scheme, the TUE may only provides simple TB-level HARQ feedback. For example, the TUE might send an ACK or NACK of the TB. In another example, the TUE sends an ACK if the TUE successfully decodes the TB, but does not send anything if the TUE fails to decode the TB. In other outer code based cooperation schemes, the TUE might not send any feedback at all. In either of these scenarios, a CUE may repeatedly send a parity CB of the TB until an ACK is received. In such cases, a CUE may wait a certain time in between sending parity CBs to accommodate possible feedback from the TUE. The time window between sending parity CBs may be predefined or signaled by the BS.

Figure 18:
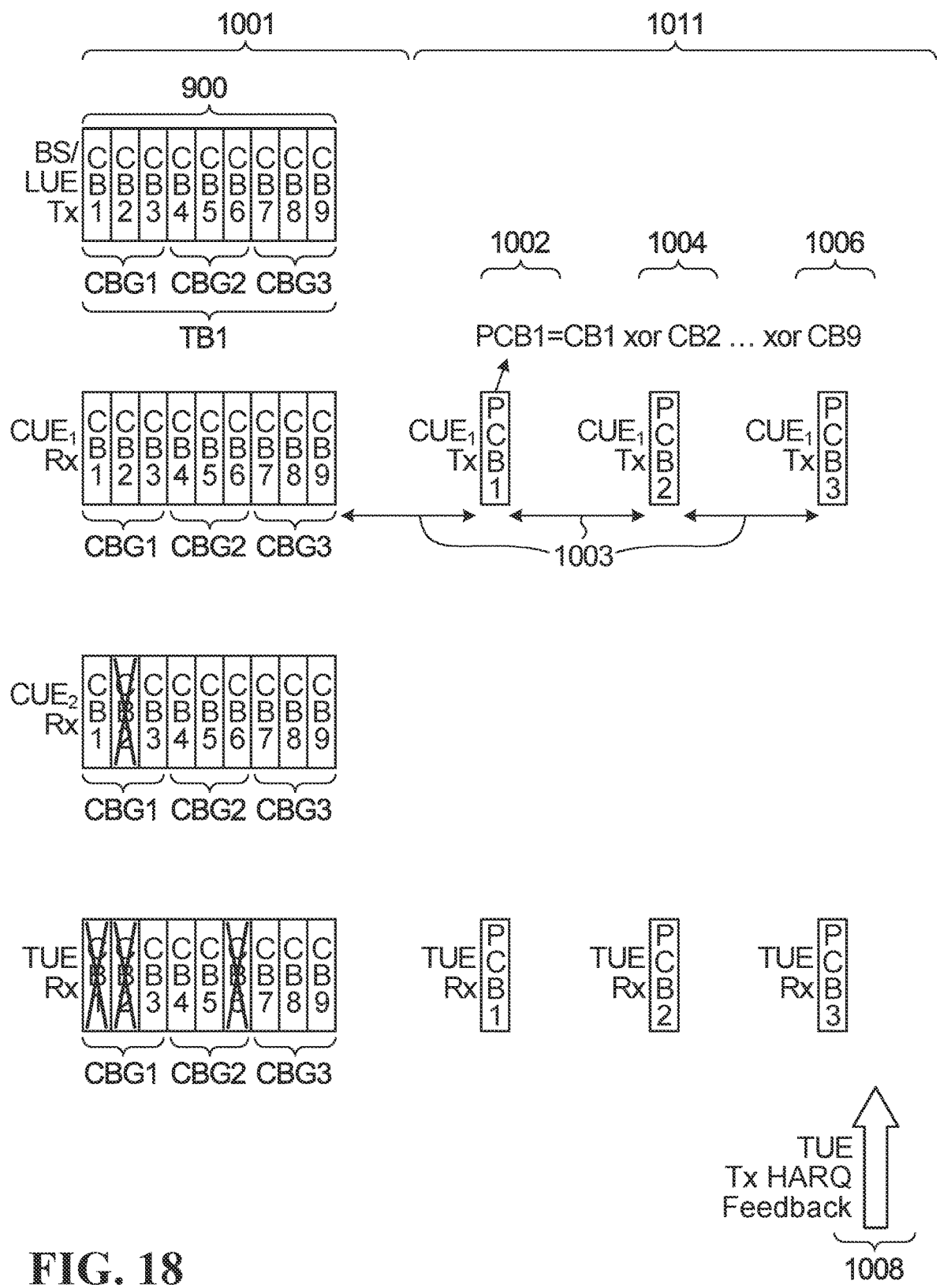
FIG. 18 is a diagram of a fourth example of a UE cooperative transmission scheme in accordance with the second category of UE cooperative transmission schemes that employ outer code based retransmission.

An example of such a transmission scheme is shown in FIG. 18. Similar to the previous examples, in this example the original transmitter is a BS or LUE, there are two CUEs, $CUE_1$ and $CUE_2$, and one TUE, and the cooperative transmission scheme has two phases, a first multicast phase 1001 and a second cooperating phase 1oll. As indicated at 900, in the first multicast phase 1001, the BS or LUE multicasts a data block that includes a transport block TB to $CUE_1$, $CUE_2$, and the TUE, via DL or SL transmission broadcasts.

As in the previous examples, in this example $CUE_1$ successfully decoded all the CBs in the data block TB1. $CUE_2$ successfully decoded all CBs in TB1 except CB2, which belongs to CBG1. The TUE successfully decoded all CBs in TB1 except CB1 and CB2 of CBG1 and CB6 of CBG2.

In the cooperation phase 1011, in response to the lack of an ACK from the TUE within a time window 1003 following the initial transmission, $CUE_1$ generates a parity CB, PCB1, for TB1 using an outer code based on all the original information CBs of TB1 and sends PCB1 to the TUE in a second transmission, as indicated at 1002. For example, CUE1 may generate the parity CB PCB1 for TB1 by XORing the CBs of TB1 or cyclic shifts thereof, e.g., PCB1 may be equal to $CB1 \oplus CB2 \oplus CB3 \oplus CB4 \oplus CB5 \oplus CB6 \oplus CB7 \oplus CB8 \oplus CB9$. In this example, $CUE_2$ does not generate a parity CB based on TB1 or retransmit at 1002 because it did not successfully decode CBG1.

In this example, because $CUE_1$ does not receive an ACK from the TUE within a time window 1003 after the second transmission, CUE sends a third transmission that includes a different parity CB, PCB2, for TB1 to the TUE, as indicated at 1004. For example, $CUE_1$ may use a cyclic shift based outer code similar to the one described above with reference to FIG. 12B. For example, PCB2 may be equal to $CB1 \oplus CB2^{(1)} \oplus CB3^{(2)} \oplus CB4^{(3)} \oplus CB5^{(4)} \oplus CB6^{(5)} \oplus CB7^{(6)} \oplus CB8^{(7)} \oplus CB9^{(8)}$.

At 1006, because $CUE_1$ does not receive an ACK from the TUE within a time window 1003 after the third transmission, $CUE_1$ sends a third parity CB, PCB3, for TB1 to the TUE. PCB3 is different from both PCB1 and PCB2. For example, PCB3 may be equal to $CB1 \oplus CB2^{(2)} \oplus CB3^{(4)} \oplus CB4^{(6)} \oplus CB5^{(8)} \oplus CB6^{(10)} \oplus CB7^{(12)} \oplus CB8^{(14)} \oplus CB9^{(16)}$.

After the third transmission at 1006, the TUE correctly decodes TB1 using the successfully received parity CBs, PCB1, PCB2 and PCB3 to recover the failed CBs, CB1, CB2 and CB6, and sends a HARQ feedback message that includes an ACK indicating TB1 is successfully decoded, as indicated at 1008 in FIG. 18.

The cooperation UE may also transmit the partition of CBGs or outer coded CBs/CBGs based on a best-effort cooperation scheme. For example, a CUE might not receive feedback information or might not receive enough feedback information from the TUE to determine which CB(s) or CBG(s) are decoded successfully. In one embodiment, a CUE may only cooperate if it can decode the entire TB. In such an embodiment, the CUE may retransmit the whole TB or may generate an outer coded version of the TB and transmit the outer coded version to the TUE. In another embodiment, a CUE may cooperate even if it only successfully decodes a partial subset of the CBs or CBGs of the entire TB. In such an embodiment, when an outer code is not used, the CUE may simply retransmit all of the CBs or CBGs that it can successfully decode to the TUE. When an outer code is used, the CUE may generate an outer coded version of information based on all the CBs or CBGs it can successfully decode. In one example, the CUE may transmit one or more parity CBs based on all the CBs that it successfully decode or all the CBs within the CBGs that it successfully decodes. In another example, the CUE may generate one or more parity CBs for each CBG it has successfully decoded, where each parity CB is generated based on an outer coded version of the CBs within a CBG.

Selection of Parity Index for Outer Code

In all the above schemes involving cooperating using outer codes, the transmitter (e.g. CUE) determines which parity CB to transmit. In one example, when the outer code is the outer code proposed in U.S. patent application Ser. No. 15/718,523, a CUE needs to determine the parity index j (see Equation 3). In another example, if the outer code is the Raptor code, a key or seed that can be used to generate pseudo random coefficients for parity bits, and therefore in embodiments that utilize the Raptor code as an outer code, the choice of parity CB index involves determining the key or seed. Several options for selecting and generating parity CBs are discussed below.

In some embodiments, the transmitter (e.g. CUE) follows a predefined order of generating parity CBs. For example, if a cyclic shift based outer code is used, a CUE may always generate PCB_1, PCB_2, ..., PCB_N if N PCBs are needed for the transmission (or according to the feedback). Referring to Equation 3 for generating PCBs, an example of the order would be j=1, 2, ..., N. The advantage is that the code can be designed in a way that it is easy and efficient to decode if the particular order of PCBs is used.

In a second scheme, the transmitter randomly or pseudo randomly selects a parity CB index. For example, in the case of Raptor code, a CUE may randomly or pseudo randomly select a key or seed. The key and seed can be selected from a predefined seed pool. In the case of a cyclic shift based outer code, a CUE can select the parity index j randomly among a given range, e.g. [1, M]. This method may be best suited to scenarios where the number of failed CBs is unknown and/or multiple CUEs are likely to be available, because multiple CUEs may select different PCBs, thus increasing the number of failed CBs that the TUE can recover if the PCBs are successfully decoded.

In a third scheme, CUEs may each use a different parity CB index, which may be determined by a different starting point of parity CBs. For example, the starting point can be a starting value of the parity index $j=j_0$, and the rest of the PCBs follow a predefined order after the starting point, e.g. in the order of $(j_0, j_{0+1}, j_{0+2}, \ldots)$. In another example, the starting point can be a seed, and all the rest of the PCBs for the particular CUE are generated using the seed. The starting value of j or the seed may be associated with the CUE. For example, the starting value may be associated with an ID associated with the CUE, such as the UE ID, that can be signaled by the BS.

In addition, in order for the TUE to know which PCBs are sent and how they are generated, in some embodiments CUEs may send PCB information in a control channel. Because the transmission is in SL, UE may indicate the one or more PCB index (e.g. j or seed) in the sidelink control channel information (SCI) that is associated with the data transmission. A CUE may also indicate the CBG index in the SCI if the transmission is based on selected CBGs.

The CUE may indicate the information identifying the selected CBGs and the parity CB transmitted using the outer code to the TUE. The information may be transmitted in the SCI. In this case, when the TUE decodes the SCI, it is able to know how to decode the received CBs. The information may include which selected CBs or CBGs among the TB are transmitted by the CUE to the TUE. For example, the information may include the CBG index of the CBGs that are transmitted by the CUE to the TUE. In some other embodiments, in addition to identifying which CBGs are transmitted by the CUE to the TUE, the information may indicate how many outer coded CBs the CUE generated and transmitted to the TUE for each CBG. For example, $CUE_1$ may generate a parity CB (PCB1) using an outer code based on CBG1, and transmit PCB1 to the TUE. $CUE_1$ uses SCI to inform the TUE that one parity CB for CBG1 is transmitted. In some embodiments, the information may include how the outer coded CB is generated for each CBG. This information may include the parameters to generate the outer code or the index of the parity CB for each CBG. In one example, $CUE_1$ generates the parity CB (PCB2) using an outer code based on CBG1 and transmits PCB2 to the TUE. The TUE then indicates in the SCI the index of the parity CB (e.g. index 2 for PCB2) and the CBG index (index 1 for CBG1) needed to be transmitted by $CUE_1$ to the TUE. In the case when the outer code is the outer code proposed in U.S. patent application Ser. No. 15/718,523, the CUE can generate the parity CB based on the parity index j=2 (see Equation 3). After the TUE decodes SCI, the TUE knows that PCB1 of CBG1 is transmitted, and it can follow the decoding algorithm to decode PCB1.

In addition to the advantage mentioned for the first category of CBG/CB based cooperation schemes without outer code, the outer code based cooperation schemes of the second category can further reduce the amount of retransmission data for more efficient cooperation. The outer code based cooperation schemes also allows a CUE to cooperate without fully decoding the entire TB, and enables distributed cooperation where each CUE cooperates based on its own decoding results and SL HARQ feedback without scheduling instructions from the network. In addition, a PHY layer outer-code may minimize the number of retransmit bits even without full feedback on the decoded CB index. Also, if the transmission channel is close to an erasure channel, soft combining of retransmissions is typically not effective, and therefore an outer code can be more efficient than using a different redundancy version for retransmission.

Although many of the embodiments described above are focused on distributed UE cooperation where CUEs cooperate without BS scheduling, many elements of the cooperative transmission schemes of the present disclosure can also be applied to schedule-based cooperation. For example, in such cases, a BS may schedule the CUEs to transmit selected CBGs or outer coded code blocks based on selected CBGs or the entire TB. In this case, the BS may send scheduling information via a control channel (e.g. downlink control information (DCI)) to the transmitter UE. The scheduling information may include information identifying which selected CBs or CBGs among the TB are to be transmitted by the CUE to the TUE. For example, the scheduling information may include the CBG index of each CBG among the CBGs of the TB that is to be transmitted by the CUE to the TUE. In some other embodiments, in addition to information identifying which CBGs are to be transmitted by the CUE to the TUE, the scheduling information may indicate how many outer coded CBs of each CBG should be generated and transmitted by the CUE to the TUE. In such embodiments, the CUE then follows the BS's instructions conveyed via the scheduling information and sends corresponding CBGs or outer coded CB(s) or CBG(s) to the TUE. For example, the BS may send DCI that includes scheduling information that indicates 1 parity CB of CBG1 needs to be retransmitted by $CUE_1$ to the TUE. CUE, then generates a parity CB (PCB1) using an outer code based on CBG1 and transmits PCB1 to the TUE according to the scheduling information in the DCI. In some embodiments, the scheduling information may further include information on how the outer coded CB is generated for each CBG. This information may further include the parameters to generate the outer code or the index of the parity CB for each CBG. In one example, a BS may send DCI to indicate that the index of the parity CB (e.g. index 2 for PCB2) and CBG index (index 1 for CBG1) needs to be retransmitted by $CUE_1$ to the TUE. CUE, then generates the parity CB (PCB2) using an outer code based on CBG1 and transmits PCB2 to the TUE according to the scheduling information in DCI. In the case when the outer code is the outer code proposed in U.S. patent application Ser. No. 15/718,523, the CUE can generate the parity CB based the parity index j=2 (see Equation 3). In some embodiments, a CUE may indicate all the above scheduling information in SCI that is associated with the transmission to the TUE so that the TUE can identify the SL retransmissions from the CUE through decoding of the SCI. However, the feedback scheme and the transmission scheme, as well as information in the SL control channel, are still applicable to these schedule based cooperation embodiments.

Furthermore, although many of the embodiments described above are related to cooperative transmission schemes for UE cooperation, many elements of the cooperative transmission schemes of the present disclosure also have application outside of the context of UE cooperation and sidelink transmission. For example, the use of CBG level outer coding, HARQ feedback that includes both CBG level ACK/NACK and information indicating the number of failed CBs per CBG or the maximum number of failed CBs in all CBGs, and nested HARQ techniques using per-CBG outer code and feedback, each have application outside of UE cooperation and sidelink transmission. More generally, these techniques may be applied for any communication between a first network device and a second network device, e.g., where the first network device is a BS and the second network device is a UE. Examples of the application of the foregoing techniques in the context of transmissions between first and second network devices are described below with reference to FIGS. 19 to 21.

Figure 19:
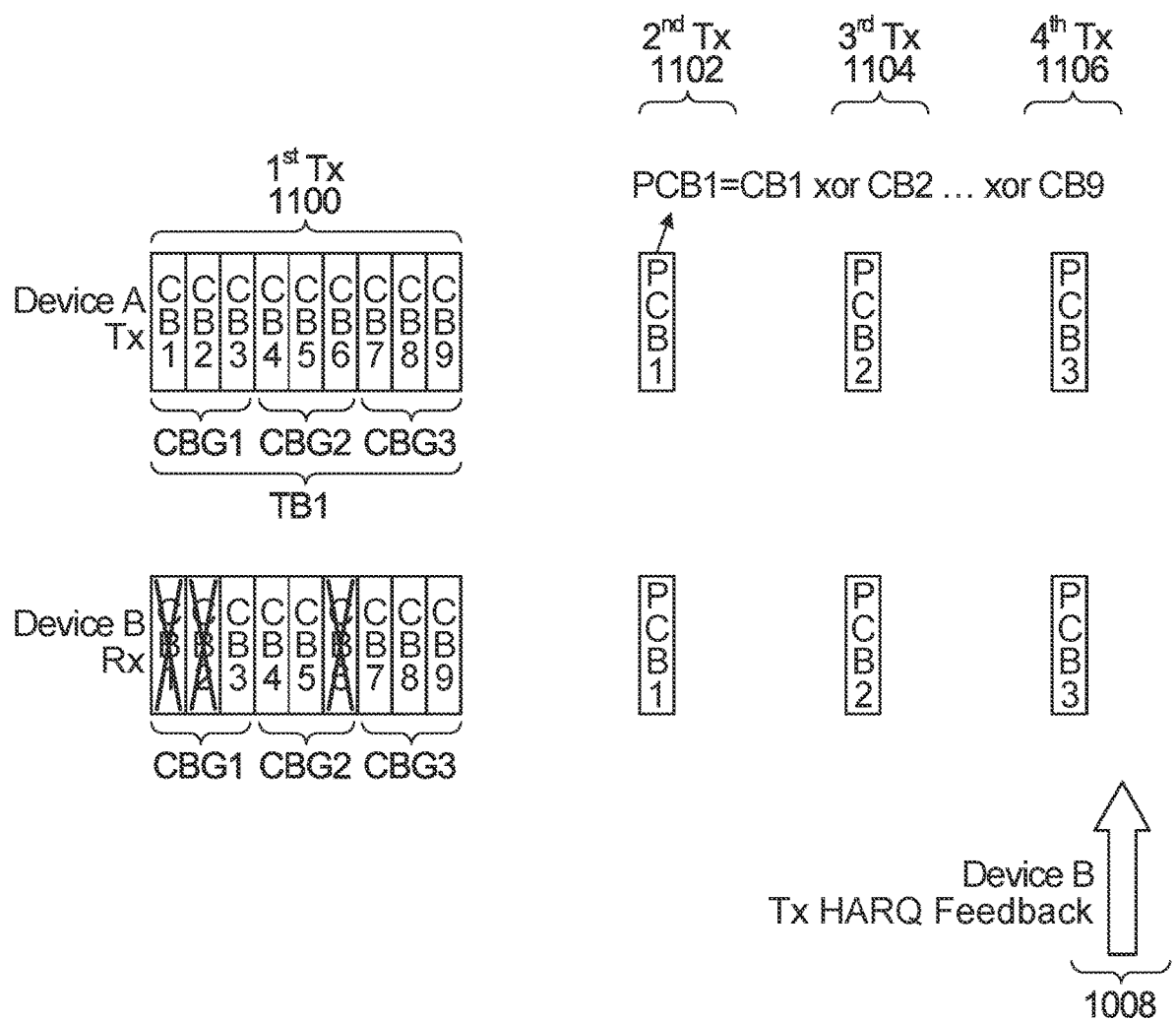
FIG. 19 is a diagram of an example of a HARQ retransmission scheme that employs outer code based retransmission using an outer code based on an entire transport block.

FIG. 19, for example, is a diagram of a first example of a HARQ retransmission scheme between two network devices that employs outer code based retransmission using TB level outercoding and simple ACK/NACK feedback. In the example shown in FIG. 19, the two network devices include a Device A and a Device B. For example, Device A may be a BS and Device B may be a UE. In this example, after Device A transmits a data block that includes a transport block TB1 to Device B, Device A continues to send parity CBs to Device B that are based on an outer code using all CBs of TB1. In particular, as indicated at 1100, Device A initially transmits a data block that includes a transport block TB1 to Device B. As in the previous examples, TB1 contains 9 CBs, identified as CB1 to CB9 grouped into three CBGs, identified as CBG1, CBG2 and CBG3. In this example Device B successfully decoded all CBs in TB1 except CB1 and CB2 of CBG1 and CB6 of CBG2.

In response to the lack of an ACK from Device B within a time window following the initial transmission, Device A generates a parity CB, PCB1, for TB1 using an outer code based on all the original information CBs of TB1, and sends PCB1 to Device B in a second transmission, as indicated at 1102. For example, Device A may generate the parity CB PCB1 for TB by XORing the CBs of TB1 or cyclic shifts thereof, e.g., PCB1 may be equal to CB1⊕CB2⊕CB3⊕CB4⊕CB5⊕CB6⊕CB7⊕CB8⊕CB9.

In this example, because Device A does not receive an ACK from Device B within a time window after the second transmission, Device A sends a third transmission that includes a different parity CB, PCB2, for TB1 to Device B, as indicated at 1104. For example, Device A may use a cyclic shift based outer code similar to the one described above with reference to FIG. 12B.

For example, PCB2 may be equal to $CB1 \oplus CB2^{(1)} \oplus CB3^{(2)} \oplus CB4^{(3)} \oplus CB5^{(4)} \oplus CB6^{(5)} \oplus CB7^{(6)} \oplus CB8^{(7)} \oplus CB9^{(8)}$.

At 1106, because Device A does not receive an ACK from Device B within a time window after the third transmission, Device A sends a third parity CB, PCB3, for TB1 to Device B. PCB3 is different from both PCB1 and PCB2. For example, PCB3 may be equal to $CB1 \oplus CB2^{(2)} \oplus CB3^{(4)} \oplus CB4^{(6)} \oplus CB5^{(8)} \oplus CB6^{(10)} \oplus CB7^{(12)} \oplus CB8^{(14)} \oplus CB9^{(16)}$.

In this example, after the third transmission at 1106, Device B correctly decodes TB1 using the successfully received parity CBs, PCB1, PCB2 and PCB3 to recover the failed CBs, CB1, CB2 and CB6, and sends a HARQ feedback message that includes an ACK indicating TB1 is successfully decoded, as indicated at 1108 in FIG. 19. In this example, Device B provides simple HARQ feedback by only sending an ACK of the TB as indicated at 1008. In other embodiments, Device B may send a NACK after each transmission if it has not yet successfully decoded the TB, or Device B might not send any feedback at all.

Figure 20:
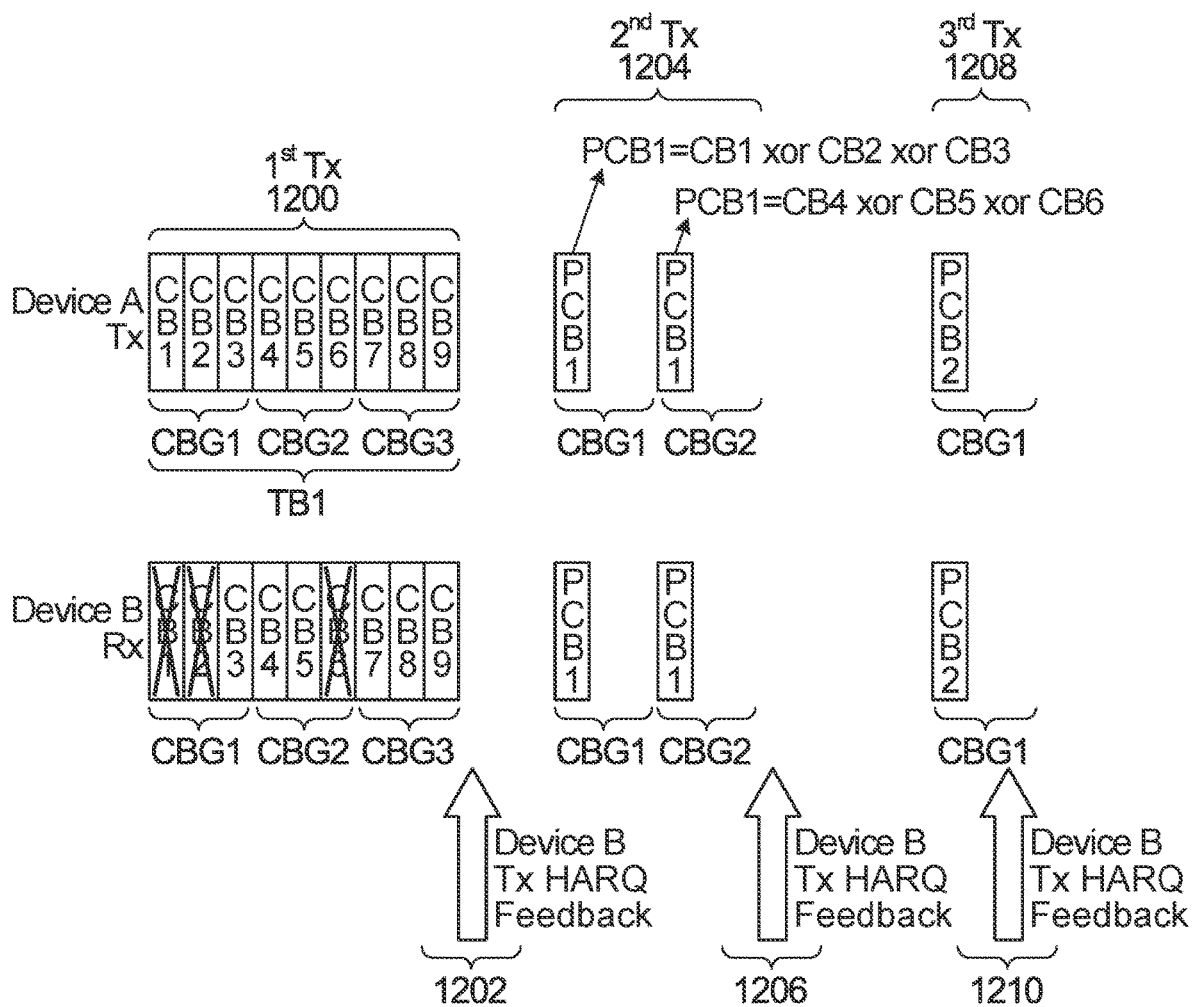
FIG. 20 is a diagram of a first example of a HARQ retransmission scheme that employs outer code based retransmission using a per code block group outer code.

FIG. 20 is a diagram of a second example of a HARQ retransmission scheme between two network devices. In this example, the HARQ retransmission scheme employs outer code based retransmission using a per-CBG based outer code and CBG level feedback.

Similar to the previous example, the original transmitter, Device A, transmits a data block that includes a transport block TB1 to the receiving device, Device B, as indicated at 1200 in FIG. 20.

As in the previous example, Device B successfully decodes all CBs in TB1 except CB1 and CB2 of CBG1 and CB6 of CBG2.

After the first transmission, Device B sends CBG level HARQ feedback (e.g., the Type 2 HARQ feedback described earlier) at 1202 indicating that CBG1 and CBG2 are not successfully decoded.

Based on the HARQ feedback, Device A generates a parity CB PCB1 using an outer code based on CBG1 and a parity CB PCB1 for CBG2 using an outer code based on CBG2. For example, the parity CB PCB1 for CBG1 may be generated by XORing the CBs of CBG1, i.e., $CB1 \oplus CB2 \oplus CB3$, and the parity CB PCB1 for CBG2 may be generated by XORing the CBs of CBG2, i.e., $CB4 \oplus CB5 \oplus CB6$. Device A sends the parity CBs it generated to Device B in a second transmission, as indicated at 1204. In this example, Device B successfully decodes the parity CBs received in the second transmission, which is enough to recover CBG2, because only one CB was not successfully decoded in CBG2. However, because a single PCB only allows the Device B to recover a single corrupted CB, Device B cannot yet recover CBG1, because there were two unsuccessfully decoded CBs in CBG1.

At 1206, Device B sends another HARQ feedback indicating CBG1 is still unsuccessfully decoded. Device A then generates another different parity CB, PCB2, for CBG1 using an outer code based on CBG1. For example, Device A may use a cyclic shift based outer code similar to the one described above with reference to FIG. 12B, such that PCB2 for CBG1 is equal to $CB1 \oplus CB2^{(1)} \oplus CB3^{(2)}$. The above operation uses the cyclic shift based outer codes to generate the parity CBs, however, any of the outer code described in this disclosure or any erasure code in general can be applied in a similar manner.

At 1208, Device B sends the parity CB PCB2 to Device B. After the third transmission at 1208, if Device B correctly decodes CBG1 using PCB2, it may send another HARQ feedback message indicating CBG1 or the entire TB is successfully decoded, as indicated at 1210 in FIG. 20.

In some embodiments, the receiving network device, which in this example is Device B, can also feedback more information to help the transmitting network device determine how many parity CBs to generate for each CBG. For example, the receiving network device may feedback the number of CBs that it did not successfully decode for each CBG (i.e., the Type 4 feedback described above), which provides more information than simply which CBGs are successfully decoded. Alternatively, in order to further reduce the feedback overhead, the receiving network device can feedback the maximum number of failed CBs among all CBGs in addition to which CBGs are successfully decoded. In this scenario, the number of parity CBs generated for each CBG can be determined based on the feedback. For example, if the number of failed CBs for each CBG is fed back by the receiving network device, the transmitting network device may generate a number of parity CBs equal to the number of failed CBs reported for that CBG. If the maximum number of failed CBs for all CBGs is fed back, the transmitting device may generate a number of parity CBs for each failed CBG equal to the maximum number of failed CBs for all CBGs reported by the receiving network device. For example, referring again to the embodiment shown in FIG. 20, the maximum number of failed CBs in all CBGs is two (because CB1 and CB2 failed in CBG1), and therefore if Device B initially feeds back at 1202 that it failed to decode CBG1 and CBG2, and the maximum number of failed CBs in all CBG is two, then Device A may generate two parity CBs for CBG1 and two parity CBs for CBG2.

Figure 21:
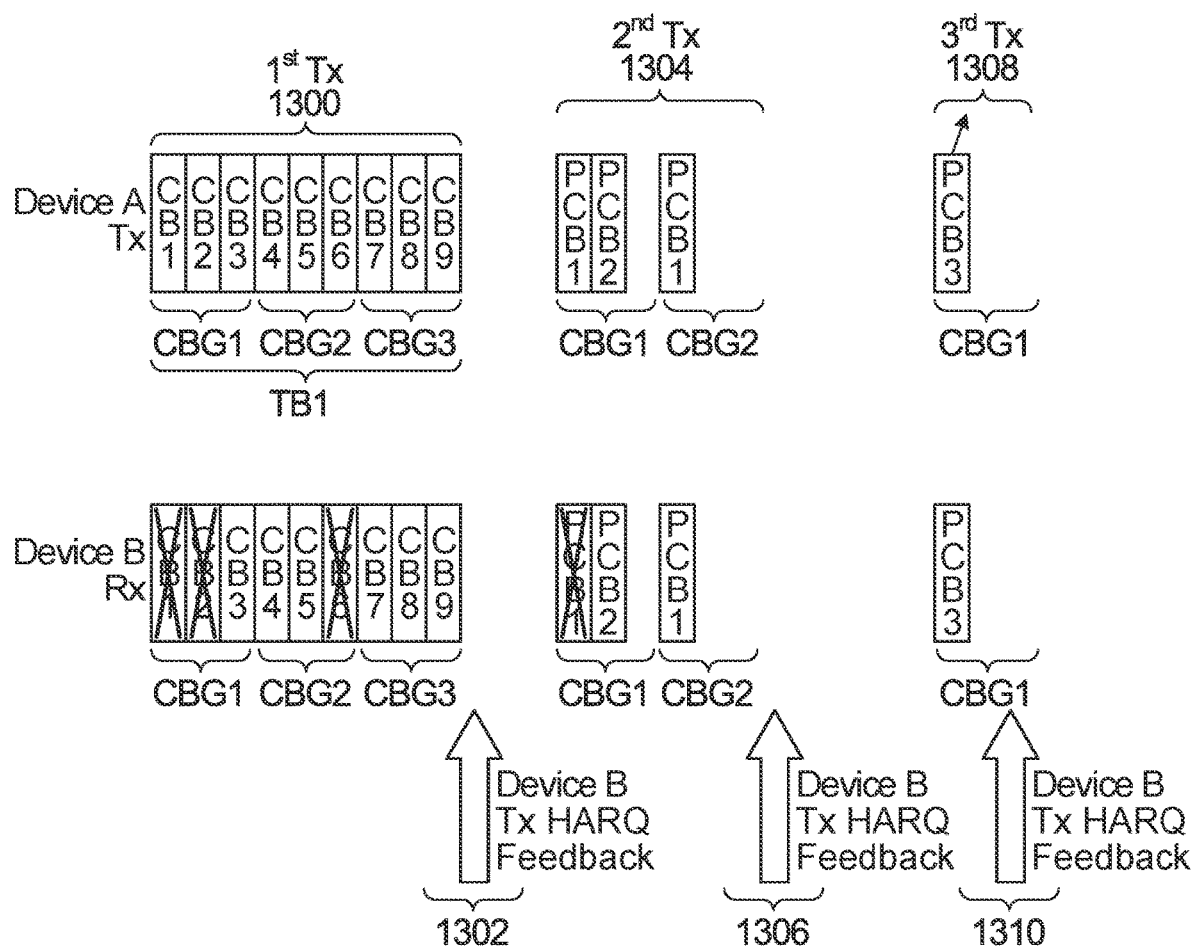
FIG. 21 is a diagram of a second example of a HARQ retransmission scheme that employs outer code based retransmission using a per code block group outer code.

FIG. 21 is a diagram of a second example of a HARQ retransmission scheme between two network devices that employs outer code based retransmission using a per CBG based outer code and CBG level feedback. In this example, the CBG level feedback sent by the receiving network device indicates, for each CBG that has not been successfully decoded, the number of CB(s) that have not been successfully decoded for that CBG.

Similar to the previous two examples, the original transmitter, Device A, transmits a data block that includes a transport block TB1 to the receiving device, Device B, as indicated at 1300, and Device B successfully decodes all CBs in TB1 except CB1 and CB2 of CBG1 and CB6 of CBG2.

After the first transmission, Device B sends HARQ feedback (e.g Type 4 HARQ feedback) at 1302 indicating that two CBs are not successfully decoded in CBG1 and one CB is not successfully decoded in CBG2. Based on the HARQ feedback, Device A generates two parity CBs, PCB1 and PCB2, for CBG1 using an outer code based on CBG1 and one parity CB, PCB1, for CBG2 using an outer code based on CBG2. As in the previous example, the parity CBs for the CBGs may be generated by XORing the CBs of the CBGs or cyclic shifts thereof, e.g., PCB1 for CBG1 may be equal to $CB1 \oplus CB2 \oplus CB3$, and PCB2 for CBG1 may be equal to $CB1 \oplus CB2^{(1)} \oplus CB3^{(2)}$.

Device A sends the PCBs it generated to Device B in a second transmission, as indicated at 1304. In this example, Device B successfully decodes PCB2 for CBG1 and PCB1 for CBG2, but fails to successfully decode PCB1 for CBG1. At 1306, Device B sends another HARQ feedback indicating that one CB is still not successfully decoded for CBG1. Based on this additional HARQ feedback, Device A then generates a third parity CB, PCB3, for CBG1 and sends PCB3 to Device B in a third transmission, as indicated at 1308.

PCB3 may be generated in the same manner as the first two parity CBs, PCB1 and PCB2, for CBG1, such that PCB3 is generated using outer coding based on the CBs of CBG1. For example, $CUE_1$ may use a cyclic shift based outer code similar to the one described above with reference to FIG. 12B, such that PCB3 for CBG1 is equal to $CB1 \oplus CB2^{(2)} \oplus CB3^{(4)}$. In this scenario, after the third transmission at 1308, if Device B correctly decodes the remaining failed CB of CBG1 using PCB3, it may send another HARQ feedback message indicating that CBG1 or the entire TB is successfully decoded, as indicated at 1310.

Alternatively, if a nested HARQ scheme is used, the HARQ feedback sent by Device B at 1306 may instead indicate that one of the parity CBs for CBG1 was not successfully decoded. In this scenario, rather than being generated based on the CBs of CBG1, PCB3 may be a PPCB generated using outer coding based on the parity CBs, PCB1 and PCB2, that Device A sent for CBG1 in the second transmission. For example, PCB3 may be equal to $PCB1 \oplus PCB2$. In which case, after successfully receiving PCB3 in the third transmission, Device B may use PCB3 to recover the PCB1 for CBG1. After using PCB1 and PCB2 for CBG1 to successfully decode CBG1, the TUE sends the HARQ feedback at 1310 that includes an ACK to Device A, to confirm that the CBGs of TB1 have been successfully decoded.

Example Embodiments

The following provides a non-limiting list of additional Example Embodiments of the present disclosure:

Example Embodiment 1. A method for user equipment (UE) cooperation, the method comprising:
receiving, at a first UE, a transport block intended for a second UE, the transport block comprising a plurality of code block groups, each code block group comprising a plurality of code blocks; and
transmitting, from the first UE to the second UE, at least one code block group of the transport block intended for the second UE, the at least one code block group including less than all code block groups of the transport block.

Example Embodiment 2. The method of Example Embodiment 1, wherein the at least one code block group transmitted from the first UE comprises each code block group that the first UE was able to successfully decode for the transport bock.

Example Embodiment 3. The method of Example Embodiment 1, further comprising:
receiving, at the first UE, scheduling information from a base station,
wherein the at least one code block group transmitted from the first UE is selected from among the plurality of code block groups of the transport block based at least in part on the scheduling information from the base station.

Example Embodiment 4. The method of Example Embodiment 1, further comprising:
receiving, at the first UE, a feedback message from the second UE including information identifying at least one code block or code block group the second UE failed to decode for the transport block,
wherein the at least one code block group transmitted from the first UE is selected from among the plurality of code block groups of the transport block based at least in part on the feedback message from the second UE.

Example Embodiment 5. The method of Example Embodiment 4, wherein the feedback message comprises, for each code block or code block group the second UE failed to decode, a code block index or code block group index corresponding to the code block or code block group.

Example Embodiment 6. The method of Example Embodiment 1, further comprising:
transmitting, from the first UE, information identifying each code block group of the at least one code block group transmitted from the first UE.

Example Embodiment 7. The method of Example Embodiment 6, wherein the information identifying each code block group of the at least one code block group comprises, for each code block group of the at least one code block group, a code block group index corresponding to the code block group.

Example Embodiment 8. The method of Example Embodiment 7, wherein the information identifying each code block group of the at least one code block group transmitted from the first UE is included in sidelink control information (SCI) transmitted in a sidelink control channel.

Example Embodiment 9. The method of Example Embodiment 1, wherein the first UE successfully decodes all of the code block groups of the transport block.

Example Embodiment 10. The method of Example Embodiment 1, wherein receiving the transport block intended for the second UE comprises receiving the transport block from a third UE.

Example Embodiment 11. The method of Example Embodiment 10, wherein receiving the transport block from the third UE comprises receiving the transport block via a multicast sidelink transmission from the third UE.

Example Embodiment 12. The method of Example Embodiment 1, wherein receiving the transport block comprises receiving the transport block from a base station.

Example Embodiment 13. The method of Example Embodiment 12, wherein receiving the transport block from the base station comprises receiving the transport block via a multicast downlink transmission from the base station.

Example Embodiment 14. A method for user equipment (UE) cooperation, the method comprising:
receiving, at a first UE, a transport block intended for a second UE, the transport block comprising a plurality of code block groups, each code block group comprising a plurality of code blocks;
generating, by the first UE, at least one outer coded code block based on less than all code block groups of the transport block;
transmitting, from the first UE to the second UE, the at least one outer coded code block.

Example Embodiment 15. The method of Example Embodiment 14, wherein:
generating at least one outer coded code block comprises generating a single outer coded code block based on contents of less than all of the code block groups of the transport block; and
transmitting the at least one outer coded code block comprises transmitting the single outer coded code block to the second UE.

Example Embodiment 16. The method of Example Embodiment 15, wherein the single outer coded code block is based on contents of two or more code block groups of the transport block.

Example Embodiment 17. The method of Example Embodiment 14, wherein generating and transmitting the at least one outer coded code block comprises:
generating, for each code block group of the transport block, an outer coded version of the code block group based on contents of the code block group; and
transmitting the outer coded versions of the code block groups to the second UE.

Example Embodiment 18. The method of Example Embodiment 14, wherein generating the at least one outer coded code block comprises applying outer coding to less than all of the contents of the transport block, the outer coding being selected from the group consisting of: raptor coding, Reed Solomon (RS) coding, parity check coding, and erasure coding.

Example Embodiment 19. The method of Example Embodiment 18, wherein applying the outer coding comprises applying parity check coding, wherein applying the parity check coding comprises computing at least one parity check code block by, for each one of the at least one parity check code block, performing an XOR operation on one or more of the code block groups or cyclic shifts thereof.

Example Embodiment 20. The method of Example Embodiment 14, further comprising:

receiving, at the first UE, a feedback message from the second UE including information indicating the second UE failed to decode at least one code block or code block group of the transport block, wherein generating the at least one outer coded code block comprises generating the at least one outer coded code block based on:

i) the feedback message from the second UE; and
ii) one or more code block groups the first UE was able to successfully decode for the transport bock.

Example Embodiment 21. The method of Example Embodiment 20, wherein the feedback message comprises information identifying the at least one code block or code block group the second UE failed to decode.

Example Embodiment 22. The method of Example Embodiment 21, wherein the information identifying the at least one code block or code block group comprises, for each code block or code block group the second UE failed to decode, a code block index or code block group index corresponding to the code block or code block group.

Example Embodiment 23. The method of Example Embodiment 15, further comprising:

transmitting, from the first UE, outer coding information identifying each code block group that the at least one outer coded code block is based on.

Example Embodiment 24. The method of Example Embodiment 23, wherein the outer coding information comprises, for each code block group that the at least one outer coded code block is based on, a code block group index corresponding to the code block group.

Example Embodiment 25. The method of Example Embodiment 21, wherein the information indicating the second UE failed to decode at least one code block or code block group of the transport block further comprises information identifying, for each code block group the second UE failed to decode, a quantity of code blocks the second UE failed to decode for the code block group.

Example Embodiment 26. The method of Example Embodiment 25, wherein generating and transmitting the at least one outer coded code block comprises:

generating, for each of at least a subset of the code block groups the second UE failed to decode, an outer coded version of the code block group based on contents of the code block group; and transmitting the outer coded versions of the code block groups of the transport block to the second UE.

Example Embodiment 27. The method of Example Embodiment 26, wherein generating the outer coded versions of the code block groups comprises generating, for each of at least a subset of the code block groups the second UE failed to decode, a quantity of outer coded code blocks based on the contents of the code block group equal to the quantity of code blocks the second UE failed to decode for the code block group.

Example Embodiment 28. The method of Example Embodiment 20, wherein the information indicating the second UE failed to decode at least one code block or code block group of the transport block comprises information identifying a quantity of code blocks the second UE failed to decode for the transport block.

Example Embodiment 29. The method of Example Embodiment 21, wherein the information indicating the second UE failed to decode at least one code block or code block group of the transport block further comprises information identifying a maximum quantity of code blocks the second UE failed to decode for any given code block group of the transport block.

Example Embodiment 30. The method of Example Embodiment 29, wherein generating and transmitting the at least one outer coded code block comprises:

generating, for each of at least a subset of the code block groups the second UE failed to decode, an outer coded version of the code block group based on contents of the code block group; and transmitting the outer coded versions of the code block groups of the transport block to the second UE.

Example Embodiment 31. The method of Example Embodiment 30, wherein generating the outer coded versions of the code block groups comprises generating, for each of at least a subset of the code block groups the second UE failed to decode, a quantity of outer coded code blocks based on contents of the code block group equal to the maximum quantity of code blocks the second UE failed to decode for any given code block group of the transport block.

Example Embodiment 32. A method performed by a first network device, the method comprising generating, by the first network device, for each of N code block groups of a transport block, an outer coded version of the code block group, the outer coded version comprising at least one outer coded code block based on contents of the code block group, the transport block including m code block groups, N≤m and m≥2, each code block group comprising a plurality of code blocks;

transmitting, by the first network device, the outer coded versions of the N code block groups to a second network device.

Example Embodiment 33. The method of Example Embodiment 32, further comprising:

receiving, by the first network device, a feedback message from the second network device, the feedback message comprising information identifying the N code block groups of the transport block as failed code block groups that the second network device has not successfully decoded, wherein the generating and transmitting of the outer coded versions of the N code block groups is responsive to receiving the feedback message.

Example Embodiment 34. The method of Example Embodiment 33, wherein:

the feedback message further comprises information indicating a maximum quantity of failed code blocks in any given failed code block group of the transport block; and generating the outer coded versions of the N code block groups comprises generating, for each of the N code block groups, a quantity of outer coded code blocks equal to the maximum quantity of failed code blocks in any given failed code block group of the transport block.

Example Embodiment 35. The method of Example Embodiment 33, wherein the feedback message is a first feedback message, and wherein the method further comprises:

receiving, by the first network device, a second feedback message from the second network device, the second feedback message comprising information identifying $N_1$ of the outer coded versions of the N code block groups as failed first outer coded versions the second network device has not successfully decoded, $N_1 \leq N$;

generating, by the first network device, for each of the $N_1$ failed first outer coded versions, a second outer coded version based on contents of the outer coded code block(s) of the failed first outer coded version; and transmitting, by the first network device, the second outer coded versions of the $N_1$ failed first outer coded versions of failed code block groups of the transport block to the second network device.

Example Embodiment 36. The method of Example Embodiment 32, wherein the first network device is a UE, and the second network device is a base station; or the first network device is a base station, and the second network device is a UE.

Example Embodiment 37. The method of Example Embodiment 32, wherein generating the outer coded versions of the N code block groups comprises, for each of the N code block groups, applying outer coding to the contents of the code block group, the outer coding being selected from the group consisting of: raptor coding, Reed Solomon (RS) coding, parity check coding, and erasure coding.

Example Embodiment 38. The method of Example Embodiment 32, wherein generating the outer coded versions of the N code block groups comprises, for each of the N code block groups, computing at least one parity check code block by, for each one of the at least one parity check code block, performing an XOR operation on all of the code blocks of the code block group or cyclic shifts thereof.

Example Embodiment 39. The method of Example Embodiment 38, wherein computing the at least one parity check code block for a given one of the N failed code block groups comprises:

for each parity check code block, computing an XOR of p words, wherein each one of the p words is either equal to or a cyclic shift of a respective different one of p code blocks in the failed code block group.

Example Embodiment 40. The method of Example Embodiment 38, wherein the cyclic shift applied to a code block $C_i$ to compute a parity check code block P is different from the cyclic shift applied to that code block $C_i$ to compute another parity check code block $P_h$j.

Example Embodiment 41. The method of Example Embodiment 32, wherein generating the outer coded versions of the N code block groups comprises, for each of the N code block groups, generating each outer coded code block of the outer coded version of the code block group based on contents of all of the code blocks of the code block group.

Example Embodiment 42. The method of Example Embodiment 32, wherein generating the outer coded versions of the N code block groups comprises, for each of the N code block groups, generating each outer coded code block of the outer coded version of the code block group based on contents of less than all of the code blocks of the code block group.

Example Embodiment 43. A method for user equipment (UE) cooperation, the method comprising:

receiving, by a second UE, a transport block comprising m code block groups, $m \geq 2$, each code block group comprising a plurality of code blocks;

decoding, by the second UE, the transport block;

subsequent to decoding failing for N code block groups of the transport block, $N \leq m$, receiving, by the second UE from a first UE, at least one code block group of the N failed code block groups, the at least one code block group including less than all m code block groups of the transport block; and decoding, by the second UE, the at least one code block group of the N failed code block groups based, at least in part, on the at least one code block group received from the first UE.

Example Embodiment 44. The method of Example Embodiment 43, further comprising:

in response to the decoding failing for N code block groups of the transport block, transmitting, from the second UE, a feedback message comprising information identifying at least one failed code block or failed code block group of the N failed code block groups.

Example Embodiment 45. The method of Example Embodiment 43, further comprising:

receiving, by the second UE from the first UE, information identifying the at least one code block group transmitted by the first UE, wherein decoding the at least one code block group of the N failed code block groups is further based, at least in part, on the information identifying the at least one code block group transmitted by the first UE.

Example Embodiment 46. The method of Example Embodiment 45, wherein the information identifying the at least one code block group transmitted by the first UE comprises, for each code block group of the at least one code block group, a code block group index corresponding to the code block group.

Example Embodiment 47. The method of Example Embodiment 46, wherein the information identifying the at least one code block group transmitted by the first UE is included in sidelink control information (SCI) transmitted in a sidelink control channel.

Example Embodiment 48. The method of Example Embodiment 43, wherein receiving the transport block comprises receiving the transport block via a multicast transmission from a third UE or a base station.

Example Embodiment 49. A method for user equipment (UE) cooperation, the method comprising:

receiving, by a second UE, a transport block comprising m code block groups, $m \geq 2$, each code block group comprising a plurality of code blocks;

decoding, by the second UE, the transport block;

subsequent to decoding failing for N code block groups of the transport block, $N \leq m$, receiving, by the second UE, at least one outer coded code block based on less than all code block groups of the transport block; and decoding, by the second UE, at least one code block group of the N failed code block groups based, at least in part, on the at least one outer coded code block received from the first UE.

Example Embodiment 50. The method of Example Embodiment 49, wherein:

the at least one outer coded code block comprises a single outer coded code block based on contents of less than all of the m code block groups of the transport block; an decoding at least one code block group of the N failed code block groups comprises decoding at least one code block group of the N failed code block groups based, at least in part, on the single outer coded code block received from the first UE.

Example Embodiment 51. The method of Example Embodiment 49, wherein:

the at least one outer coded code block comprises, for each code block group of at least a subset of the m code block groups of the transport block, an outer coded version of the code block group based on contents of the code block group; and decoding, by the second UE, at least one code block group of the N failed code block groups comprises decoding at least one code block group of the N failed code block groups based, at least in part, on the corresponding outer coded version of the code block group received from the first UE.

Example Embodiment 52. The method of Example Embodiment 49, further comprising:

in response to the decoding failing for N code block groups of the transport block, transmitting, from the second UE, a feedback message including information indicating the second UE failed to decode at least one code block or code block group of the transport block.

Example Embodiment 53. The method of Example Embodiment 52, wherein the feedback message comprises information identifying the at least one code block or code block group the second UE failed to decode.

Example Embodiment 54. The method of Example Embodiment 53, wherein the information identifying the at least one code block or code block group comprises, for each code block or code block group the second UE failed to decode, a code block index or code block group index corresponding to the code block or code block group.

Example Embodiment 55. The method of Example Embodiment 53, further comprising:

receiving, by the second UE, a message from the first UE comprising outer coding information identifying, each code block group that the at least one outer coded code block is based on, wherein decoding at least one code block group of the N failed code block groups is further based on the outer coding information in the message from the first UE.

Example Embodiment 56. The method of Example Embodiment 55, wherein the outer coding information comprises, for each code block group that the at least one outer coded code block is based on, a code block group index corresponding to the code block group.

Example Embodiment 57. The method of Example Embodiment 53, wherein the information indicating the second UE failed to decode at least one code block or code block group of the transport block further comprises information identifying, for each code block group the second UE failed to decode, a quantity of code blocks the second UE failed to decode for the code block group.

Example Embodiment 58. The method of Example Embodiment 57, wherein the at least one outer coded code block comprises, for each of at least a subset of the N code block groups the second UE failed to decode, a quantity of outer coded code blocks based on the contents of the code block group equal to the quantity of code blocks the second UE failed to decode for the code block group.

Example Embodiment 59. The method of Example Embodiment 52, wherein the information indicating the second UE failed to decode at least one code block or code block group of the transport block comprises information identifying a quantity of code blocks the second UE failed to decode for the transport block.

Example Embodiment 60. The method of Example Embodiment 53, wherein the information indicating the second UE failed to decode at least one code block or code block group of the transport block further comprises information identifying a maximum quantity of code blocks the second UE failed to decode for any given code block group of the transport block.

Example Embodiment 61. The method of Example Embodiment 51, further comprising:

in response to decoding failing for a quantity $N_1$ of the outer coded versions of the N code block groups of the transport block, $N_1 \leq N$, transmitting, from the second UE, a second feedback message comprising information identifying the $N_1$ outer coded versions of the N failed code block groups of the transport block as failed first outer coded versions the second UE has not successfully decoded;

receiving, by the second UE, for each of at least a subset of the $N_1$ failed first outer coded versions, a second outer coded version of the failed code block group based on contents of the at least one outer coded code block of the failed first outer coded version of the failed code block group; and decoding, by the second UE, at least one code block group of the N failed code block groups based, at least in part, on the second outer coded version of the failed code block group.

Example Embodiment 62. A method performed by a network device, the method comprising:

receiving, by the network device, a transport block comprising m code block groups, $m \geq 2$, each code block group comprising a plurality of code blocks;

decoding, by the network device, the transport block;

subsequent to decoding failing for N code block groups of the transport block, $N \leq m$, receiving, by the network device, for each of at least a subset of the N failed code block groups, an outer coded version of the failed code block group, the outer coded version comprising at least one outer coded code block based on contents of the failed code block group; and decoding, by the network device, at least one code block group of the N code block groups based, at least in part, on the outer coded version of the code block group.

Example Embodiment 63. The method of Example Embodiment 62, further comprising:

in response to the decoding failing for the N code block groups, transmitting, by the network device, a feedback message comprising:

code block group level acknowledgement/negative acknowledgement (ACK/NACK) information identifying the N failed code block groups of the transport block; and information indicating a maximum quantity of failed code blocks in any given failed code block group of the transport block Example Embodiment 64. The method of Example Embodiment 63, wherein the feedback message is a first feedback message, and wherein the method further comprises:

in response to decoding failing for a quantity $N_1$ of the outer coded versions of the N failed code block groups of the transport block, $N_1 \leq N$, transmitting, from the network device, a second feedback message comprising information identifying the $N_1$ outer coded versions of the N failed code block groups of the transport block as failed first outer coded versions the network device has not successfully decoded.

Example Embodiment 65. The method of Example Embodiment 64, further comprising:

receiving, by the network device, for each of at least a subset of the $N_1$ failed first outer coded versions, a second outer coded version of the failed code block group based on contents of the at least one outer coded code block of the failed first outer coded version of the failed code block group; and decoding, by the network device, at least one code block group of the N failed code block groups based, at least in part, on the second outer coded version of the failed code block group.

Example Embodiment 66. The method of Example Embodiment 62, wherein outer coding applied to at least a subset of the N failed code block groups of the transport block to generate the outer coded versions of the code block groups is selected from the group consisting of: raptor coding, Reed Solomon (RS) coding, parity check coding, and erasure coding.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method, the method comprising:
    receiving, by a first apparatus, a transport block intended for a second apparatus, the transport block comprising a plurality of code blocks; and
    transmitting, from the first apparatus to the second apparatus, at least one code block based on an outer coded version of the at least one code block of the plurality of code blocks in the received transport block intended for the second apparatus.

2. The method of claim 1, wherein the transmitting the at least one code block comprises:
    transmitting the outer coded version of the at least one code block based on a first set of code blocks, the first set of code blocks being less than all of the plurality of code blocks in the transport block.

3. The method of claim 1, wherein outer coding used to generate the outer coded version of the at least one code block comprises one of: raptor coding, Reed Solomon (RS) coding, parity check coding, or erasure coding.

4. The method of claim 1, further comprising:
    receiving, by the first apparatus from the second apparatus, a feedback message, the feedback message including: information indicating a quantity of one or more code blocks that the second apparatus failed to decode,
    wherein the transmitting the outer coded version of the at least one code block comprises:
    transmitting the quantity of the one or more code blocks that the second apparatus failed to decode based on the feedback message.

5. The method of claim 1, further comprising:
    transmitting, from the first apparatus in sidelink control information (SCI) in a sidelink control channel, at least one of:
    information identifying an index of the at least one code block,
    information identifying a number of outer coded versions of the plurality of code blocks transmitted from the first apparatus, or
    information identifying parameters to generate each of the outer coded versions of the plurality of code blocks transmitted from the first apparatus.

6. The method of claim 1, further comprising:
    receiving, by the first apparatus, a feedback message from the second apparatus including information identifying one or more code blocks that the second apparatus failed to decode for the transport block,
    wherein the at least one code block is selected from among the plurality of code blocks in the transport block based at least in part on the feedback message from the second apparatus.

7. The method of claim 1, further comprising:
    receiving, by the first apparatus, scheduling information from a base station,
    wherein the at least one code block transmitted from the first apparatus is selected from among the plurality of code blocks the transport block based at least in part on the scheduling information from the base station.

8. The method of claim 1, further comprising:
    transmitting, from the first apparatus in sidelink control information (SCI) in a sidelink control channel, information identifying an index of the at least one code block.

9. The method of claim 1, wherein the transport block includes a plurality of code block groups, and each code block group of the plurality of code block groups includes multiple code blocks, the transmitting comprising:

transmitting, from the first apparatus to the second apparatus, the at least one code block based on at least one code block group of the plurality of code block groups in the transport block.

10. The method of claim 9, the transmitting the at least one code block comprising:
generating an outer coded code block based on contents of the at least one code block group; and
transmitting outer coded versions of the at least one code block group to the second apparatus.

11. An apparatus, the apparatus comprising:
one or more processors; and
a non-transitory computer readable storage medium storing programming for execution by the one or more processors, the programming including instructions to:
receive a transport block intended for a second apparatus, the transport block comprising a plurality of code blocks; and
transmit, to the second apparatus, at least one code block based on an outer coded version of the at least one code block of the plurality of code blocks in the received transport block intended for the second apparatus.

12. The apparatus of claim 11, wherein the instructions to transmit the at least one code block include instructions to:
transmit the outer coded version of the at least one code block based on a first set of code blocks, the first set of code blocks being less than all of the plurality of code blocks in the transport block.

13. The apparatus of claim 11, wherein outer coding used to generate the outer coded version of the at least one code block comprises one of: raptor coding, Reed Solomon (RS) coding, parity check coding, or erasure coding.

14. The apparatus of claim 11, the programming further including instructions to:
receive, from the second apparatus, a feedback message, the feedback message including: information indicating a quantity of one or more code blocks that the second apparatus failed to decode,
wherein the instructions to transmit the outer coded version of the at least one code block include instructions to:
transmit the quantity of the one or more code blocks that the second apparatus failed to decode based on the feedback message.

15. The apparatus of claim 11, the programming further including instructions to:
transmit, in sidelink control information (SCI) in a sidelink control channel, at least one of:
information identifying an index of the at least one code block,
information identifying a number of outer coded versions of the plurality of code blocks transmitted from the apparatus, or
information identifying parameters to generate each of the outer coded versions of the plurality of code blocks transmitted from the apparatus.

16. The apparatus of claim 11, the programming further including instructions to:
receive a feedback message from the second apparatus including information identifying one or more code blocks that the second apparatus failed to decode for the transport block,
wherein the at least one code block is selected from among the plurality of code blocks in the transport block based at least in part on the feedback message from the second apparatus.

17. The apparatus of claim 11, the programming further including instructions to:
receive scheduling information from a base station,
wherein the at least one code block transmitted from the apparatus is selected from among the plurality of code blocks the transport block based at least in part on the scheduling information from the base station.

18. The apparatus of claim 11, the programming further including instructions to:
transmit, in sidelink control information (SCI) in a sidelink control channel, information identifying an index of the at least one code block.

19. The apparatus of claim 11, wherein the transport block includes a plurality of code block groups, and each code block group of the plurality of code block groups includes multiple code blocks, the instructions to transmit the at least one code block including instructions to:
transmit, to the second apparatus, the at least one code block based on at least one code block group of the plurality of code block groups in the transport block.

20. The apparatus of claim 19, the instructions to transmit the at least one code block including instructions to:
generate an outer coded code block based on contents of the at least one code block group; and
transmit outer coded versions of the at least one code block group to the second apparatus.

* * * * *